United States Patent [19]

Gupta et al.

[11] Patent Number: 5,555,244
[45] Date of Patent: Sep. 10, 1996

[54] SCALABLE MULTIMEDIA NETWORK

[75] Inventors: Dev V. Gupta, Flemington; Yu-Ren B. Chen, Somerville, both of N.J.; Craig A. Sharper, Los Altos, Calif.; Alan E. Stone, Morristown, N.J.

[73] Assignee: Integrated Network Corporation, Bridgewater, N.J.

[21] Appl. No.: 269,370

[22] Filed: Jun. 30, 1994

Related U.S. Application Data

[63] Continuation-in-part of Ser. No. 243,059, May 19, 1994, abandoned.

[51] Int. Cl.$^6$ .............. H04Q 11/04; H04J 3/16; H04J 3/22; H04J 3/02
[52] U.S. Cl. .............. 370/60.1; 370/82; 370/84; 370/85.9; 370/85.13; 370/94.2
[58] Field of Search .............. 370/58.1, 60, 60.1, 370/79, 82, 83, 84, 85.1, 85.7, 55.9, 85.11, 85.13, 99, 110.1, 85.14, 94.1, 94.2, 105.1

[56] References Cited

U.S. PATENT DOCUMENTS

| | | | |
|---|---|---|---|
| 4,439,763 | 3/1984 | Limb | 340/825.5 |
| 4,587,651 | 5/1986 | Nelson et al. | 370/88 |
| 4,922,244 | 5/1990 | Hullett et al. | 340/825.5 |
| 5,050,166 | 9/1991 | Cantoni et al. | 370/94.1 |
| 5,051,742 | 9/1991 | Hullett et al. | 340/825.5 |
| 5,231,631 | 7/1993 | Buhrke et al. | 370/60 |
| 5,251,207 | 10/1993 | Abensour et al. | 370/60.1 |
| 5,280,476 | 1/1994 | Kojima et al. | 370/60.1 |

FOREIGN PATENT DOCUMENTS

| | | |
|---|---|---|
| WO89/08887 | 9/1989 | WIPO . |
| WO94/08414 | 4/1994 | WIPO . |

OTHER PUBLICATIONS

Albanese, A., et al., "Bellcore Metrocore™ Network —A Test–Bed for Metropolitan Area Network Research," IEEE Global Telecommunications Conference & Exhibition, pp. 1229–1234 (1988).

Ippoliti, A., and Albanese, A., "Parallel Media Access Controller for Packet Communications at GB/s Rates," IEEE International Conference on Communication, pp. 991–996 (1990), Apr.).

Albanese, A., "A Terminal Adaptor to Explore Variable–Bit–Rate Services for Multi–Gb/sec Broadband Networks," pp. 265–270 (1990, Sep.).

*Primary Examiner*—Alpus H. Hsu
*Assistant Examiner*—Ricky Q. Ngo
*Attorney, Agent, or Firm*—Hamilton, Brook, Smith & Reynolds, P.C.

[57] ABSTRACT

A Scalable Multimedia Network providing integrated networking of data, voice, video and image services over a variety of access facilities including metallic loops, fiber/coax or digital fiber is disclosed herein.

The SMN establishes customer initiated switched virtual circuits for all traffic types and directs them to the appropriate backbone network. The SMN is based on a distributed switching platform that enables carriers to economically provide service to a small number of customers and add capacity incrementally as the customer base increases. The platform has a protocol adaptation capability which permits communications between customer premises equipment and potentially incompatible backbone networks or network servers.

10 Claims, 28 Drawing Sheets

SCALABLE MULTIMEDIA NETWORK

RELATED APPLICATION

This is a continuation-in-part application of U.S. application Ser. No. 08/243,059 filed on May 19, 1994, now abandoned, the entire contents of which is incorporated herein by reference.

BACKGROUND OF THE INVENTION

To expand their service offerings and revenue base, telephone companies and cable television operators (collectively, "carriers") are planning new broadband networks to provide interactive multimedia services which cannot be provided by existing communications networks. A number of carriers have announced plans to make significant capital investments to construct "full service" networks to support applications such as video-on-demand, Internet access, and interactive home shopping.

End-user demand for a greater number of services will produce fundamental changes in switched carrier networks. The existing traditional network architecture emphasizes the central office switch. A need exists for a network architecture where switching and transmission functions are integrated, i.e., a distributed switched network. The need is driven by end-user demand for high performance, interactive application support; the deployment of powerful application oriented end-user equipment; the availability of relatively inexpensive distributed technology; the need to respond quickly and flexibly to a dynamic application and technical environment; and the resulting pressure to correlate capital investment with user demand. The results foreseen are cost-effective, adaptable and powerful networks which better meet end-user needs.

SUMMARY OF THE INVENTION

A Scalable Multimedia Network (SMN) providing integrated networking of data, voice, video and image services over a variety of access facilities including metallic loops, fiber/coax and digital fiber is disclosed herein.

The SMN establishes customer initiated switched virtual circuits, or "calls" for all traffic types and directs them to the appropriate backbone network. The SMN is based on a distributed switching platform that enables carriers to economically provide service to a small number of customers and add capacity incrementally as the customer base increases. The platform has a protocol adaptation capability which permits communications between customer premises equipment and potentially incompatible backbone networks or network servers.

The SMN has the following principal features which will be described in connection with the detailed description that follows:

(a) Services are provisioned incrementally for individual subscribers by means of service and input/output channel units designed with standard hardware interfaces.

(b) Channel units reside on shelves having a plurality of slots, and share a first broadcast bus operating at high speed, e.g., 250 Mbps. The bus signaling format is a novel 8 byte "microcell" which can be concatenated, or aggregated, in any variable length to support existing circuit and packet mode transport protocols.

(c) Up to several hundred shelves containing thousands of channel units can be interconnected by means of a second bus operating at very high speed, e.g., 1 Gbps.

A plurality of second type buses containing up to many thousands of channel units may be interconnected by means of a third bus operating at super high speed of about 10 Gbps.

(d) Switching is performed on channel units by means of novel bus interface circuits ("BICs") which perform all cell packetization and depacketization functions.

(e) An internal Internetwork Protocol Engine ("IPE") is provided enabling use of industry standard TCP/IP Internetwork which is a superset of all popular, signaling protocols' Internetwork primitives.

(f) System functions are controlled by a network management system with an extensive set of software application programming interfaces ("APIs") written in object-oriented code.

The key features and advantages of the SMN architecture include:

(a) Multimedia Capability

The multi-tier bus format is adapted to efficiently handle all voice, data, image and video traffic types simultaneously, including TDM, X.25, frame relay, cell relay, SMDS, MPEG and ATM. Physical media including metallic loops, coaxial cable and optical fiber are supported by means of standard hardware interfaces. The SMN is thereby capable of tying together incompatible backbone networks into a common multi-media access facility.

(b) Scalability

The SMN uses a distributed broadcast bus architecture with no common switching equipment. Switching capacity embedded in channel units can be added incrementally as end-users subscribe to services. Along with the hierarchy of buses, this permits the system to "start small" and grow as large as is necessary. This keeps start-up costs low and aligns capital investment with revenues.

(c) Flexibility

The SMN permits quick response to changing service and technical requirements. Since key functionality is embedded in the bus interface circuits and standard hardware interfaces are defined, rapid customization of channel units for different applications and media are possible. The SMN is programmable via the network management system's APIs to encourage the development of third party applications. In a period of market uncertainty and unsettled technical standards, rather than being locked into a single technology which may not support all applications and may be made obsolete by new technical approaches, the SMN allows network operators to adapt to technical approaches.

(d) Interoperability

The SMN's IPE adapts foreign protocols to the internal system protocol and ensures interoperability of any attached devices, systems or networks.

(e) Reliablility

The SMN's fault tolerant design provides for failsafe operation. The object-oriented nature of the network management system allows for new application development while protecting existing software modules, system performance, and integrity.

For a more complete description of some of the terminology and technical details of devices and architecture referred to herein, reference is made to the text *Computer Networks* 2nd Edition, Andrew S. Tanenbaum, PTR Prentice Hall ©1989 incorporated herein in its entirety.

DETAILED DESCRIPTION OF THE PREFERRED EMBODIMENT

The invention will now be described in detail in connection with the foregoing drawings:

1.0 System Overview

Figure 1:
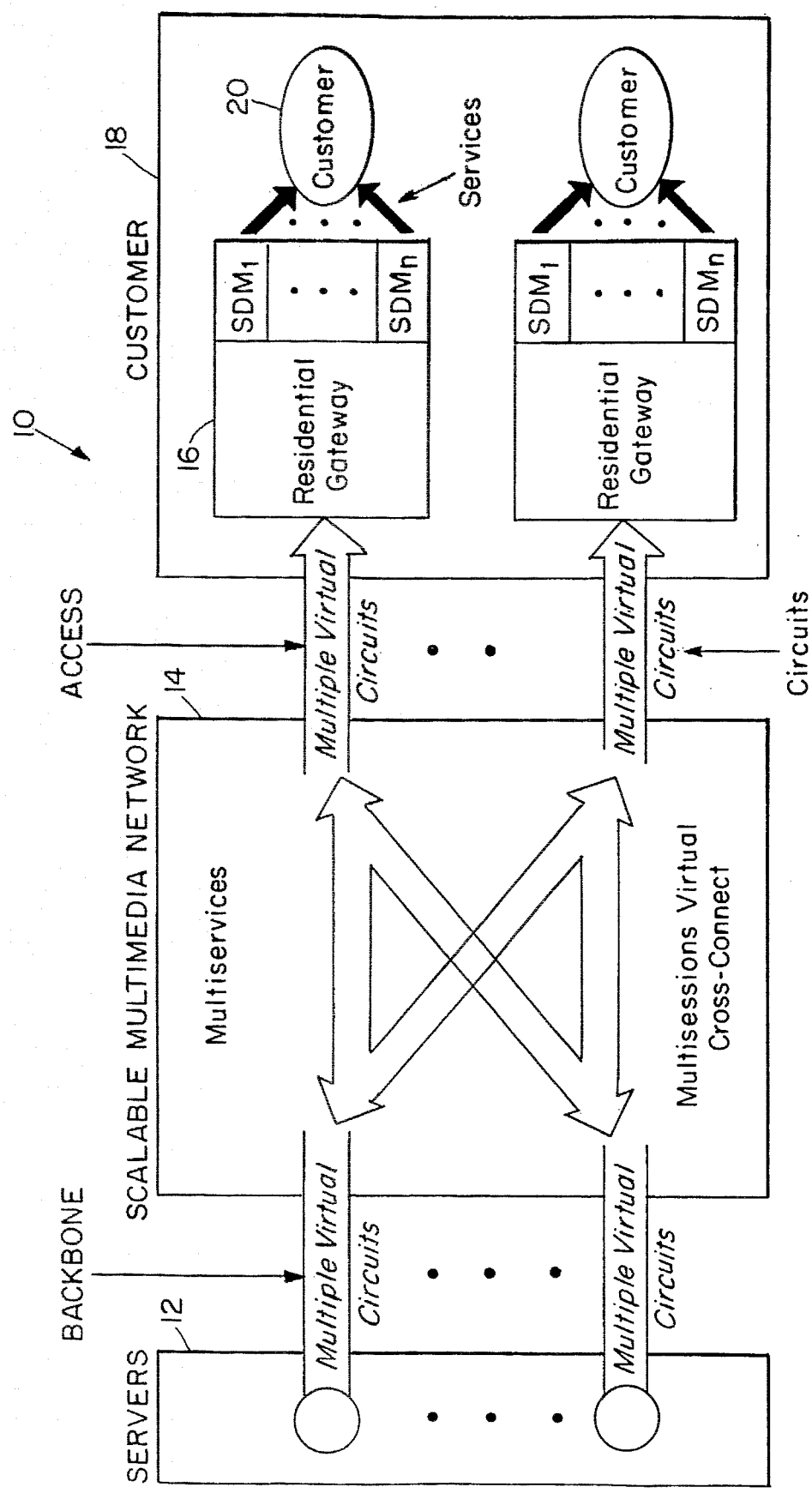
FIG. 1 is a schematic block diagram of a multimedia services delivery system in accordance with the invention.

FIG. 1 is a schematic diagram illustrating the generic components of a Multimedia Services Delivery System (MSDS) 10 in which the SMN is utilized. The system consists of servers 12 from which services, such as, voice, video and data originate; a network 14 which routes the services to the right customer; and a residential gateway (RGW) 16 which delivers the services to the customer 20 through channel units (sometimes referred to as Service Definition Modules, $SDM_1$ through $SDM_N$).

The requirements on, and attributes of, servers 12 are multi-fold as servers have a high dependency on the service being provided and, therefore, will not be described in detail herein. Servers are presently made by On Demand, Hewlett-Packard and others. One generic trait of servers is that they source digital signals in either Constant Bit Rate (CBR) mode or in Variable Bit Rate (VBR) mode. Service characteristics offered by servers can require CBR or VBR transport with very low delay and stringent jitter characteristics.

Due to the multiservice nature of the MSDS, and the low take rate on any one service, the network 14 has to be capable of supporting all services through one network, i.e. the Scalable Multimedia Network (SMN) heretofore referenced. It derives its economics from the union of all services, such a composite having a large take rate. Due to the diverse CBR, VBR, delay and jitter requirements imposed by the variety of services provided by a server 12, such a network must also supports a variety of Quality Of Services (QOS). Since bandwidth is a scarce resource, and sessions from subscribers become active and inactive asynchronously, bandwidth should be used only on demand. The system facilities, therefore, perform statistical multiplexing and the switch fabric of the SMN 14 is thus a cell switch.

The SMN 14 also supports legacy services which typically have delay requirements which are met by Digital Access and Cross-connect Systems (DACS) and Class 5 Switching Systems. Equivalent Fast Circuit Emulation is supported on the cell switches used in the SMN.

For ease in performing functions, such as, operations, maintenance and provisioning, standards-based network management is present to control the SMN. Further, the cell switches used in the SMN have redundancy to achieve the degree of reliability certain services demand.

The SMN is an Open System that provides standards based U-Plane, C-Plane and M-Plane (A-Plane) services and protocols.

The RGW 16 represents the SMN termination on the Customer Premises (CP) 18. From the customer premises side of the RGW, services are delivered to the customer through the use of the Service Definition Modules, $SDM_1$ to $SDM_N$. The RGW's CP interface is an industry standard open interface. The service specific SDM's are used to extract the customer's subscribed services. The SDMs couple the services to the appropriate intra-premises distribution systems.

The RGW has enough bandwidth handling capacity such that the desired service sessions can flow through while meeting desired QOS requirements. Since there can be multiple service sessions co-existing simultaneously, and they can be set up and torn down asynchronously, the RGW performs statistical multiplexing. The RGW 16 is remotely controlled, provisioned and maintained by the SMN 14.

The RGW 16 is principally a communication device which is able to network computers of varying capability present in the SDMs so that services may dynamically interact. To provide such networking, the RGW has an operating system capable of providing communication services to the SDMs through the use of a standardized API, such that the RGW looks like a communication server to the SDM clients.

2.0 Scalable Multimedia Network 14

As outlined in the following sections, the flexibility and capacity of the SMN make it ideally suited for high speed multimedia applications as well as existing and future telephony services. The broadcast switching architecture, coupled with the tiered-bus system, allows for a very low startup cost. The same platform also provides additional cost benefit by offering multicast with no bandwidth overhead. The cost advantage minimizes the capital risk for the service providers.

The cell architecture provides both packet switching for connection-oriented and connectionless services and circuit switching for telephony services over the same platform. The combination of the micro cell and the transport cell offers seamless integration from the central office through the local loop all the way to the customer premises distribution.

2.1 Architecture

The SMN provides layered communication services in both packet mode, i.e., at a variable bit rate (VBR) and circuit mode, i.e. at a constant bit rate (CBR). The system's fabric is based on a distributed broadcast switching architecture. In the transmit direction, all channel units in the system convert the user data into a standard intra-SMN micro-cell format and transport the cells through a high speed system bus. In the receive direction, the channel units retrieve individual cells addressed to the units, convert the data into the appropriate physical and frame format, and pass it to the physical and subtending logical destinations.

The SMN platform supports both circuit switching and cell switching. In the circuit mode, the SMN transports the data stream along with the signaling state via micro-cells with minimum delay and jitter. In this mode, the SMN meets the DACS delay performance requirement with a worst-case through delay not exceeding 500 μs. This is required to support narrowband legacy services such as telephony and DDS which have stringent time-delay requirements. In the cell switching mode, the system transparently supports all standard packet services, including ATM, Frame Relay, SMDS, and X.25.

2.2 Buses

Figure 2:
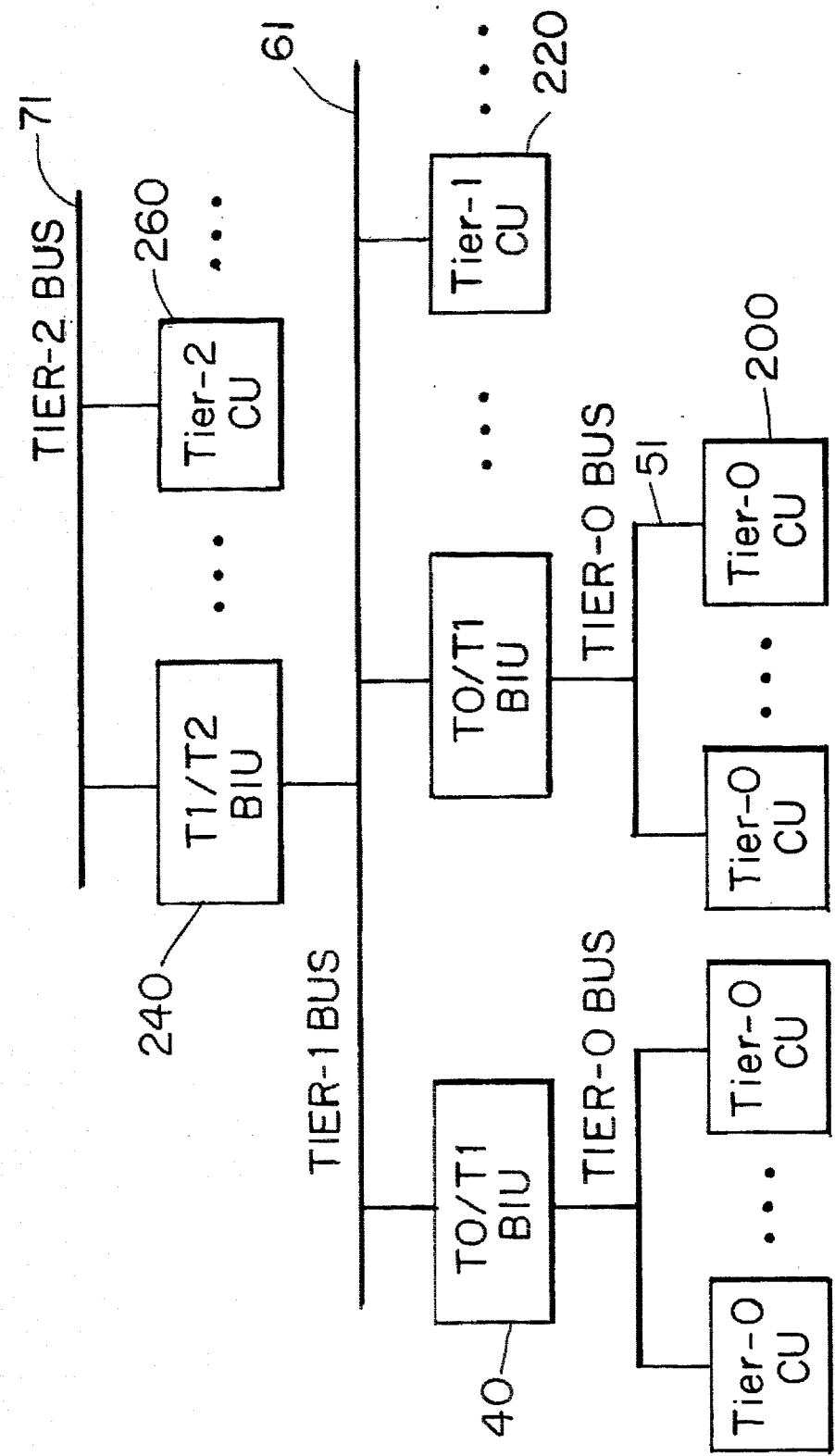
FIG. 2 is a schematic representation of a bus architecture for the system of FIG. 1.

The SMN is a broadcast switch using tiered system buses, Tier-0, Tier-1 and Tier-2, as shown in FIG. 2. Physically, the system buses can be broken down into different tiers, each one running at a different rate. The Tier-0 bus 51 consists of four independent 16-bit parallel buses: a service-transmit bus; a service-receive bus; a protection-transmit bus; and a protection-receive bus. The protection-transmit and the protection-receive buses allow for full redundancy of data transmission across the bus. The total bandwidth of each Tier-0 bus is 1 Gigabit per second (Gbps), typically divided equally among the four buses.

The Tier-1 bus 61 consists of four independent serial buses each carrying 1 Gbps of payload. A Tier-0 to Tier-1 Bus Interface Unit (T0/1 BIU) 40 (described in detail in FIGS. 11A–11D) provides the interface between the Tier-0 bus and the Tier-1 bus. Similarly, a Tier-1 to Tier-2 Bus Interface Unit (T1/2 BIU) 240 (also described in FIGS. 11A–11D) provides the interface between the Tier-1 bus and the Tier-2 bus. Total bandwidth of the Tier-2 bus exceeds 10 Gbps.

As illustrated in FIG. 2, channel units (CUs) 200, 220, 260 can be made to interface to a bus of any tier. The decision as to which tiered bus a channel unit should connect to is largely dependent on the bandwidth requirement of the channel unit and the technology available to interface the channel unit to the bus.

Figure 30:
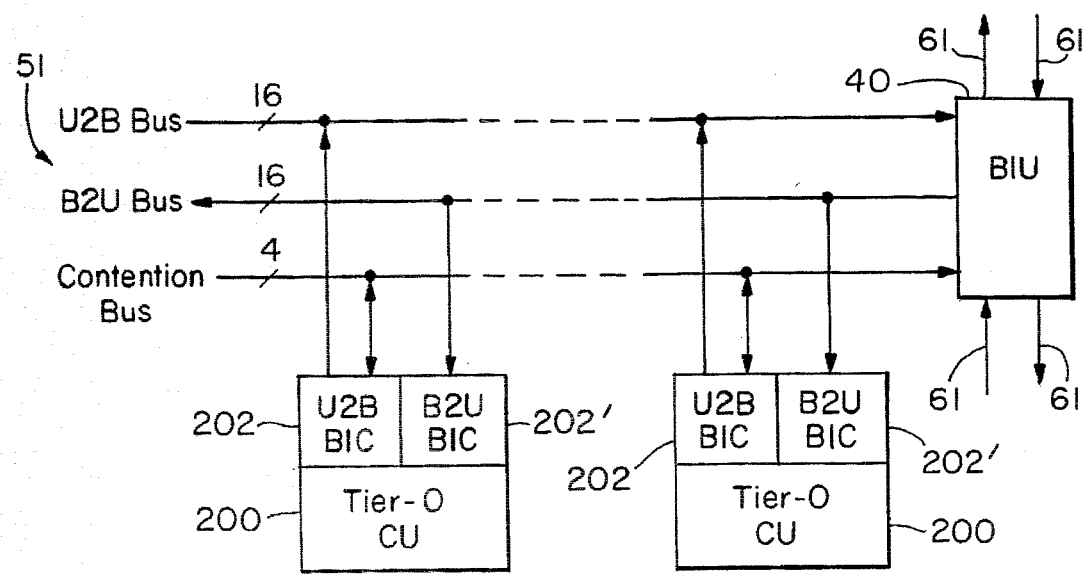
FIG. 30 is a schematic representation of the tier 0/tier-1 bus interface.

FIG. 30 further illustrates the Tier-0 bus 51 comprising the service-transmit bus (U2B bus) and the service-receive bus (B2U bus). The redundant protection buses are not shown. A 4-bit contention bus described later is also shown. Each Tier-0 channel unit 200 is connected to the Tier-0 bus through Bus Interface circuits (BICs) 202, 202'. One BIC device (U2B BIC) 202 transmits data toward the U2B bus. A second BIC (B2U BIC) 202' device receives data from the B2U bus. Preferably a Tier-0 channel unit provides up to sixty-four external physical ports. Examples of Tier-0 channel units are a Video Line Unit (VLU), a Video Trunk Unit (VTU), a Call Processing Module (CPM), and a Gateway Channel Unit (GCU). The T0/1 BIU 40 provides a connection function between the transmit bus and the receive bus, and directs traffic between the Tier-0 bus 51 (also referred to as the horizontal bus) and the BIU. The BIU 40 also provides a gateway function between the Tier-0 bus 51 and the Tier-1 bus 61 (also referred to as the vertical bus).

Figure 31:
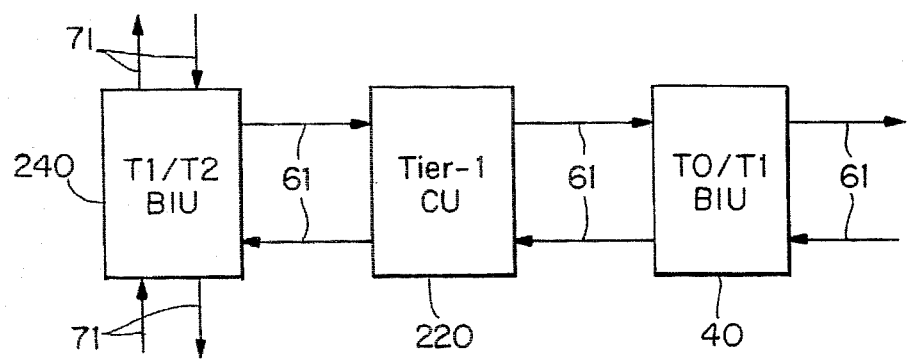
FIG. 31 is a schematic representation of the tier-1/tier-2 bus interface.

FIG. 31 shows the Tier-1 bus architecture. As shown in the figure, the bus 61 is implemented with daisy-chained serial connections between units. Note that the bus access mechanism for the T0/T1 BIU and a Tier-1 channel unit 220 is the same and is described later. The T1/T2 BIU connected serially to channel unit 240 provides a gateway to Tier-2 bus 71. From the Tier-1 bus point of view, the combination of a BIU, the Tier-0 bus terminating on the BIU, and all channel units on the Tier-0 bus can be treated as a functional equivalent of a Tier-1 channel unit 220.

An example of a Tier-1 channel unit is an OC-3 channel unit which can be used to access ATM networks. An example of a Tier-2 channel unit is an OC-48 channel unit used for high speed data transmission. Note that a channel unit can communicate with any other channel unit in the same system, regardless of the location and the bus tier of the other channel unit.

The tiered bus architecture provides two major advantages. The first advantage is that with the tiered arrangement, the system is highly scalable. In a preferred embodiment, a Tier-0 bus supports up to 16 physical channel units, a Tier-1 bus supports up to 250 Tier-0 buses, and a Tier-2 bus supports up to 8 Tier-1 buses. A simple system can consist of a single Tier-0 bus with up to 16 channel units. The same system can grow into the full configuration which supports up to 32,000 channel units.

The second advantage of the tiered bus architecture is that the physical nature of a bus is independent of both the higher-tier bus and the lower-tier bus. As a result, the design and the technology of a bus can be independently enhanced in the future without affecting the bus above or below it.

A Tier-(-1) bus further extends the SMN bus towards the user direction beyond the BICs over the Tier-0 channel units. Different buses may be created, tailored to specific applications. One example of the Tier-(-1) bus is a bus extending into the customer premises over coax 66 shown in FIG. 5. By carrying a modified form of micro-cells, this bus effectively extends the SMN cell beyond the User-Network-Interface.

Another application where a Tier-(-1) bus may be useful is an ATM channel unit with ATM Adaptation Layer (AAL) functions. It is possible to define a bus in either point-to-point form or by connecting multiple circuitry together which is optimized for ATM applications.

Note that the two examples of Tier-(-1) bus are radically different, yet they can co-exist on the same Tier-0 bus, without affecting the operation of the Tier-0 bus. This clearly illustrates the benefit of the independent, tiered bus architecture.

2.3 Software

Figure 4:
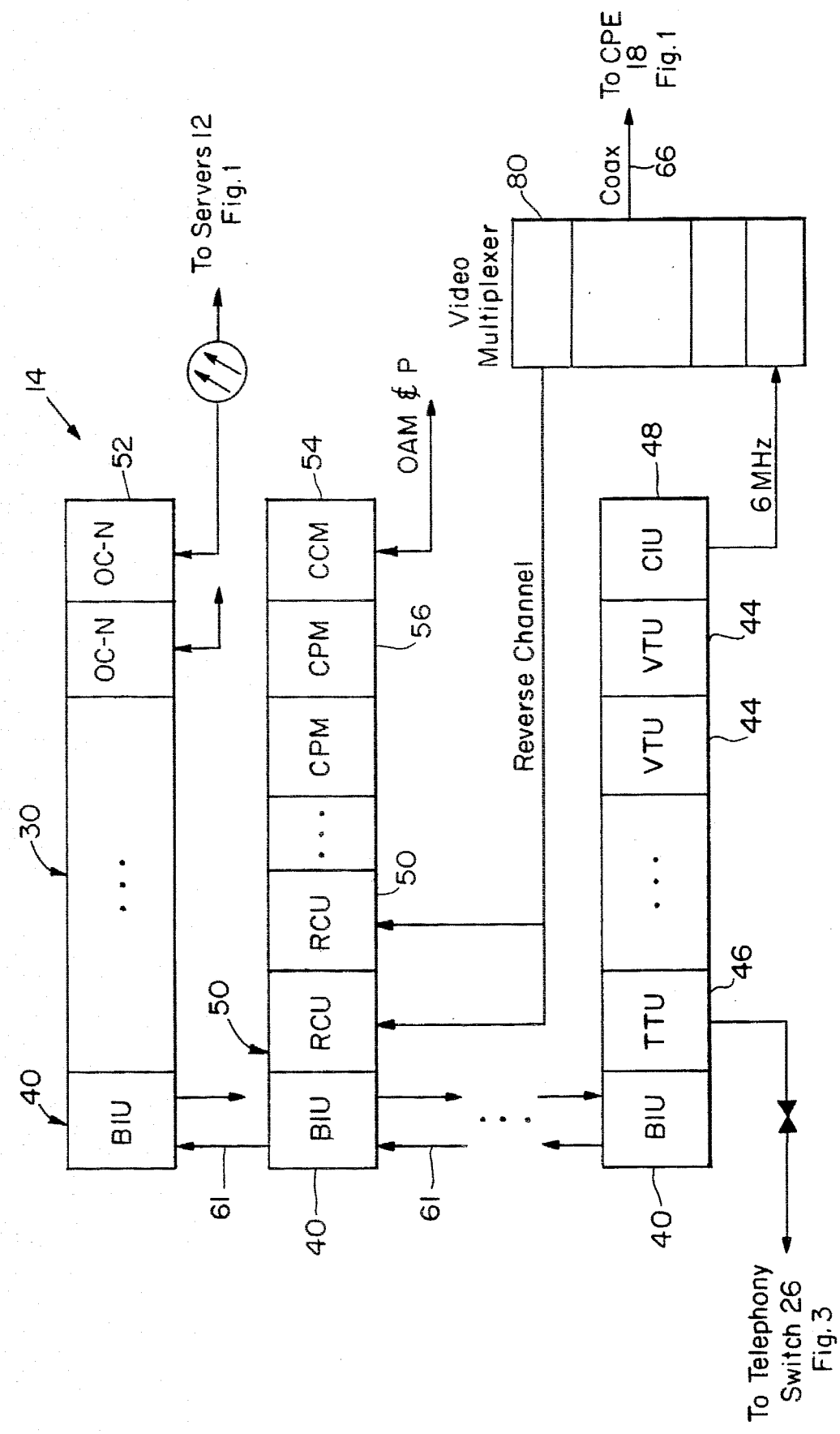
FIG. 4 is a schematic representation of the system architecture for a full service network switch of the invention.

As shown in FIG. 4, the SMN software functions are distributed among a Common Control Module (CCM); a number of Call Processing Modules (CPM); and various channel units. The CCM is the access point for all Operations, Maintenance & Provisioning (OAM&P) functions and it performs higher level administration tasks including platform management, connection management, fault management, and database management. The CCM also serves as the proxy agent for different network managers.

The CCM uses a real-time version of the standard UNIX operating system by UNIX System Labs. In simple setups, the CCM function is performed by a built-in embedded controller. For more complex systems, the CCM function can be performed by an external computer or a suite of external workstations. The external computer(s) can be connected to the SMN through a built-in ETHERNET interface. With the standard operating system, the CCM software can easily be ported to different hardware platforms.

To accommodate a potentially large variety of different protocols for different applications, and to enable rapid adaptation of new applications, an Internetwork Protocol Engine (IPE) is provided. The IPE is a generalization of all popular protocol primitives. The function of the CPM control unit is to serve as a message gateway which translates the messages of different protocols to the standard IPE message set and to manage the associated state machines. The IPE enables seamless integration of different services and different protocols throughout the system. Depending upon the complexity of the applications, each CPM control unit can handle a single protocol conversion or multiple protocol conversions.

The channel units perform ISO layer one functions as well as layer two and some layer three data switching and multiplexing functions. Real-time dependent control functions are performed by the intelligent channel units. The operating system used by the channel units is a highly efficient, ROM-able DOS-compatible real time executive.

2.4 Micro Cell

As mentioned earlier, both Time Division Multiplexed (TDM) traffic and packet data are transported as micro cells over the tiered buses of the SMN. A contention mechanism is utilized to avoid cell collision and is described later. Cells are assigned one of five priority levels. TDM cells are given the highest priority by default and can be immediately transmitted by bypassing all packet cells in the transmit queue. These cells can pre-emptively access the bus by interrupting a packet in transit. On release, the packet restarts where it left off. In addition to the TDM traffic, there are four user-assigned priority levels for the packet traffic. Higher priority packets are transmitted before lower priority packets. Within the same priority, packets are transmitted on a first come first served, distributed queuing basis.

To simplify cell transportation, the BIC devices 202, 202' provide cell conversion, throttling, contention, and switching functions for all types of data. Hardware complexity in the SMN is concentrated within these BICs. These BICs reduce the system cost significantly while, at the same time, reducing the channel unit complexity.

2.5 Cell Transportation Beyond the SMN

The SMN backplane may be extended through the local distribution system into the customer premises. The ability to extend the SMN bus into the customer premises creates a very flexible system architecture. Cells transported between the SMN 14 and the customer premises equipment are defined as Transport Cells. Each transport cell consists of four bytes, with header, payload, and control fields.

With this system, three micro cells carrying TDM traffic can be converted into two transport TDM cells. For TDM traffic, a total of 32 different physical ports can be addressed at the customer premises site. Each micro cell carrying packet traffic can be encapsulated by one transport packet cell. For packet traffic, the system supports a total of 64 thousand logical addresses on each customer premises.

2.6 Network Configuration

Figure 3:
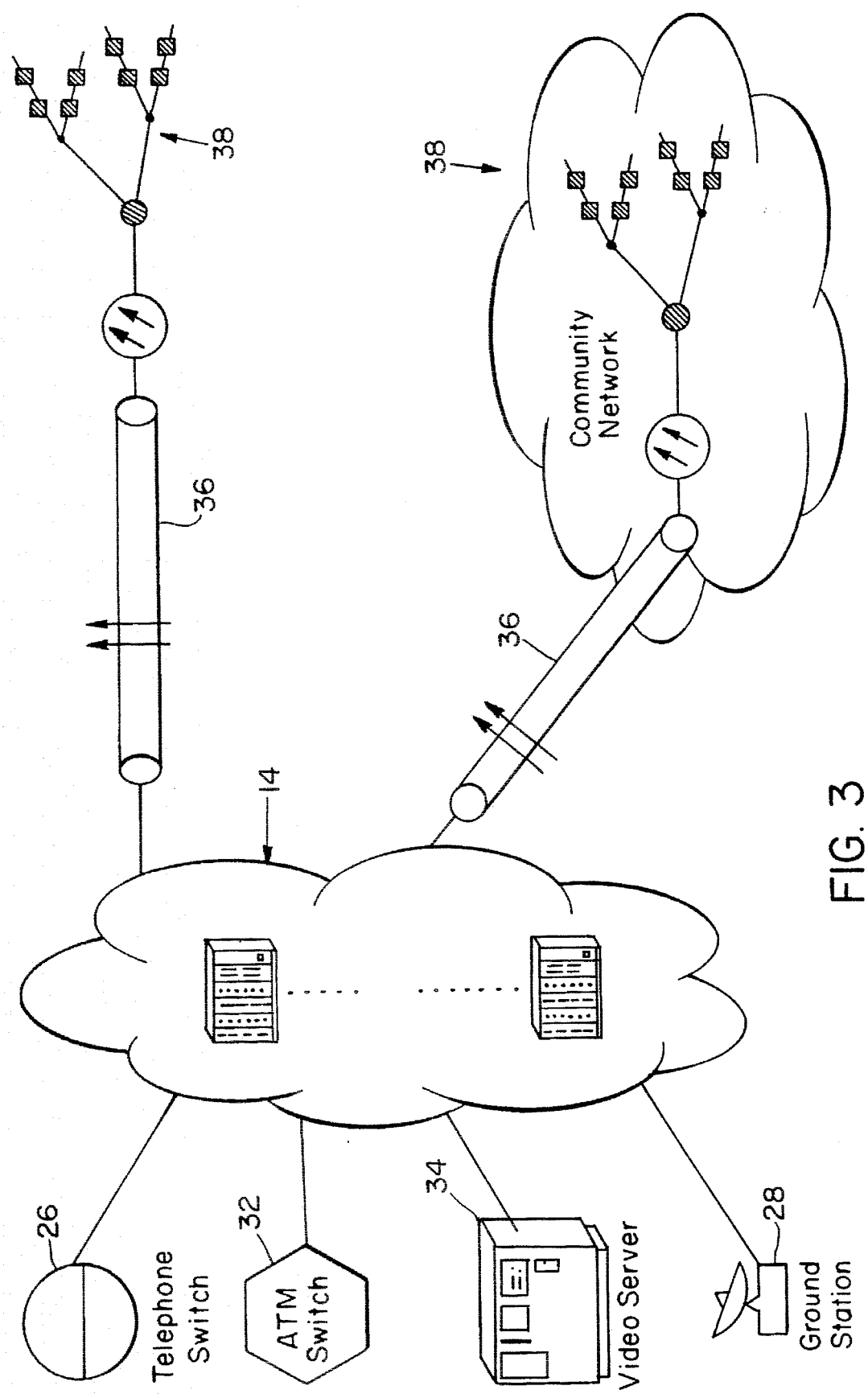
FIG. 3 is a schematic of a typical multimedia network configuration.

FIG. 3 shows a typical configuration of an SMN 14. The SMN 14 can provide interactive video, telephony, community area network, and wide area network services. For simplicity, only video and telephony services are shown in this example. Video services are provided by various video servers and through satellite ground stations. Telephony services are provided through standard telephone switches.

As shown in the figure, SMN 14 is connected on the Network side to either an ATM switch 32 for remote server access or to a video server 34 for local access. Regular broadcast video programs are received by satellite ground stations 28 and connected to SMN 14, either directly or through an asynchronous Transfer Mode (ATM) switch. Traffic for telephony services is connected to the appropriate telephone switch 26. Towards the end-user, services are provided to the customer 38 through existing fiber and cable infra-structure 36.

The physical block diagram of the SMN architecture is shown in FIG. 4. As outlined in an earlier section, the SMN consists of a number of shelves 30, interconnected by a vertical bus 61. Line cards are deployed in shelf slots.

Plug-ins used by the head-end switching application include: Bus Interface Unit (BIU) 40; the Video Trunk Unit (VTU) 44; the Telephony Trunk Unit (TTU) 46; the Cable Interface Unit (CIU) 48; the Reverse Channel Unit (RCU) 50; the OC-n line cards 52; the CCM 54 and the CPM 56 control units.

The VTUs, in combination with the CIUs, provide the interface between the fiber-based network distribution system and the cable-based loop distribution system. The function of the VTU is to retrieve individual Motion Picture Experts Group (MPEG) coded channels in the ATM stream from the network and to deliver the signal to the corresponding CIU. Each VTU can receive either MPEG-1 or MPEG-2 video channels for a total bandwidth of 6 MHZ. Each CIU can receive from a number of VTUs any combination of MPEG-1 and MPEG-2 streams, with a total bandwidth up to 27 MHz. The data stream is then coded as a 64 Quadrature Amplitude Modulation (QAM) signal by the CIU and placed into an analog video channel with a carrier frequency of 45.75 MHz and an analog audio channel with a carrier frequency at 41.25 MHz. These standard analog channels can then be interfaced to the standard cable equipment which performs the multiplexing and modulation functions.

2.7 Customer Premises Configuration

Figure 5:
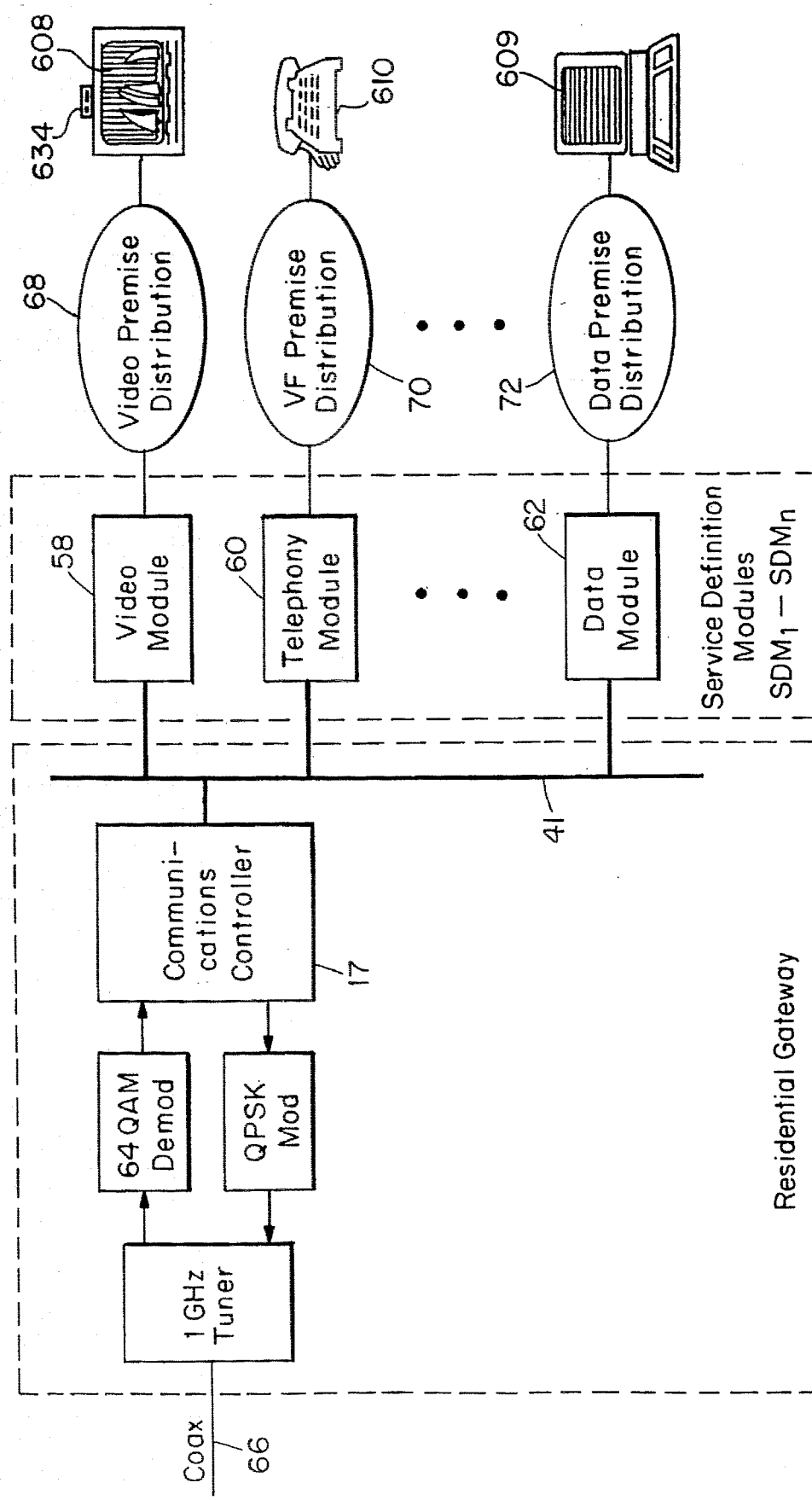
FIG. 5 is a block diagram of a customer premises equipment configuration.

The customer premises equipment consists of a Digital Set Top Box 634, a premises distribution network 68, 70, 72, and end-equipment such as a telephone 610, data terminal 609, and a television 608. FIG. 5 is a block diagram of the customer premises equipment configuration.

Data received from the coax cable 66 at RGW 16 is retrieved by the appropriate circuit and connected to an internal bus 41 by the communication controller 17. Based on required services, different service definition modules can be installed onto the bus 41. Data between the SDMs 58, 60, 62 and the end-equipment, either uni-directional or bi-directional, are transported via appropriate premises distribution networks 68, 70, 72. The following two sections describe the data transmission in more detail.

2.8 Downstream Data Transmission

Figure 6:
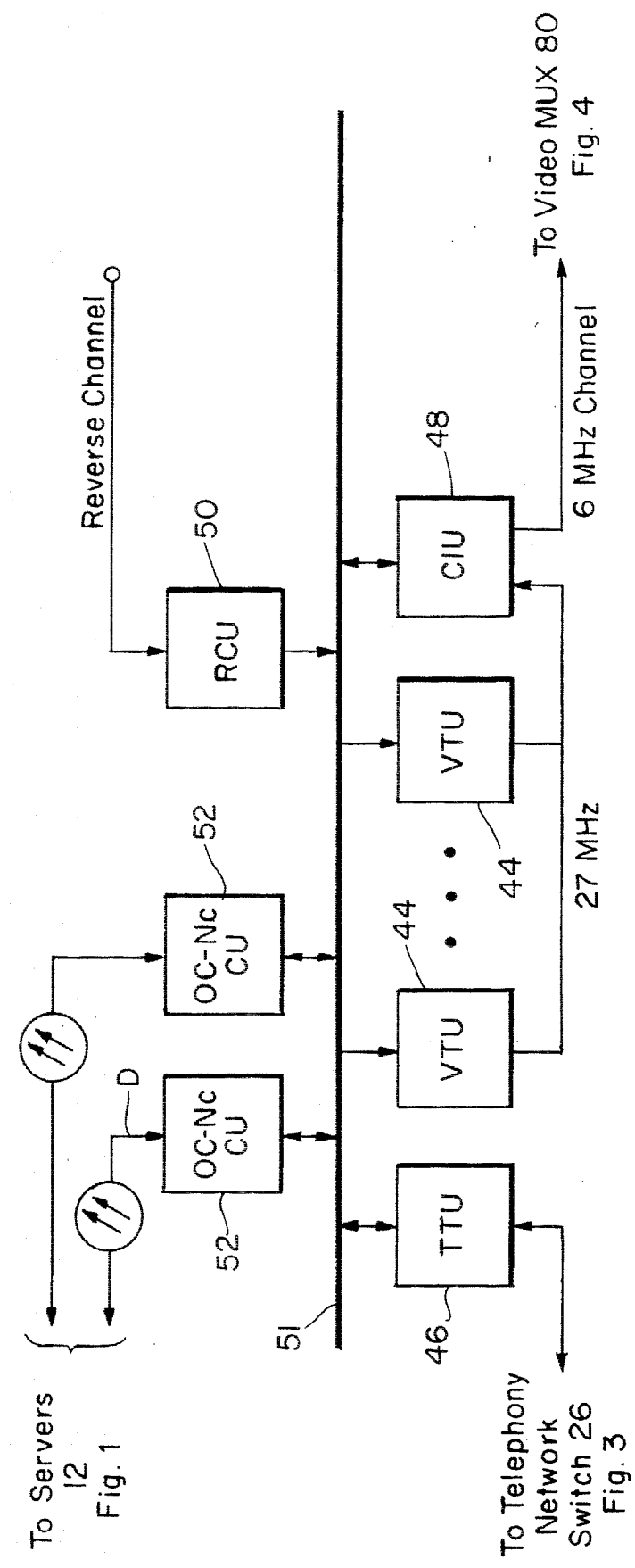
FIG. 6 is a block diagram of the U-Plane Architecture.

FIG. 6 shows the SMN switching fabric. In the downstream direction (Arrow D), MPEG coded video signals carried by ATM cells are received by the OC-Nc line cards 52 and converted to micro-cells on the bus. Controlled by the routing table in the CCM 54 (FIG. 4), the VTUs 44 retrieve individual video channels and pass the data to the assigned CIUs 48. The video data streams are then coded by the CIUs and transmitted to the head-end video multiplexer 80 (FIG. 4). The video multiplexer 80 inserts the data streams into appropriate Frequency Division Multiplex (FDM) channels which are distributed by coax to customer premises 18. By tuning to the corresponding channel, and by decoding the corresponding logical channel, the user terminal can re-construct the video and audio signals for the video services.

Downstream telephony services are distributed in a similar way: data from the network are received by the TTUs 46 and sent to the corresponding CIUs 48. Similar to the video signal distribution, data for telephony services are converted into a format compatible with standard cable distribution by the CIUs and transmitted to the end customer. An important difference between video service switching and telephony services switching is that packet cells are used to carry the video signals while TDM cells are used to carry the telephony traffic. This hybrid mode ensures maximum usage of system bandwidth and guarantees the delay and jitter performance critical to the telephone services.

2.9 Upstream Data Transmission

Upstream transmission is used to pass control information for the interactive video services, transmit telephony services towards the telephone network and carry end-user data for community and wide area network applications. Reverse channels for these applications require much greater bandwidth and much higher quality of transmission compared with the reverse channels used for current cable services.

To be compatible with existing cable services, the reverse channels should not occupy the frequency band used for current program distribution. Using the frequency band above 550 MHz is undesirable, due to higher distribution and equipment cost. Preferably the frequency band between 5 MHz and 35 MHz (which is unused today) is used to carry the reverse channels. To overcome the noise disruption typical of this frequency band, a spread spectrum technology is used to carry reverse channels. A Direct Sequence (DS) Code Division Multiple Access (CDMA) system is employed. To further increase the effective signal-to-noise ratio, forward error-correction based on a Reed-Solomon code is included in the transmission protocol.

At the head-end, a special tuner retrieves data from the 5–35 MHz frequency band and delivers the signal to the Reverse Channel Units (RCUs) 50. Individual user channels can be recovered by the RCUs with the pseudo-random sequences assigned by the CCM 54 (FIG. 4). User data can then be sent to the appropriate destinations such as the local telephony switch or the X.25 network via appropriate trunk interfaces.

2.10 Control Plane

Figure 7:
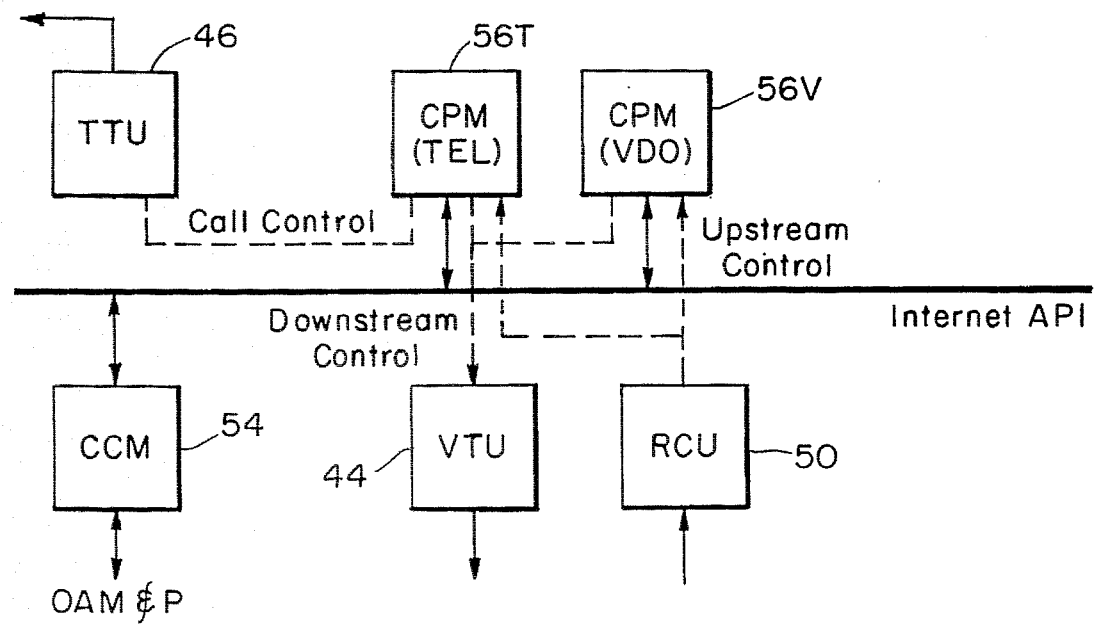
FIG. 7 is a block diagram of the C-Plane Architecture.

FIG. 7 shows the control plane architecture for the SMN. The control plane includes all control activities needed to support interactive video services and telephony services. In the downstream direction, control signals are broadcasted to all user terminals. Individual user terminals will respond to the control information destined to it via a higher level addressing system. Control signals from the TTU 46 in the upstream direction are carried by the RCU 50 and routed to either a VDO-CPM 56V or a TEL-CPM 56T. The VDO-CPM performs the translation between the IPE messages and the messages used by the user terminals for video services. Similarly, call control messages for the telephony services are translated into the IPE protocol by the TEL-CPM. Additional CPMs can be added to interface other signaling and control entities such as Level 1 Gateway, Video Server, etc. The function of the CCM 54 is to perform higher level system control functions and to provide the OAM&P interface supported by the service providers.

3.0 Communication Protocols

3.1 SMN Cell

Figure 8:
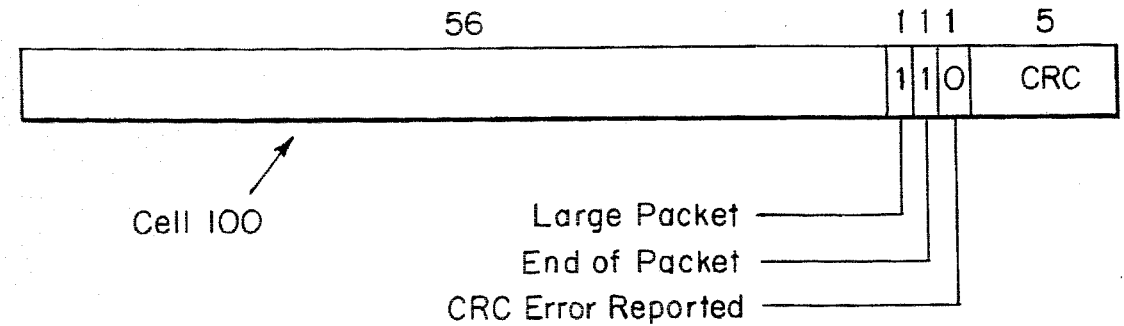
FIG. 8 is a representation of the service cell format used in the SMN communication protocol.

Every piece of data transported over the SMN backplane is made up of one or more 64-bit cells. The basic cell format is shown in FIG. 8. It consists of 56 bits defined by context and 8 fixed bits. Packets are made up of one or more consecutive cells 100. Any cell that is not part of a packet, i.e., an unused cell, has it's Large Packet bit and its End of Packet bit set to 0.

The 5 bit cyclic redundancy check (CRC) is used to identify failures in the system. These failures are used to initiate protection switching. The CRC is robust enough to identify random errors, as well as "stuck at 0" and "stuck at 1" faults on the system buses. When a CRC error is detected, generally an alarm is indicated but the error is not corrected. Correcting the error masks it from the rest of the system. By allowing the error to propagate through the system, all channel units that receive the cell are immediately aware of the failure, and can immediately activate protection switching. The CRC Error Reported bit is used to indicate that a previous channel unit detected the CRC error and reported it to a Network Management System (NMS). This prevents the NMS from being flooded with many reports for the same error.

3.2 Packet Formats

The SMN uses two packet formats, Small and Large. Small (TDM) Packets will have the Large Packet bit set to 0 and the End of Packet bit set to 1. Large packets will have the Large Packet bit set to 1. The End Of Packet bit is set to 0 except for the last cell of the packet, which will have the End Of Packet bit set to 1. Small (TDM) packets may interrupt Large Packets at any time. Large Packets may not be interrupted by unused cells. In the BIC circuit, it is required that at least 3 unused cells (or cells destined for another channel unit) occur between Large Packets destined for any given channel unit. There is no such restriction on Small Packets. They may occur at any time.

Figure 9:
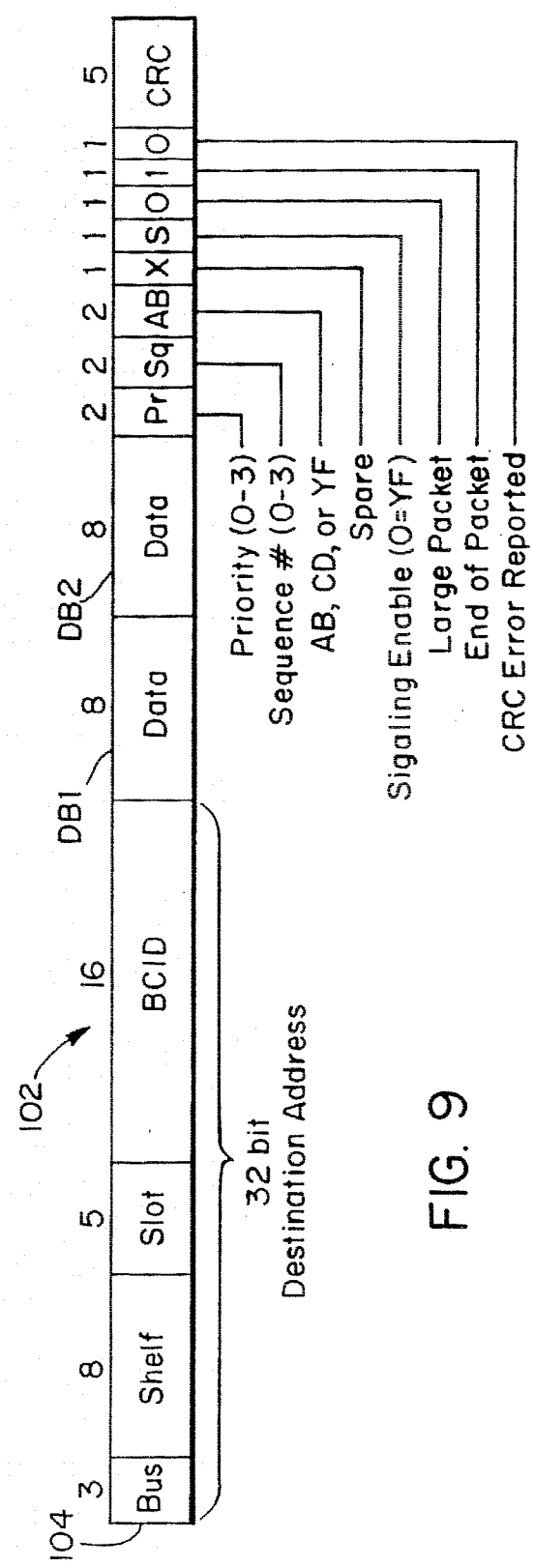
FIG. 9 is a representation of the Small Packet Cell Format.

FIG. 9 details the Small Packet format. Small packets 102 consist of one 64-bit cell 104 and hold exactly two data bytes DB1, DB2. Small packets are intended for voice and other delay sensitive connections. Large packets use a minimum of two cells, and can hold any number of data bytes.

The first 32 bits of the cell specify the destination address for the packet and comprises Bus, Shelf, Slot, and Backplane Circuit Identifier (BCID) fields. The 3 bit Bus field identifies one of 8 vertical buses. The 8 bit Shelf field identifies one of 250 hardware shelves. (Shelf numbers from 250 to 255 are reserved). The 5 bit Slot field identifies the channel unit slot in the shelf. The least significant 6 bits of the 16 bit BCID field are used to identify the destination port on the channel unit.

The next 16 bits in the small packet after the destination address contain the two data bytes DB1, DB2. Following this is a 2 bit priority contention field. Any contention mechanisms or queuing are sensitive to priority. Higher priority packets are serviced first, thus having shorter delays. Since delay is critical for TDM circuits, they will be set to priority 3. Since they are fixed bandwidth connections, giving them top priority will not allow them to overload the bus. Following the priority field is a 2 bit sequence number field. Sequence numbers increment from 0 to 3 and repeat. They are used to align data, if necessary, from multiple channels.

The next 2 bits of the Small Packet are the AB/CD/YF bits. These bits have multiple uses. When the Signaling Enable bit is a 0, the AB/CD/YF bits are defined as the Y and F bits. When the Signaling Enable bit is a 1, the AB/CD/YF bits are defined as signaling bits. These signaling bits are A and B if the LSB of the sequence number is 0, and C and D if the LSB of the sequence number is 1. The BIC 202, 202' (FIG. 12) places no interpretation on these bits, nor does it ever modify them. It simply transports them.

Figure 10A:
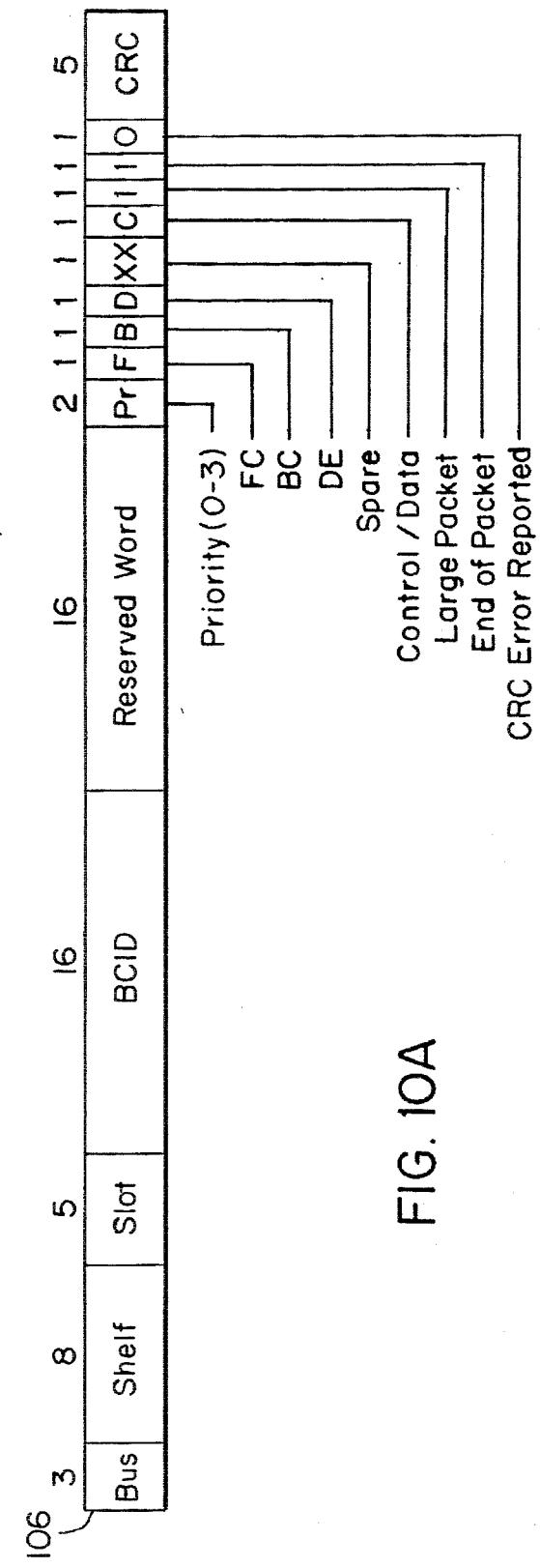
FIG. 10A is a representation of the first cell of the Large Packet Cell Format.
Figure 10B:
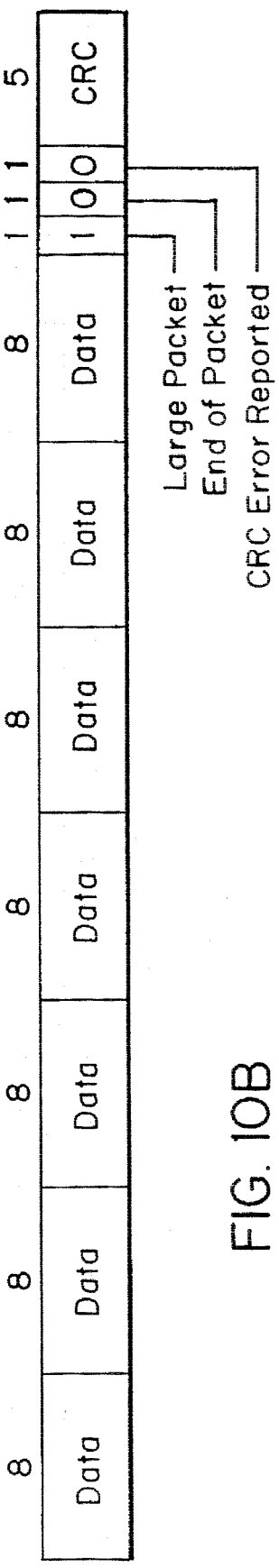
FIG. 10B is a representation of a data byte cell of the Large Packet Cell Format.
Figure 10C:
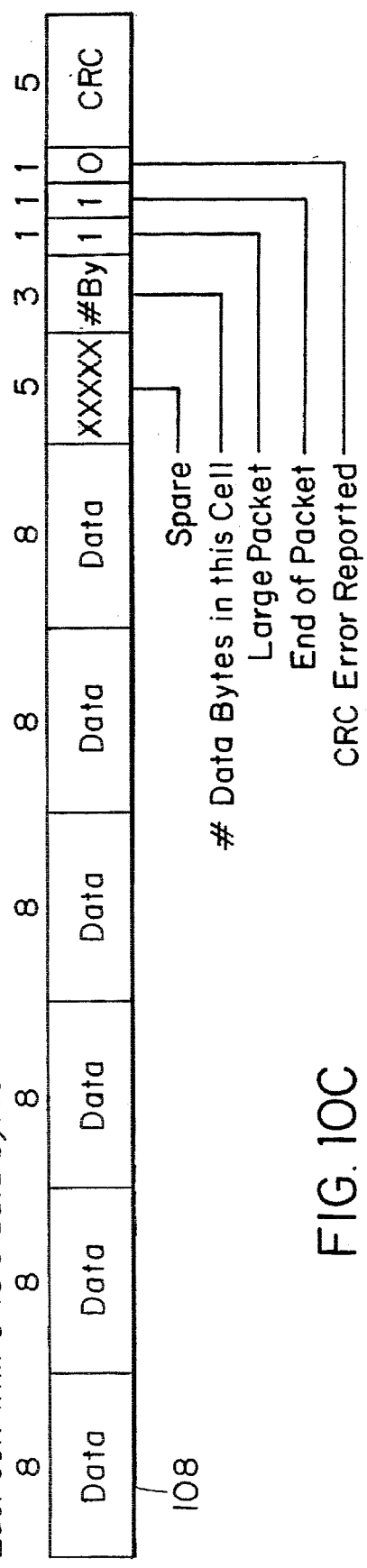
FIG. 10C is a representation of the last cell of the Large Packet Cell Format.

FIGS. 10A-10C shows the large packet format. Large packets use a minimum of two cells 106 and 108 and can hold any number of data bytes. Notice that the first cell 106 is almost identical to the small packet cell 102. The Large Packet bit is set to 1 to indicate a large packet. The 16 bit data bytes are replaced with a Reserved Word. This field is reserved for future use to specify protocol type or source routing information. The 16 bit BCID byte also has a slightly different meaning. Instead of directly specifying a port, it does so, indirectly. The 16-bit BCID is used as an index into a table in the destination channel unit. There can be up to 65,536 entries in this table. Each entry contains the actual port and a Virtual Circuit Identifier (VCI) to which the packet is sent. In this manner, the SMN supports multiple virtual circuits on a single physical port. This provides tremendous flexibility. All 65,536 BCIDs can point to a single port, or they can be spread out over the 64 maximum ports.

As an example, refer to the table below. In this case, BCID 1,2,3 and 4 are all sent to port 27, but with different VCIs. If this had been a TDM packet, BCID 1 would have been sent to port 1 with no VCI.

| BCID | PORT | VCI |
|------|------|-----|
| 0    | 12   | 10  |
| 1    | 27   | 0   |
| 2    | 27   | 1   |
| 3    | 27   | 2   |
| 4    | 27   | 3   |

After the reserved word is the Large Packet priority field which ranges from 3 (highest) to 0 (lowest). Higher priority Large Packets are serviced first when there are no Small Packets to service.

Next are the Forward Congestion bit (FC) and the Backward Congestion (BC) bits. These bits are normally used to indicate congestion for packets traveling in the same (FC) and reverse (BC) direction as the packet. The U2B BIC 202 normally gets these bits from the user port and passes them to the horizontal bus. The B2U BIC 202' then passes them from the horizontal bus back to its user port. The BIC 202, 202' will never modify these bits on its own. Under processor control, either or both of these bits can be forced ON for all packets passing through the BIC 202, 202'. This capability is available in both B2U and U2B BICs. The U2B BIC 202 has the additional capability to force these bits ON on a Port/VCI basis. The BIC will never clear these bits, if they are already set.

Next is the Discard Eligibility (DE) bit. This bit is normally used to indicate this packet may be discarded under congestion conditions in preference to packets that do not have this bit set. The U2B BIC 202 normally gets this bit from the user port and passes it to the bus. The B2U BIC 202' then passes it from the bus back to its user port. Under processor control, the B2U BIC 202' can force this bit ON for all packets passing through it. The B2U BIC 202' can also automatically start discarding packets with the DE bit set when its free buffer memory drops below a programmable threshold. The U2B BIC 202 can, on a per Port/VCI basis, be programmed to set the DE bit on all packets on that Port/VCI or to discard all packets on that port/VCI that already have the DE bit set. Neither BIC 202, 202' will ever clear the DE bit if it is already set.

The remaining cells of the large packet hold data bytes. Each cell except the last holds 7 data bytes as shown in FIG. 10B. The last cell 108 of the packet holds 0 to 6 data bytes, depending on the packet length as illustrated in FIG. 10C. A byte count field of 3 bits in the last cell records the number of actual bytes in that cell.

3.3 Broadcast and Multicast Cell Addressing

The SMN cell addressing format supports point-to-point, broadcast and multicast switching. For point-to-point traffic, the BIU 40 (FIGS. 11A–11D) captures cells destined for its shelf from the vertical bus and distributes the cells onto the horizontal bus. The B2U BIC 202' circuit on the receiving channel unit passes the cell with the correct slot number to the channel unit. As long as the slot number matches, the B2U BIC 202' circuit ignores the shelf number of the cell. For broadcast traffic, the shelf numbers on the cells are set to 255, 253 or 252. The BIUs will pass all cells with these shelf addresses from the vertical bus to the horizontal bus. The B2U BIC 202' circuit will pass cells with shelf number 255, 253 or 252 to the channel unit, regardless of the slot number.

The SMN architecture employs a multicast group which consists of a root and any number of end-points, connected by a communications network. A multicast network is uni-directional. In the downstream direction, data sent by the root is received by all end points. There is no direct connection between any two end points in a multicast group. Multicast is an important application of multimedia networking. An example of multicast is news broadcast. To be viewed by many viewers simultaneously, the content of the same program needs to be distributed to a large number of different destinations.

Multicast has always been a challenge for switching design. Within a traditional packet switch, multicast must be accomplished via packet regeneration. To multicast to a group of destinations, multiple copies of the same data are generated, one for each end point. The greatest weakness of this method is the inefficient use of system bandwidth. The regeneration of multiple copies of multicast data deprives the system of otherwise available bandwidth. This drawback limits the ability to use traditional switches in multicast broadband applications.

As mentioned earlier, the bus architecture used by SMN is based on a distributed broadcast switching architecture. This architecture makes SMN ideally suited for multicast applications. Multicast traffic in SMN is carried with special multicast cells. All cells carrying multicast traffic will have the bus number set to 0, shelf number set to 254 and slot number set to 0. Each multicast group is identified by a unique group number. The group number is provisioned by the CCM for all destination channel units within the group. A total of 250 multicast groups are supported per system. Within each multicast group, only one copy of the data is sent over the system bus, which is received by all units in the group. This method provides for very efficient use of the system bandwidth.

At the output side of the B2U BIC 202', packet data destined for different channels are identified by the Port/VCI number, derived from the cell BCID number via a lookup table. For TDM data, the destination port number is the same as the cell BCID number. The following method of BCID assignment avoids potential conflict of BCIDs on channel units supporting both point-to-point and multicast traffic:

1. The BCID field of multicast cells carries the multicast group number. Multicast group numbers range from 1 through 250. BCID 0 is reserved for control packets.
2. Point-to-point packet cells avoid using BCID 0 through 250.
3. Each channel unit has a multicast table which identifies the multicast group number to Port/VCI mapping for packet traffic and the multicast group number to Port mapping for TDM traffic.

In the transmit direction, multicast data is sent out in the same way as point-to-point data. The CCM has the responsibility to provision the U2B BIC transmit table so that the Port/VCI carrying multicast cells are mapped into Bus 0, Shelf 254, Slot 0 and the BCID number equal to the multicast group number. To support multicast in the receive direction, a channel unit receives the following three types of cells: point-to-point cells with matching Bus/Shelf/Slot number; multicast cells with matching multicast group number (shelf 254); broadcast cells (shelf 252, 253 or 255).

An option for distributing multicast cells is to broadcast multicast cells to all shelves, in which case the BIU copies all cells destined for shelf 254 from the vertical bus to the horizontal bus. The bandwidth of the horizontal bus can easily be exceeded with this arrangement. Another option is to have the BIU perform the filtering function, in which case the BIU forwards only multicast cells with group numbers destined for channel units on the shelf. While more efficient in bandwidth usage, this latter method does complicate the BIU design.

Some applications may require multicasting to more than one logical or physical destination on the same channel unit. Under the tiered bus architecture, a single copy of data is delivered to the channel unit via the tier-0 bus, either with point-to-point cells or multipoint cells. It is the responsibility of the channel unit to deliver the single copy of data to multiple end-users. The actual channel unit multicast mechanism is dependent on both the application and the specific physical and logical interface.

4.0 The Bus Interface Unit (BIU)

Figure 11A:
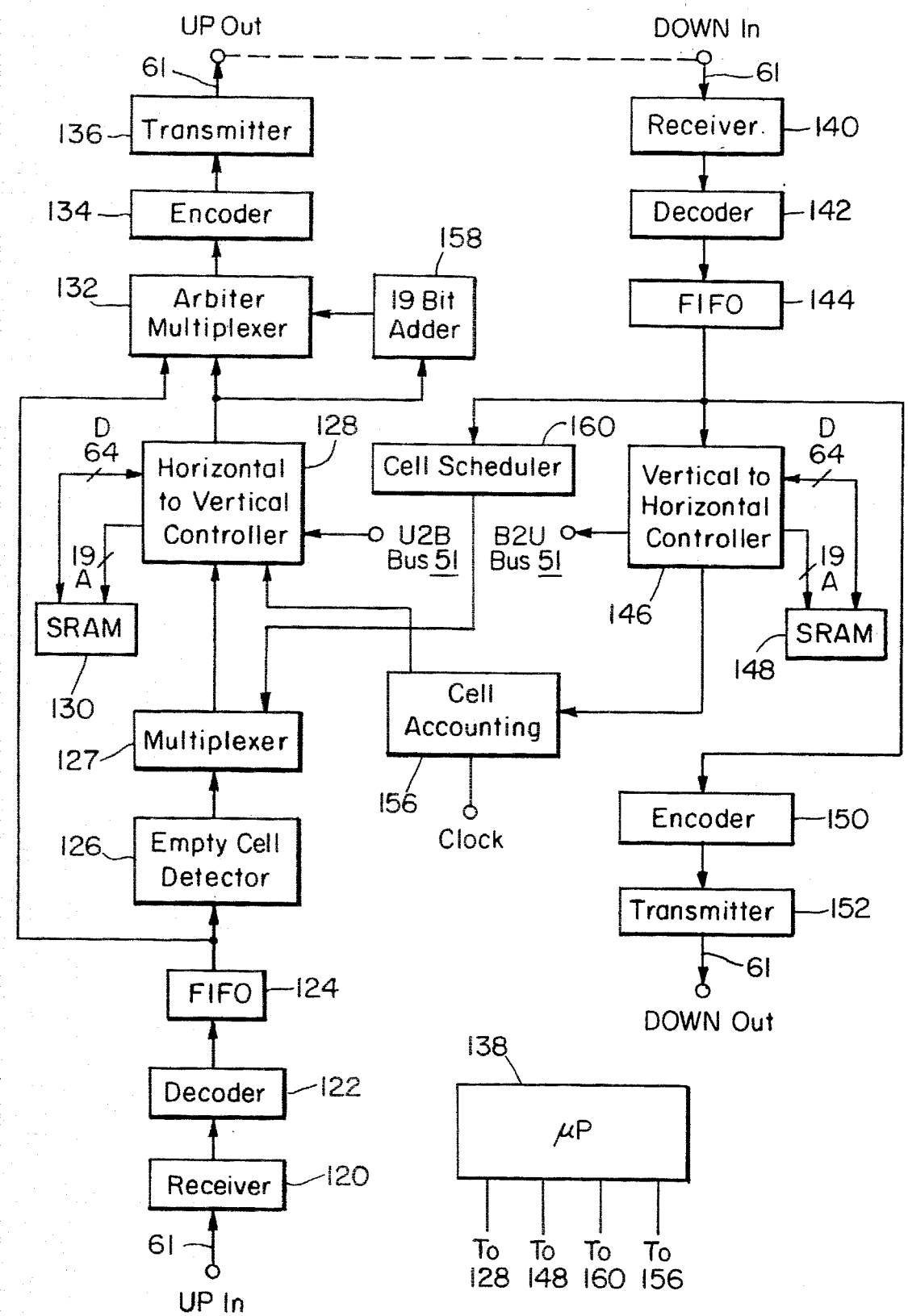
FIG. 11A is a block diagram of the Bus Interface Unit.
Figure 26:
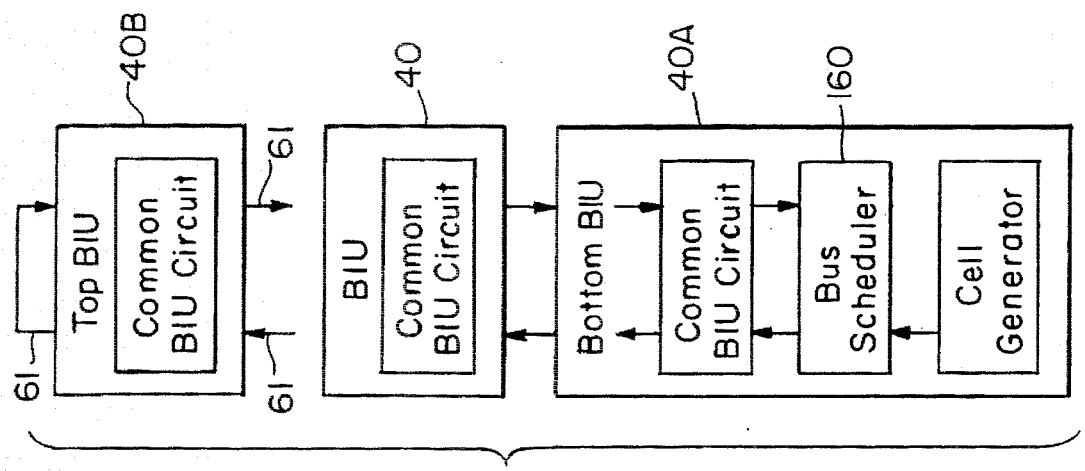
FIG. 26 is a schematic block diagram of the BIU configuration on the tier-1 bus.

FIG. 11A illustrates a typical Bus Interface Unit BIU 40. BIU 40 interfaces a Tier-1 or vertical bus 61 to a Tier-0 or horizontal bus 51. A plurality of BIU 40s are connected to vertical bus 61 in a daisy-chain fashion as shown in FIG. 26. Each BIU is connected to the respective upward and downward paths of the Tier-1 vertical bus 61. The upward path "UP OUT" of the Tier-1 vertical bus 61 is looped (as indicated by dotted lines) to the downward path "DOWN IN" if the particular BIU is located in the top shelf of the system ("top BIU"). Data is written to the upward path of the Tier 1 bus at "UP OUT" and read from the "DOWN IN" path of the Tier 1 bus. Signals from an upstream BIU are received on the upward bus at receiver 120 operating at a 1 Gb/s data rate. Receiver 120 outputs a 20 bit parallel signal to decoder 122. Decoder 122 decodes the input signal and outputs a 32-bit parallel signal to First-In First-Out circuit FIFO 124. FIFO 124 performs a retiming function on the signal. The output of FIFO 124 is fed to an empty cell detector 126 and also to arbiter multiplexer 132. If the BIU 40 has no pending requests from its associated tier 0 horizontal bus 51, then the signal from FIFO 124 is passed through arbiter multiplexer 132 unchanged to encoder 134. Encoder 134 encodes the received data into a 20-bit signal for 1 Gb/s transmitter 136. Transmitter 136 places the signal on the upward path of the Tier 1-bus.

In the case where BIU 40 has pending requests to write to the upward path of the bus, a Tier-1 contention method is implemented. For each new packet from the tier 0 bus queued in horizontal to vertical controller 128, the requested number of cells is added to a request cell at the same priority through adder 158. The modified request cell output from adder 158 is output to arbiter multiplexer 132. If empty cell detector 126 detects an empty cell and the BIU 40 has pending packet requests from Tier 0 bus at the same priority as the empty cell, the horizontal to vertical controller 128 writes packet data into the empty cell. The data cell passes through the arbiter multiplexer 132 and encoder 134 to transmitter 136 which places the data signal on the upward vertical bus to the next BIU.

Figure 11B:
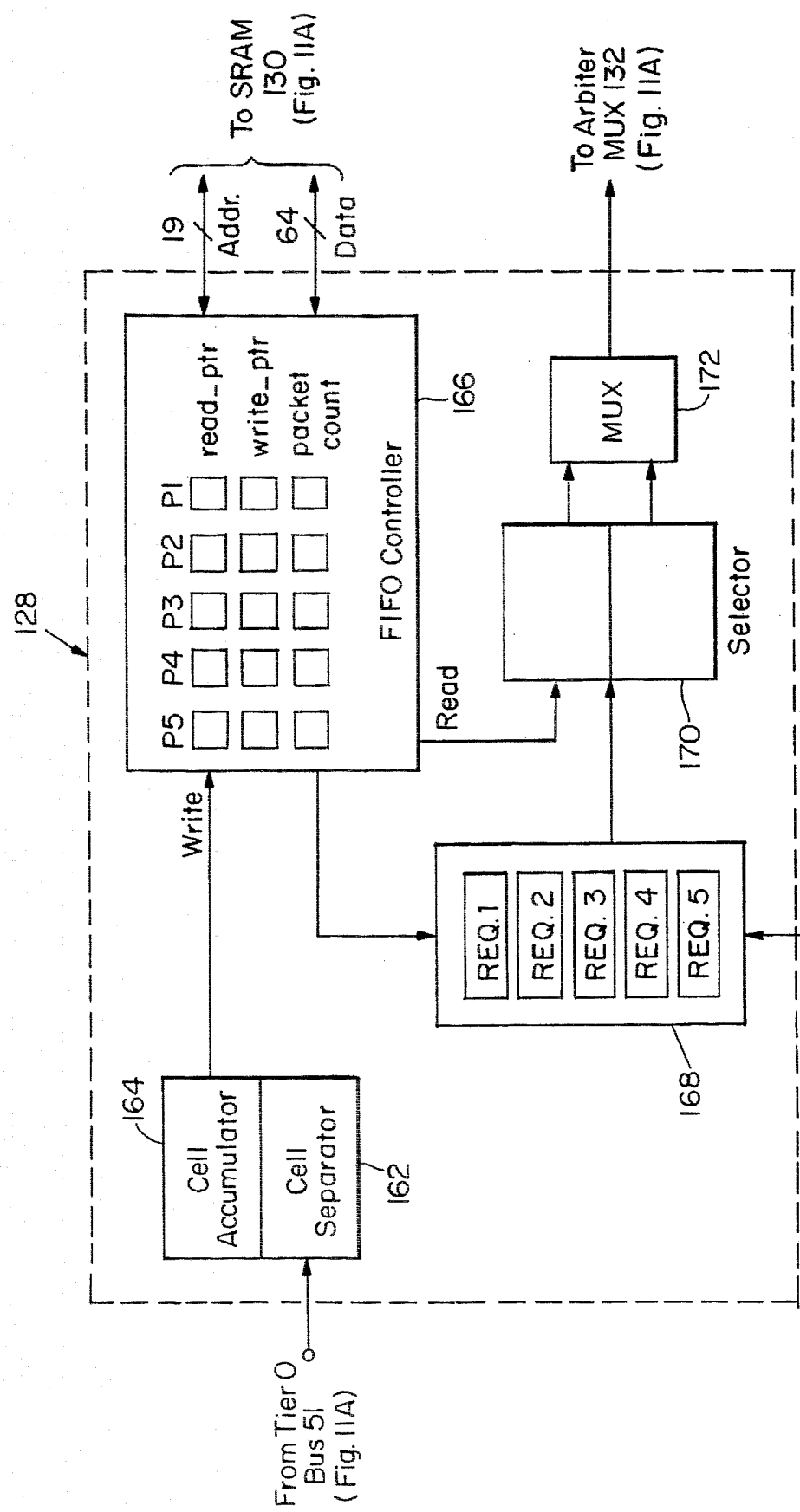
FIG. 11B is a block diagram of the horizontal to vertical controller section of the BIU of FIG. 11A.

FIG. 11B is a schematic block diagram of the horizontal to vertical controller 128. Data from the Tier-0 horizontal bus is received in cell separator 162. Cell separator 162 separates cells into cell accumulator 164 by identifying the priority level of the packet. FIFO controller 166 maintains three registers for each of the five priority levels P1–P5. The read pointer register R1 and the write pointer register R2 are associated at each priority level with a packet stored in a static RAM (SRAM) 130. A packet count register R3 at each priority maintains a count of the number of outstanding packets in the queue. The SRAM 130 may be a 64-bit by 64,000 word by 5 priority level device. Sixty-four bit cells from cell accumulator 164 are written to and read from SRAM 130 under control of the FIFO controller 166. Sixty-four bit cells are read from the SRAM into selector 170 and are multiplexed by multiplexer 172 onto the 32-bit bus leading to arbiter multiplexer 132 (see FIG. 11A). Packet requests are accumulated for each priority in request registers REQ1–REQ5 located in request accumulator 168. If empty cell detector 126 (FIG. 11A) determines that a request cell is present, the count of request register at that request cell priority is output to the selector 170 and multiplexed onto the 32-bit bus by multiplexer 172 to arbiter multiplexer 132.

Figure 11C:
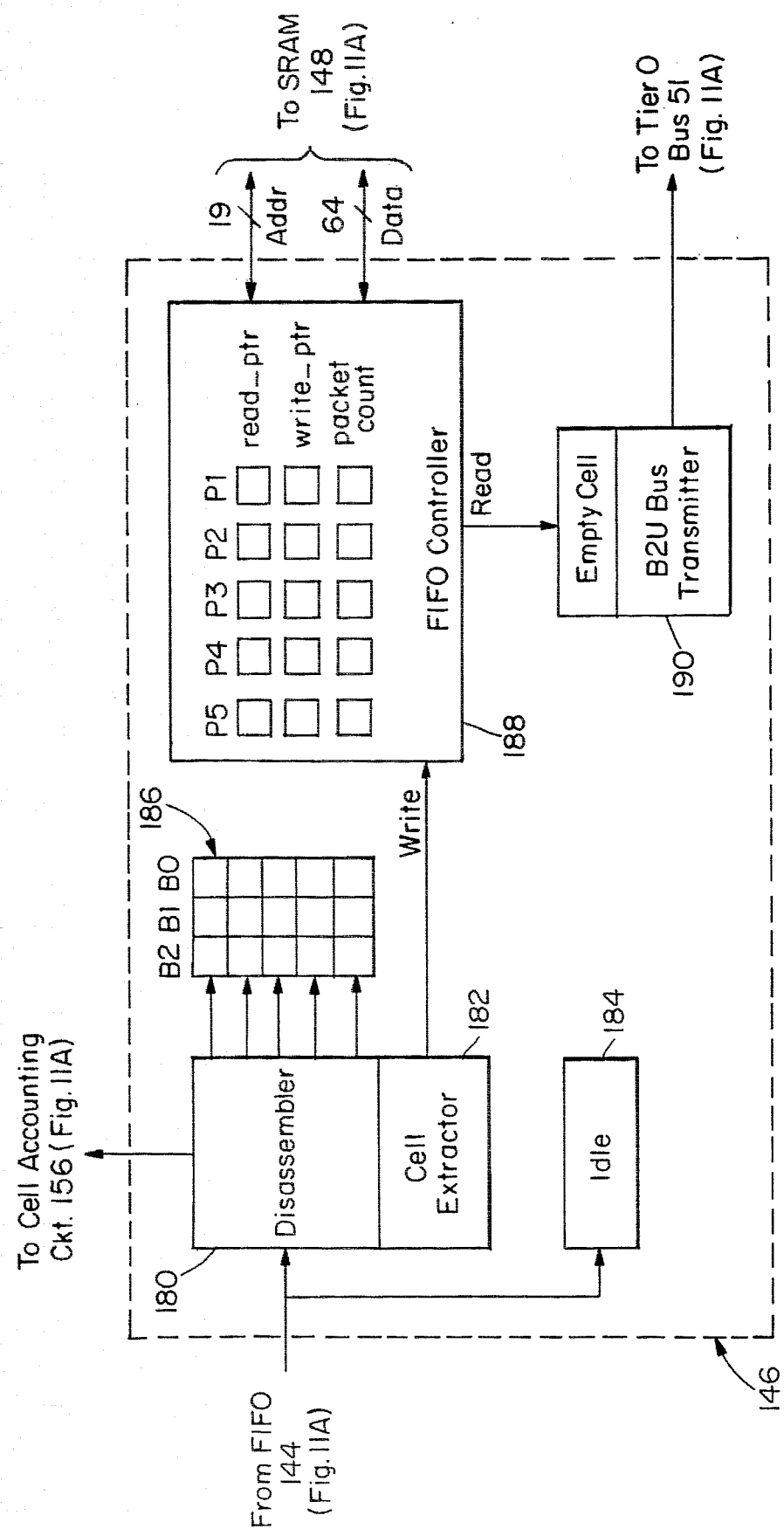
FIG. 11C is a block diagram of the vertical to horizontal controller section of the BIU of FIG. 11A.
Figure 11D:
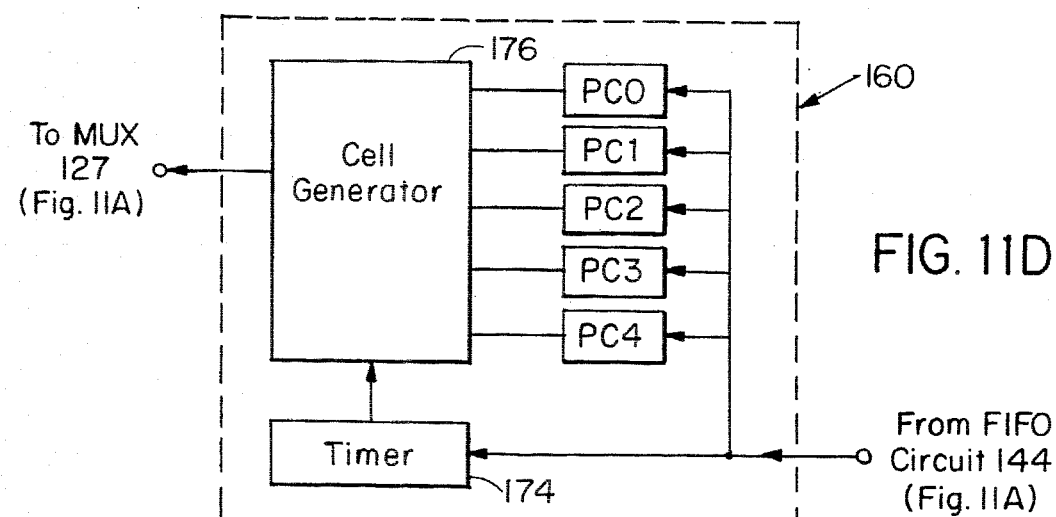
FIG. 11D is a block diagram of the cell scheduler and generator section of the BIU of FIG. 11A.

If BIU 40 is the bottom BIU in a chain, the cell generator and scheduler function 160 shown in detail in FIG. 11D implements the contention method for the Tier-1 bus. Cell scheduler and generator 160 examines cells received on the downward bus 61 (FIG. 11A) and routes request cell counts of each of the five different priority levels to each of the five counters (PC0–PC4). The five counters PC0–PC4 determine according to the contention method the next request cell for that priority level and also the number of empty cells to generate on the upward bus 61 at that priority level. The cell generator 176 will generate the number of empty cells in the request counter at the highest priority level and then generate another request cell at that priority level. The cell generator 176 will then generate empty cells at the next highest priority level and a request cell at that priority level in accordance with the method. The cells are output to mux 127 (FIG. 11A) which multiplexes the cell generator 160 and empty cell detector 126 outputs into horizontal to vertical controller 128. Timer 174 resets cell generator 176 when a request cell has not returned to the bottom BIU after a set number of clock cycles.

Returning to FIG. 11A, data from the downward bus 61 is received by receiver 140 operating at 1 Gb/s. The 20 bit parallel data signal output of receiver 140 connects to a decoder 142 which decodes the signal to a 32-bit signal and is input to FIFO 144. FIFO 144 outputs a 32-bit signal to the vertical to horizontal controller 146 and to encoder 150. Encoder 150 outputs a 20-bit signal to the transmitter 152 which sends the signal onto the downward 61 bus to a downstream BIU. The function of the vertical to horizontal controller 146 is to read data from the downward vertical bus and to send it on the Tier-0 horizontal bus 51.

FIG. 11C is a schematic block diagram of the vertical to horizontal controller 146. Data on the downward vertical bus from FIFO 144 is received by disassembler 180. Disassembler 180 provides a 3-bit output to cell accounting circuit 156. Disassembler 180 unscrambles message priority levels to the disassembler priority stack 186. The output of the disassembler comprises reconstructed cells that are extracted by cell extractor 182 and written to an SRAM 148 under control of FIFO controller 188. Idle cell detector detects the presence of idle cells for asynchronous timing. The SRAM 148 is a 64-bit by 64,000 word by 5 priority level device. Data is read from the SRAM 148 into a bus transmitter 190. Bus transmitter 190 transmits data onto the Tier-0 horizontal bus.

4.1 Tier-1 Bus Contention

A contention mechanism is needed to insure fair access to the upward going vertical bus 61. This is because 250 shelves are all feeding a single 1 Gbit/s upward Tier-1 vertical bus.

There are 4 types of cells on the tier-1 bus; Payload, Empty, Request, and Idle. The Payload, Empty, and Request cells are subdivided into 5 priorities, as defined in the following table:

| | | Cell Types | | |
| --- | --- | --- | --- | --- |
| Priority Level | Kind of Cell | Payload | Empty | Request |
| Priority 4 | TDM | P4 | E4 | R4 |
| Priority 3 | Packet | P3 | E3 | R3 |
| Priority 2 | Packet | P2 | E2 | R2 |
| Priority 1 | Packet | P1 | E1 | R1 |
| Priority 0 | Packet | P0 | E0 | R0 |

Both Empty and Request cells are identified as having both Large Packet field=0 and End of Packet field=0 (FIG. 8).

Figure 32:
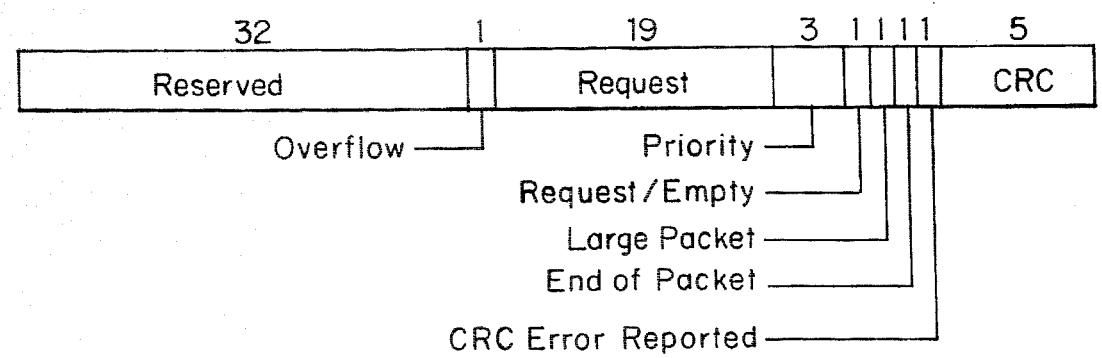
FIG. 32 is a representation of the tier-1 bus request/empty cell format.

FIG. 32 illustrates the cell format used for transmitting request cells and empty cells on the Tier-1 bus. The 32 most significant bits are a reserved word for future use. The next bit is a one-bit overflow field. Following the overflow field is a 19 bit request field which carries the request information from each of the BIUs on the Tier-1 bus. Next is a three-bit priority field which is used to indicate one of the five priority levels. The next field is comprised of one bit which indicates whether the cell is an empty cell or a request cell. Next is a one-bit large packet field indicating the presence of a large packet, followed by a one-bit End of Packet Field. The remaining fields are a one bit CRC error reported field indicating a CRC error and a five bit CRC field used as a cyclic redundancy check.

The mechanism of idle cell generation and removal at each BIU is an upper layer-1 function. For payload cells, the 'CRC Error Reported' field in the tier-0 cells is redefined for tier-1 cells as the 'Start of Packet' bit. This bit is set to '1' for the first cell of a large packet. This bit is set to '0' for all other types of cells.

The Tier-1 bus is an asynchronous bus. The receiver of each unit on the Tier-1 bus is slave-timed to the previous unit's transmitter (see FIG. 11A). The transmitter of each unit is controlled by an on-board timing source. To allow for timing deviation among crystal oscillators of a unit and the adjacent units, a periodic 'breathing gap' which consists of idle cells is required in the tier-1 bus data stream.

Priority-4 (TDM) data are required to have low delay and low jitter. Requirements for lower priority (packet) data emphasizes the bandwidth efficiency. The characteristic of priority-4 cells differs from the other Priorities in that priority-4 cells are self-contained. Each cell is an independent entity. Priority-4 cells from different source/destination pairs can be intermixed. Lower priority cells, on the other hand, require the combination of all cells in the packet before the packet can be reassembled. Packet cells of the same priority with different source/destination pairs cannot be intermixed. Two slightly different contention mechanisms, therefore, are implemented, one for TDM cells and one for packet cells.

Each of the five priority levels is controlled by a Request Cell. Request Cells travel through the tier-1 bus, collect request information from each channel unit, and report the total number of requested cells to the bottom BIU. Based on the contention mechanism, and based on the value of Request Cells of every priority, the bottom BIU schedules the bus usage. The contention mechanism is detailed in the following sections.

The BIU configuration on the tier-1 bus is shown in FIG. 26. In addition to performing standard BIU functions, the bottom BIU 40A also has the responsibility for cell generation and bus scheduling (see also FIG. 11D). For each 125 μs-block, the cell generator 160 generates a priority-4 Request Cell, followed by 64 E4 Cells. This pattern repeats 24 times, to form a total of 1,560 cells. The 1,560 cells are then followed by exactly 2.5 idle cells.

A BIU has five priority queues. When at least one complete packet is collected in a priority queue, the BIU 40 calculates the number of cells required to transmit the packet(s) and adds the number to the next corresponding Request Cell in the upward direction. This new value is then passed to the next BIU. The bottom BIU 40A maintains five separate priority counters (PC4 - PC0), (FIG. 11D), one for each level of priority. The bottom BIU 40A detects each Request Cell and adds the value in the Request Cell to the corresponding priority counter.

At the beginning of the upward data stream, all empty cells are designated E4 cells. If the value of the PC4 counter is not zero, the bottom BIU 40A lets corresponding E4 cells pass while for each passing E4 cell, the PC4 counter will be decremented by one. This process continues until PC4 counter reaches 0. The BIU then examines the content of the PC3 counter, if the value of the PC3 counter is not zero. The bottom BIU 40A replaces the following E4 cell with an E3 cell and decrements the PC3 counter by one. This process continues until the value of PC3 reaches 0. If, during PC3 counter processing, PC4 counter has a value greater than 0, the BIU immediately suspends PC3 counter processing and starts processing the PC4 counter by passing the E4 cells.

Similarly, if both the PC4 and PC3 counters are zero, the BIU starts PC2 counter processing, and so on. The basic procedure is that on a cell-by-cell basis, the highest priority counter should be processed first. This effectively allows higher-priority cells to interrupt lower priority cells. This method guarantees that for packet cell requests, exact number of empty cells will be allocated by the bottom BIU 40A for each priority. For TDM cell requests, at least enough cells will be reserved by the bottom BIU 40A. All unused empty cells are also available for carrying TDM traffic. Note that cells generated by PC2 are E2 cells, cells generated by PC3 are E3 cells, etc. When all counter values are zero, E4 cells will be sent upwards to the bus uninterrupted. As mentioned earlier, TDM request cells are continuously generated by the bottom BIU Cell generator, once every 64 cells. The content of the received Request Cell will be added to the PC4 counter by the bottom BIU 40A.

At any point of time, no more than one Request Cell exists for each packet priority. For each Request Cell received in the downward direction, a new Request Cell of the same priority needs to be regenerated in the upward direction. A new Request Cell is generated after a request cell is received, its content shifted to the Priority Counter, and after the Priority Counter reaches zero. If the received Request Cell is empty, a new one will be generated immediately. If the received Request Cell is non-empty, a new one will not be generated until the necessary number of empty cells are generated. Request Cell generation is done by replacing an E4 cell.

All units write data in the upward direction and read data in the downward direction. For each priority, after generating cell requests through a Request Cell, the BIU 40 monitors all cells in the upward direction. When an empty cell of equal priority is detected, the BIU 40 immediately replaces the empty cell with a payload cell of the same priority. Due to the deterministic nature of the cell scheduler, no cell buffering is necessary. Note that all five priority queues are processed simultaneously and independently.

The SMN does not allow priority packet interruption at the tier-0 bus. As a result, there is no way to distinguish a cell carrying the beginning of a packet and a cell carrying the middle of a packet at the tier-0 bus. To support packet interruption on the tier-1 bus, the 'CRC Error Reported' field in the tier-0 cells is redefined as the 'Start of Packet' bit. This bit is set to '1' for the first cell of a large packet. This bit is set to '0' for all other types of cells. With the Start of Packet bit, TDM cells, cells carrying the start of a packet, cells carrying the end of a packet, and cells carrying the middle of a packet can be uniquely identified.

To reconstruct packets with nested priority interruption, the BIU needs five receive queues, one for each packet priority. A multiplexer controlled by a state machine and a four-level stack directs incoming cells to the corresponding receive queue.

The bottom BIU 40A should monitor the occurrence of all Request Cells. For each priority, if a Request Cell is not detected after a predetermined amount of time, a new Request Cell of equal priority is generated. This also allows the first set of Request Cells to be generated on system start-up.

The system generates more Priority 4 cells than is required, therefore, a Request Cell counter error condition has no long-term effect. For lower priority cells, the system reserves the exact amount of cells required for transmission. If an insufficient number of empty cells are reserved, the error condition will remain. The error condition can be recovered, based on the fact that by the time a new Request Cell reaches the BIU in the upward direction, all previous requested packets should have already been sent. By flushing out all un-sent packets from the previously request, the error condition will be cleared.

5.0 The Channel Units and BICs

Figure 12:
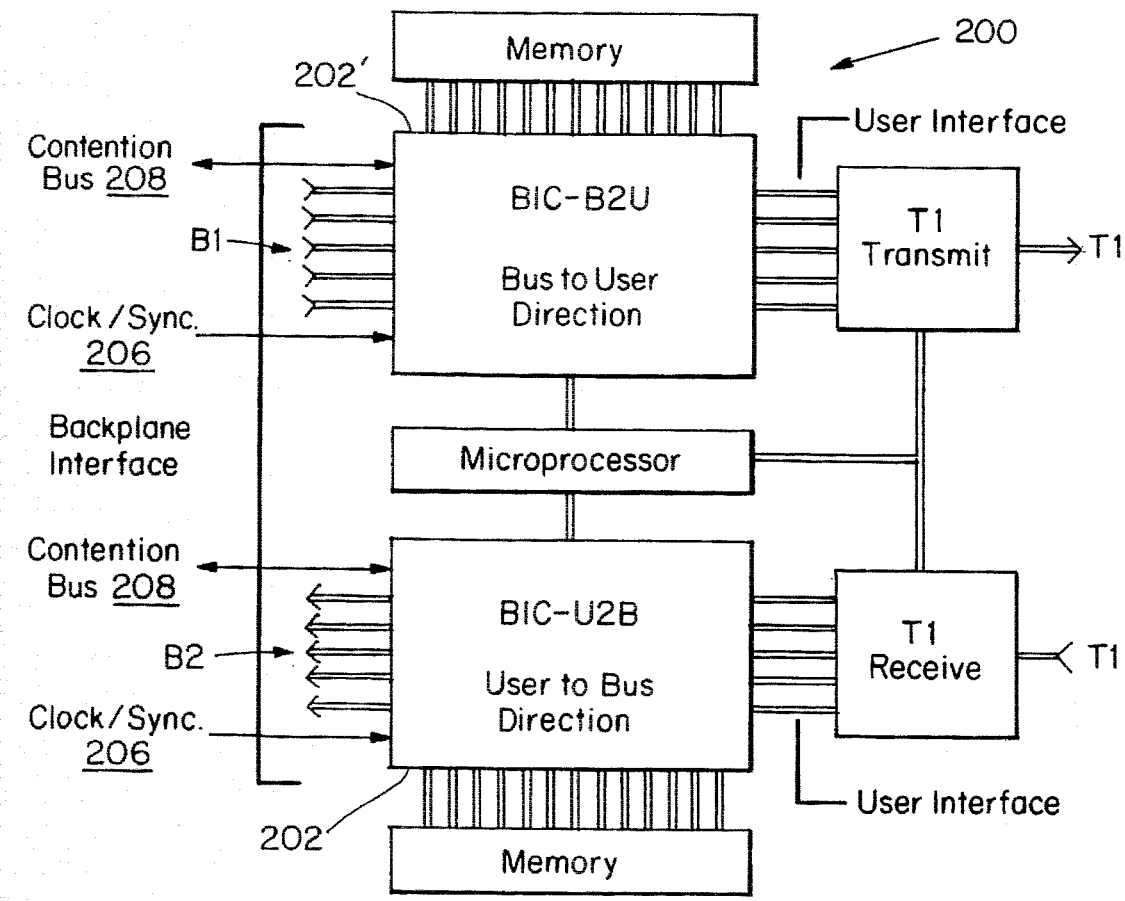
FIG. 12 is a block diagram of the Channel Unit Architecture.

FIG. 12 is a block diagram of a typical channel unit 200 for the SMN. The channel unit designer is shielded from much of the complexity of the system by the Bus Interface Circuits (BICs) 202,202'. The BICs 202, 202' handle all of the packet to TDM conversion, packet buffering and formation, control port, protection switching, mapping of real world addresses (e.g. port and VCI) to and from bus addresses (e.g. Bus, Shelf, Slot, and BCID), cell formation and interpretation, horizontal bus contention, as well as a host of minor functions. The BICs have 2 modes, Bus to User, and User to Bus. Two BICs are required for service 202, 202' (one in each mode) and two for protection (not shown).

Figure 25:
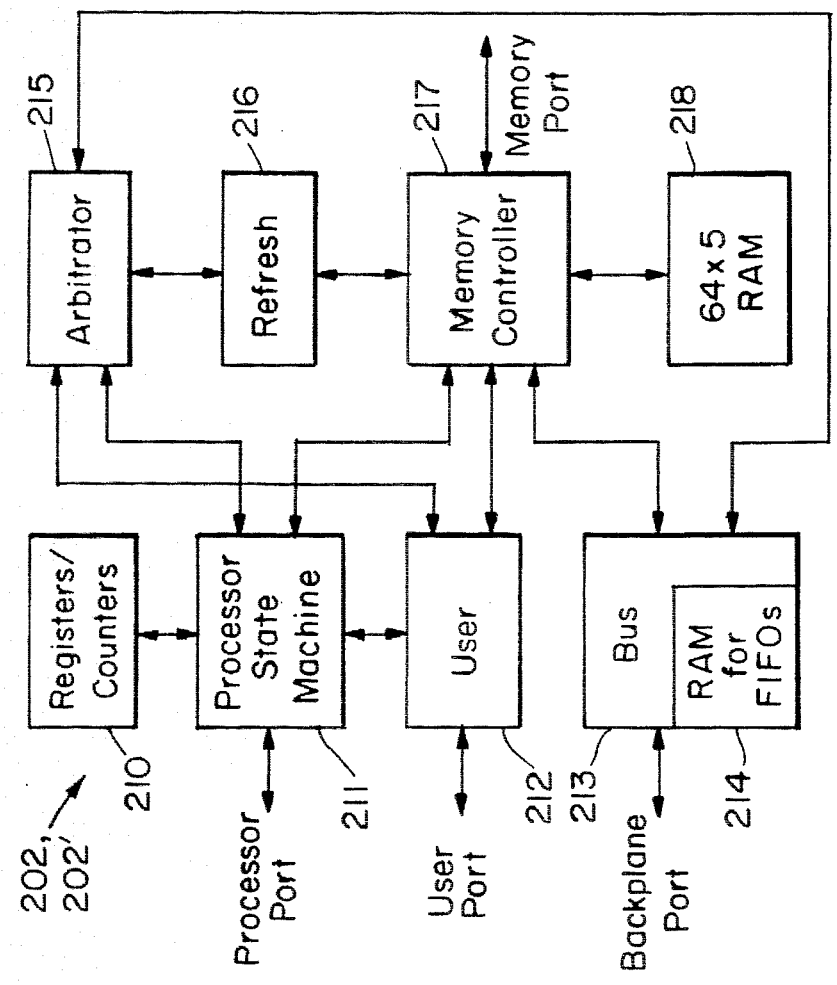
FIG. 25 is a schematic block diagram of the Bus Interface Circuits (BICs).

The service backplane buses B1, B2 consist of a 16 bit wide data bus running at 16 Mbps in each direction. The BIU 40 (FIGS. 11A–11D) provides a 16 MHz clock and a 4 MHz sync signal 206. Since cells are 64 bits wide, it takes four 16 MHz clock pulses to transfer one cell. The sync signal identifies cell boundaries. Thus 4 million cells are transferred in each direction every second. In the BIU to channel unit direction, the BIC monitors all the cells on the bus, looking for those with its slot number. In the channel unit to BIU direction, the BIC must contend for an opportunity to send cells. A 4 bit contention bus 208 is provided for this purpose. There is another complete set of these busses connected to the protection BIU 40. Each BIC has 4 main interfaces: microprocessor, backplane, memory and user (FIG. 12 and FIG. 25). The microprocessor interface controls the BIC. The backplane interface connects to the SMN backplane. The memory interface connects to RAM. The user interface connects to the channel unit I/O.

The processor interface has two functions. First, it allows the channel unit microprocessor to configure and control the BIC internal operation. Second, it allows the processor to send and receive Large Packets to/from the bus. Both BICs 202, 202' (FIG. 25) have a similar processor interface. Anything written to the dataport is stored in input registers until a command is written. The command is decoded and action is taken depending on which command is presented. Commands 8 and 9 go directly to the memory port through memory controller 217 to read and write DRAM. Commands 10 and above are used to read and write the configuration registers and counters inside the chip. These are Flip-flops inside the chip. Any read data is placed in output data registers and the status register bit indicates the command is complete. Any read by the processor reads the output register 8 bits at a time. On the U2B BIC, commands 2–7 are passed directly to the user port circuit 212 for processing. On the B2U BIC, data is returned. A simplified copy of the B2U user port logic is contained in the processor port logic to process B2U commands 2–6.

The BICs have a number of error flags, which are decoded from the appropriate logic elements in the chip. These flags are latched in an error register whenever they go true, and are reset only when that register is read. This error register is AND-ed bit by bit with each of 2 error mask registers (fatal and non-fatal). If any of these AND outputs is true, the appropriate error interrupt is driven high.

The memory interface is connected to static memory (SRAM) or dynamic memory (DRAM). Memory is 33 bits wide (32 bits plus parity) and from 8 K to 4 M words deep.

The Backplane Interface consists of those signals connected to the SMN backplane. In the B2U BIC 202', the 16-bit data bus is an input. In the U2B BIC 202, the 16-bit data bus is an output. As discussed earlier, data transported over the SMN backplane is made up of one or more 64-bit cells. Each cell is transferred across the bus using four clocks.

When any of the 4 priority queues in DRAM have packets in them (the start pointer is not equal to the end pointer), the U2B BIC will start a process to send a packet from the highest priority queue that has a packet in it. Although the source port and VCI of the packet are known, the U2B BIC needs to lookup the destination address and the FC, BC, DE, and AD flags. The FC (forward congestion), BC (backward congestion), and DE (discard eligibility) bits, when set override the bits received in the command 2 when the packet came into the U2B BIC. This is just a convenience, since it allows the software to force these conditions when it detects congestion. The AD (abort DE) bit causes the U2B BIC to abort the packet if the DE bit is set. The U2B BIC aborts the packet by going through the motions of transmitting it, but does not contend on the backplane and does not enable the backplane drivers. Thus the packet is removed from the priority queue. If AD and DE are both set in the lookup, all packets on that port/VCI will be discarded. If AD is set and DE is not, only those packets that had the DE bit set when entering the U2B BIC on the user port will be discarded.

The table lookup is implemented by using 2 tables, a VCI table and a BCID table. These tables always have the same number of entries, one for each valid port/VCI combination. The VCI table stores the port and VCI in sorted order, and the BCID stores the corresponding destination address for that port and VCI. Since only valid entries are stored, this table is of practical size. The U2B BIC will search the VCI table to find the port/VCI for the packet it is trying to send. The U2B BIC then looks to the corresponding entry in the BCID table to find the destination address. The FC, BC, DE, and AD bits are stored in unused bits in the VCI table. If the port/VCI is not found, the packet is aborted and an error flag is set.

Once the destination address and the flags are known, the first cell of the large packet is completed and the Large packet Output FIFO is filled. This FIFO is only 64 cells deep so it will not necessarily hold a full large packet. As it empties, filling continues. Once there are 16 cells in the Large Packet Output FIFO, the BIC starts contending on the backplane to send the large packet. When the contention is won, cells are copied from the Large Packet Output FIFO to the backplane. Only a TDM cell on the backplane or a wait bit from the BIU will interrupt the packet being sent.

Once the large packet has been sent, the packet must be checked for multiple destinations. This is indicated if the multipoint index is non-zero. The U2B BIC can implement multipoint transfer for large packets, i.e., sending the same packet to multiple destinations. The multipoint index is used to lookup the next destination in the Multipoint Table in DRAM. Each entry in this table has a destination and a new multipoint index. The BIC contends on the backplane and sends the packet again with the new destination address. This process is repeated with the new multipoint index until a multipoint index of zero is reached, which indicates there are no more destinations.

Multiple state machines in the BIC may want access to the DRAM at any given time. An arbitrator circuit 215 decides who gets access when. Each state machine that wants access raises a request bit to the arbitrator circuit 215. The arbitrator circuit 215 returns an acknowledge bit to tell the state machine it has access to DRAM. The priority for the U2B BIC is: backplane 213, DRAM refresh 216, processor 211, and user port 212. The priority for the B2U BIC is: backplane 213, user port 212, DRAM refresh 216, and processor port 211. The DRAM refresh 216 requests access at a periodic rate to refresh the DRAM memory. The state machines will wait until they get access to DRAM before proceeding.

Figure 13:
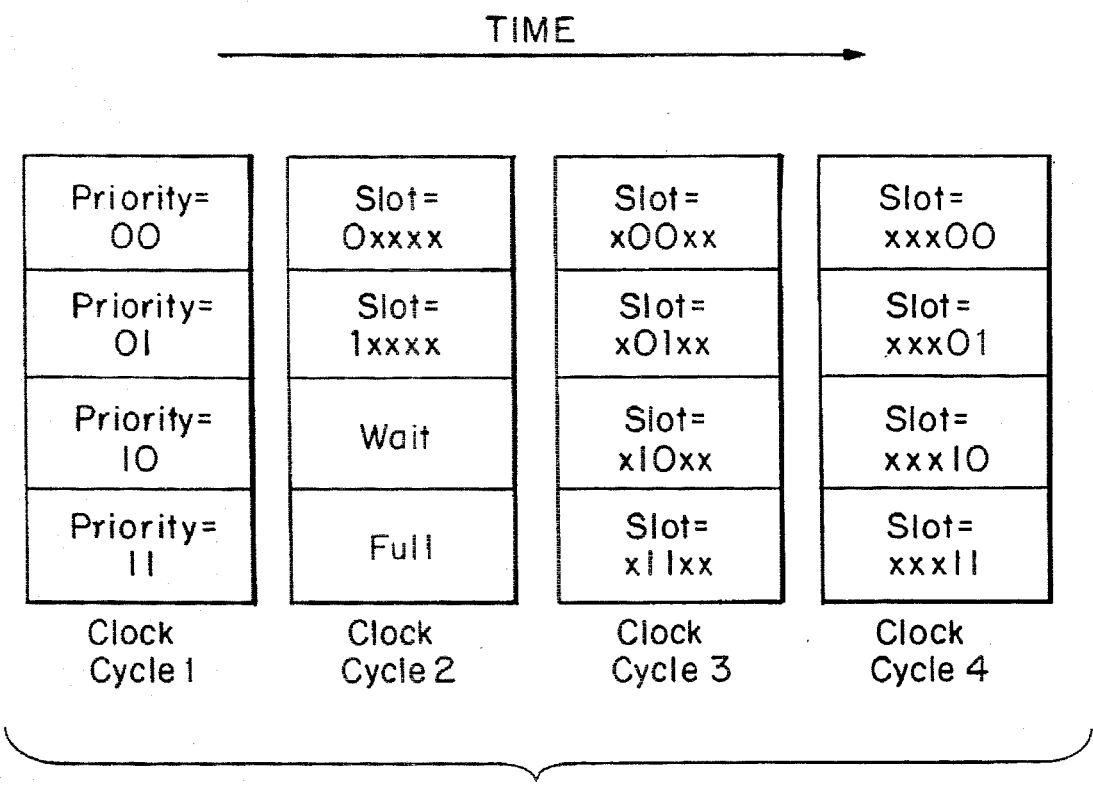
FIG. 13 is a representation of the horizontal bus contention resolution protocol.

FIG. 13 illustrates the contention mechanism for the Tier-0 bus. The channel unit with the highest priority packet to send wins. When more than one channel unit wants to send a packet at a given priority level, a round robin cycle takes place. Each channel unit that wants to send, starting at the highest numbered slot and working to the lowest, gets to send one packet. When all have had a chance to send one packet, the round robin repeats and each in turn can send another packet.

Contention is based on the Multi-Level Multi-Access protocol (Tanenbaum, "Computer Networks", 1989). Remember that each cell takes four 16 MHz clock pulses to send. While the last cell in a given packet is being sent, contention for the next cell takes place. Thus, the contention process also takes four 16 MHz clocks. During the first clock, each BIC that has a packet to send sets high one of the 4 contention bus leads corresponding to the priority of the highest numbered packet it has to send. The contention bus is an open-collector wire-ored bus, so more than one BIC can set a lead high at the same time. By simultaneously reading the contention bus, each channel unit can tell if any other channel unit has a higher priority packet to send. If so, the BIC is disqualified and no longer participates in the contention process this cycle. The only exception is if the BIC is in the middle of sending a large packet, in which case the BIC will only stop contending if the priority 4 (TDM) bit is set.

During the second clock, each BIC that wants to send and has not been disqualified sets high a contention bus lead corresponding to the most significant bit (MSB) of its slot number. Any BIC that does not match the highest MSB that wants to send is also disqualified. During the third clock, each BIC that wants to send and has not been disqualified sets high a contention bus lead corresponding to the next 2 bits of its slot number. Any channel unit which does not match the highest address that wants to send is disqualified. Similarly, during the fourth clock, each BIC that wants to send and has not been disqualified sets high a contention bus lead corresponding to the lowest 2 bits of its slot number. Any BIC which does not match the highest address that wants to send is again disqualified. What will be left is the highest slot numbered channel unit that wants to send.

By itself, this scheme is not fair, since higher numbered units would always win. The solution is that once a BIC sends a packet, it cannot contend to send another packet at that priority level until every other BIC that wants to send has had an opportunity. The BIC can tell when this occurs by monitoring the contention bus. When only one unit is left that wants to send, one and only one contention bus lead will be set during the second, third, and fourth clocks.

During the second clock, there are two additional bits: Wait and Full. The WAIT lead will be set if the BIC has not been disqualified by a priority 4 data packet and it is in the process of sending a large packet and the next segment to be transmitted is not the last segment in the packet. TDM packets may interrupt because of their higher priority. That is, a channel unit in the process of transmitting a large packet will not be able to retain access to the backplane bus because it will not be able to set the WAIT lead. The Full bit is similar, and is used by the BIU to stop all channel units from transmitting when its FIFO buffer is full. It does this by setting the full bit high. All channel units will stop contending until the BIU again allows the full bit to go low.

The B2U BIC 202' generally ignores the Bus and Shelf fields and captures all packets whose slot field matches the SLOT NUMBER register in the BIC. It has two input FIFOs made from static RAM 214 inside the B2U BIC: the TDM input FIFO and the Large Packet Input FIFO. Input cells destined for its slot number are separated and entered into these 2 FIFOs. The B2U BIC 202' also captures all packets destined for shelves 252, 255, and optionally 253, regardless of their slot number. These shelf numbers indicate broadcast messages. Depending on the Discard flag set by command 13, all packets with the DE bit set may or may not be captured. Other enable bits set by command 13 can disable capture of all TDM cells, all packet cells, or all large packets with a BCID that exceeds a number provisioned by command 29. The least significant 6 bits of the BCID field contains the port number for Small Packets. For Large Packets, the entire 16-bit BCID is used to lookup the destination port and virtual circuit number. The B2U BIC 202' has a provisionable register which allows it to restrict Large Packets to those whose BCID is not greater than some maximum value. This register has no effect on Small Packets.

The B2U BIC maintains a TDM table in DRAM to store the incoming TDM cells. The data from up to 4 cells can be stored. Each TDM cell has a 2 bit sequence number which is cycled from 0 to 3 as the cells are sent. Each location in the TDM table corresponds to one of these sequence numbers. The B2U BIC simply looks at the sequence number to determine where to store the cell from the TDM input FIFO. The TDM table also has a count of the number of valid bytes at that location. Since each TDM cell has 2 bytes, that count is set to 2. The B2U BIC divides its DRAM buffer memory up into 16 word segments and manages those segments in a link list format similarly to the U2B BIC. The first word of each segment contains a pointer to the next segment. The B2U BIC has 258 queues comprising a free list of empty segments, an input queue, and 256 priority queues. The input queue temporarily holds the large packet data from the Large Packet Input FIFO until it can be transferred to the priority queues. The 256 priority queues consist of 4 priority levels for each of the 64 ports on the user interface. Because it would take up so much space inside the B2U BIC, the pointers to the start and ends of the 256 priority queues are stored in a pointer table in DRAM. The pointers to the start and end of the free and input queues are stored as flip-flops inside the B2U BIC. Since the end of the input queue is always the same as the start of the free queue, a single pointer is used, called the next pointer.

When large packets show up in the Large Packet Input FIFO, cells from the packet are copied to successive segments in the free list. These segments are not detached from the free list yet. A "current segment pointer register" inside the B2U BIC is used to keep track of the location of the segment of the DRAM currently being written to. When the large packet is fully copied to the DRAM, the current pointer will point to the end of the packet. It is only then that the packet is moved to the input queue. The new start of the free list will be pointed to by the pointer in the segment pointed to by the current pointer. The start of free list register is updated with this value.

In the B2U BIC, a pointer to the next packet is stored in the first segment of a packet. This is in addition to the pointer to the next segment of a packet that is stored in an event segment. This is done so that entire packets can be moved from queue without having to read every segment of the packet to find the end.

Once packets are in the input queue, they need to be transferred to the appropriate priority queue. The B2U BIC looks at the first cell of the packet pointed to by the input queue start pointer to determine the port and priority level. The B2U BIC gets the pointer to the last packet in that priority queue from DRAM and updates the next packet pointer in the first segment of that packet to point to the packet at the head of the input queue. The pointer to the end of the priority queue is also updated to point to the new packet. Finally, the pointer to the start of the input queue is updated to the next packet pointer (located in the new packet just transferred). This process is continued as long as the input queue has data.

The BIC buffers and provides data to the user in any order desired on demand. This simplifies the design of user circuits since such circuits need only handle data one byte at a time requesting the next byte from the BIC only when needed. In the U2B direction, the user can give the BIC data for any port in any order, one or many bytes at a time. The BIC will buffer data until a full TDM packet (2 bytes) or a full large packet is sent. It is not necessary to finish giving the BIC a full packet for any given port before moving on to the next. The BIC has independent state memory for each port and will not get confused by jumping around.

All data is addressed using a 6-bit port number. The port number is similar to a timeslot number. Port 0 is reserved for channel unit control. The BIC places no special interpretation on the other port numbers. The Channel unit hardware should provide a fixed mapping between port number and physical channel/timeslot number. For example, a dual T1 card could assign ports 1 to 24 to timeslots 1 to 24 of the first T1 and ports 33 to 56 to the second T1. It could use ports 25 and 57 to send or receive the ESF spare data channel. It could also use these ports to send or receive the framing bit if clear channel T1 service is desired for test access.

The user interface consists of a 20-bit data bus, a 6-bit port number, a 4-bit command, a strobe and an acknowledge. The Port and Command are multiplexed with the data bus to share pins. The internal 16.128 MHz clock is also output.

The user interface has been optimized to interface to external TDM circuits. It is assumed that all valid port numbers will be cycled through by the TDM framer (U2B direction) or frame generator (B2U direction) circuits (not shown). The user may or may not execute a command during this time to read (B2U direction) or write (U2B direction) data from/to the BIC. No external buffering is necessary for TDM ports (timeslots). Packetized ports need some type of protocol state machine. It is necessary to have some buffer memory to store partially received data bytes as well as the current state of each port, but no more than a couple of bytes per port. In the U2B direction, as data is received and the protocol decoded, it is passed on to the BIC on a byte-by-byte basis. The state machine indicates by the command it issues if the data is real data or VCI information. In the B2U direction, the protocol determines VCI or data bytes, and requests each type as needed. This arrangement provides excellent delay characteristics.

Data from the user enters the U2B BIC through the User port 212. The U2B BIC uses a 256 word table called a pointer table to temporarily store status and data information for each of the 64 ports (4 words dedicated to each port). Since none of this data is stored inside, this allows the U2B BIC to context switch between the 64 ports. Depending on the command, it will retrieve the appropriate information from the DRAM, and pick up right where it left off last time. When the U2B BIC finishes processing the command, it will save its status in the pointer table for the next time that port is accessed.

Command 0 sends TDM data. The first byte of TDM data is simply stored in the pointer table. The second byte, together with the other information in command 0, is formed into a TDM small packet backplane cell. The U2B BIC needs the destination address (bus, shelf, slot, BCID) for the cell, so it performs a table lookup into the TDM BCID table in DRAM. This table is loaded by software, and provides the destination address for each of the 64 possible TDM ports. The completed small packet cell is transferred to the TDM output FIFO. This FIFO is built from static RAM 214 inside the chip. The U2B BIC will transfer these cells to the backplane as soon as the backplane contention logic allows it. Note that there is a second output FIFO, also built from static RAM inside the chip, which holds large packet cells, awaiting transfer to the backplane. Since TDM cells have higher priority, they will always be output first.

Large packet data is stored in the large packet buffer memory table. This memory in the DRAM is divided into 16 word segments and organized in a linked list. The first word of the segment contains a pointer to the next segment in the list. There are 5 lists inside the U2B BIC. Registers in the U2B BIC contain pointers to the first segment of a list and the last segment of the list. A Free list is kept for segments that do not contain data and are available for use. Four Queue lists are used to store the large packet data that has entered the U2B BIC but has not yet been sent on the backplane. Data can be transferred from the free list to/from the Queue lists simply by modifying the pointers. Each of the 4 Queue lists stores a different priority level data. This allows the higher priority data to be sent before starting to send the next lower priority data.

U2B Command 2 starts a new packet. It detaches a segment of memory from the free list and stores a pointer to it in the pointer table. Since this is the first segment of a large packet, some additional information is needed to create the first cell of the large packet on the backplane. The 2nd, 3rd, and 4th words of the first segment are reserved to store this information. The information contained in the command 2 is saved in this header area.

Command 3 saves the VCI in the header area created by command 2. It has to read the pointer table to find out where this header is in DRAM. If the pointer table indicates there is no valid header defined (no command 2 executed), it returns an error.

Command 4 saves the Reserved Word in the header area created by command 2. It has to read the pointer table to find out where this header is in DRAM. If the pointer table indicates there is no valid header defined (no command 2 executed), it returns an error.

Command 5 initially saves the data byte in the first segment obtained by command 2. It has to read the pointer table to find out where this segment is in DRAM. If the pointer table indicates there is no valid first segment defined (no command 2 executed), it returns an error. It saves the place in the segment to write the next byte in the pointer table. When the first segment of the packet is filled, it gets another segment from the free list. It updates the next segment pointer in the first segment to point to this new segment. This segment is referred to as the current segment. In addition to the pointer to the first segment, a pointer to the current segment is saved in the pointer table. As the second segment fills, the process is repeated, obtaining additional segments from the free list. If the free list becomes empty (start of list and end of list are identical), indicating there is no more buffer memory, an abort is performed.

Command 6 is end of packet. The list of segments filled with data is defined by the first segment and current segment pointers in the pointer table. This list is transferred to one of the Queue lists according the priority stored in the header of the first segment. This is done by modifying the first word in the last segment of the appropriate Queue list to point to the first segment of the new packet. The register that points to the end of that Queue list is updated to point to the last segment of the new packet.

Command 7 is packet abort. This is similar to the end of packet command, but instead of attaching the new packet to a Queue list, it is attached to the end of the free list. Thus the partially started packet is discarded and the memory freed to be used again.

The user requests data from the B2U BIC on the user port 212. Command 0 is used to get TDM data. The backplane interface puts the incoming TDM cell data into the 4 locations in the TDM table according to the sequence number contained in the cell. When the data was written by the backplane, the byte count for each entry was set to 2. This is because each backplane cell contained 2 data bytes. When the first byte is read from the table and given to the user (in response to a command 0), the byte count is decremented to 1. When the second byte is read, the byte count is decremented to 0.

Command 2 polls the B2U BIC for a new packet. The B2U BIC needs to look at the start and end pointers to the 4 priority queues associated with the requested port and determine if any contain packets. If the start pointer is not equal to the end pointer, there is valid data in the queue. Since these pointers are located in DRAM, there is not enough real time to read all 8 pointers in the command 2. To solve this, the B2U BIC has an internal 64 by 5 RAM 218, 5 bits for every port. The first 4 bits are used to indicate if each of the 4 priority queues contain data. The appropriate bit is set whenever a packet is transferred from the input queue to a priority queue. It is cleared when the last packet in the queue is started to be read. The 5th bit is used to indicate if a packet has been started to be read on that particular user port. If this bit were set, and a command 2 were issued, an error is indicated on the user port and the command 2 is ignored. Otherwise, the command 2 will set this bit to indicate a packet has been started. If a command 3, 4, 5, or 6 is issued on that port, the bit is also set to make sure a packet has been started by a command 2. If not, these commands are ignored and an error is indicated on the user port. This prevents the external user port logic from getting out of sync with the internal logic.

If Command 2 determines a new packet is available, it detaches the packet linked list segments from the priority queue and saves a pointer to the packet in the packet table. The packet table is a reserved location in DRAM, and has separate storage locations for each of the 64 ports on the user interface. It looks inside the first segment of the detached packet to find the first segment of the next packet in that priority queue. It updates the start pointer for that priority queue to point to this next packet. Commands 3 to 6, always refer to the current packet pointed to by the pointer saved in the packet table. Command 2 also returns certain other information stored at the beginning of that current packet. It returns the priority, the FC, BC, and DE congestion control flags, and a control/data flag. All these bits are the same as entered on the U2B BIC, unless the FC/BC/DE flags were forced on by the processor.

Command 3 reads the pointer to the current packet from the packet table in DRAM and reads the VCI from the first segment in that packet. The VCI is returned on the user port. Command 4 reads the pointer to the current packet from the packet table in DRAM and reads the reserved word from the first segment in that packet. The reserved word is returned on the user port.

Command 5 provides the user a data byte. To do this, it maintains a pointer to the current segment of the current packet in the DRAM packet memory. It also maintains a byte count within the current segment so it knows the next byte to output. In both cases, a separate location is used for each port. When the last byte of a segment is sent to the user, it reads the pointer to the next segment in the packet. This pointer is contained in the first word of the current packet and becomes the new current segment pointer saved in the packet table. The byte count is also re-initialized.

When the last byte of a packet is sent to the user, an End-of-packet bit informs the user, and cleanup begins. The packet started flag in the internal 64 by 5 RAM is reset. The segments of the just-read packet are transferred to the free list. The pointer to the end of the free list (a flip-flop based register inside the B2U BIC) is updated to point to the end of the recently finished packet. The segment that used to be at the end of the free list has its first word updated to point to the start of the recently finished packet.

Command 6 reads the pointer to the current packet from the packet table in DRAM and reads the packet length from the first segment in that packet. The packet length is returned on the user port. Although the packet length is not transferred over the backplane as part of the packet, many protocol parsers (external to the BIC) need it before they start to send the packet. To accommodate this, the B2U BIC counts the bytes as they come in on the backplane, and saves the length in the first segment of the packet in DRAM buffer memory.

The BIC has internal support for selective broadcast of a Large Packet mode port. Multiple destinations can be assigned to any Port/VCI input. The BIC will make multiple copies of the packet and place them on the bus. This mechanism implements the control-to-branch direction of a multipoint circuit. In the branch-to-control direction, data from many branches is provisioned to be sent to the control port. The BIC will queue all packets for that destination port and output them in the sequence they were received.

The BIC supports full 16 state ESF signaling using A/B/C/D signaling bits. In addition, it supports two trunk processing bits: Y and F. When Y is set to 1, the receiving channel unit should immediately start trunk processing. When F is set to 1, the receiving channel unit should immediately start signaling storage and should start trunk processing if it persists long enough. Normally, the Y bit will be set when yellow alarm occurs and the F bit will be set to the raw (unfiltered) out-of-frame condition. The BIC does not modify or use any of these bits, it only transports them. The sole exception is that the B2U BIC sets A/B/C/D signaling bits to 1 whenever Y or F is a 1. The user will not be looking at the signaling bits under these conditions since they are invalid.

Hyperchannels are data connections that generally are multiples of 64 Kbps. For example, it may be desired to group timeslots 1 to 6 of a T1 line and treat it as a single 384 Kbps entity. The BIC has slightly different methods of dealing with TDM and Large Packet hyperchannels. Large Packet hyperchannels are implemented by giving the BIC the same port number for all timeslots of the hyperchannel. Remember that there is a one-to-one mapping of timeslot to port on the channel unit hardware. Usually the lowest numbered port is used. The BIC will then treat the entire hyperchannel as a single entity.

Although a similar scheme could have been used for TDM connections, the SMN has a requirement that all TDM connections occur at approximately 64 Kbps. Thus, slower speed sources must be stuffed up to 64 Kbps before giving them to the BIC and higher speed sources must be broken into multiple 64 Kbps channels. This is accomplished by treating the multiple timeslots that make up the hyperchannel as individual ports. This is exactly the same procedure for timeslots that are not part of a hyperchannel. For example, in the 384 Kbps case described above, 6 individual cross-connections would be made for the 6 timeslots. The only complexity is to make sure the delay through the system is the same for all channels of the hyperchannel. The BIC provides some assistance for this task by transporting sequence numbers and by providing a 4-byte FIFO per port.

Since the BIC does not know which timeslots make up the hyperchannel, some external circuitry is needed to align the multiple channels. Thus, this method of transporting TDM hyperchannels guarantees that all the bytes of a hyperchannel that enter in the same frame will exit in the same frame and in the same order.

6.0 Congestion Control—Throttling

In order to manage potential congestion where buses (or daisychains) intersect, a "throttling" feature is employed. When data has to be transferred from a higher speed bus (or daisychain) on to a lower speed bus, buffers have to be used. Further, there is the potential for buffer overflow if the bandwidth of the data transferred over a period of time exceeds the data unloaded from the buffers plus the depth of the buffers themselves. Buffer overflow is extremely undesirable and must be carefully managed to meet an overall packet loss performance requirement on the platform. A "bandwidth allocation" process is used to limit the amount of data a channel unit will direct to a destination. Thus, if the sum of bandwidth, over every short period of time, of packets destined to all the channel units on a given shelf, does not exceed the bandwidth of that bus, little or no buffering is required at the BIU. The philosophy used is that bus bandwidth is far more inexpensive than buffer memory, so throttle control processes are instituted that favor low buffering to wasted bandwidth. Bottlenecks needing buffers abound where different speed buses cross-connect, and are always in the direction towards destinations. Thus, bottleneck points are from vertical daisychain to horizontal bus in the BIU and from horizontal bus to real world interfaces (e.g. DS1, DS3, RS232) on the channel unit.

Throttling is the process by which the system, in conjunction with buffer management processes at bottlenecks, sends flow control messages to data sources, slowing down the rate at which they pump data through the bottlenecks under congestion conditions. These "throttling" messages result in major data-buffering, if required at all, to be at data sources, not at the bottlenecks. This keeps the platform inexpensive and loads the buffer cost on channel units which connect application processes to the bus. If the application requires very low (or zero) probability of packet loss, and produces large amounts of bursty data, then it will need a lot of buffer memory towards the bus. Channel units interfacing applications requiring only datagram service, or TDM channel units with no data burstiness, need have little or no buffering.

Using throttling, it is possible to reduce the probability of bottleneck buffer overflow on a platform to as low a number as desired. Recovery from resulting packet loss, if desired, can be handled by an end-to-end flow control process in the channel units. Initial applications of SMN will be kept small enough so that there is always enough bandwidth on the transfer buses and no packet loss has to be dealt with. If the peak instantaneous bandwidth of the entire system never exceeds 256 Mbps, then clearly no packets get lost, the throttling process is very rudimentary, and can be achieved at the provisioning level by ensuring that the bandwidth condition mentioned above is met. Fairly large systems can be implemented under this constraint as typical LANs are only 10 Mbps and T1 lines are only 1,544 Mbps processes, and quite a few systems can be interconnected using 256 Mbps of bandwidth.

7.0 The Control Interface Module (CIM)

Figure 14:
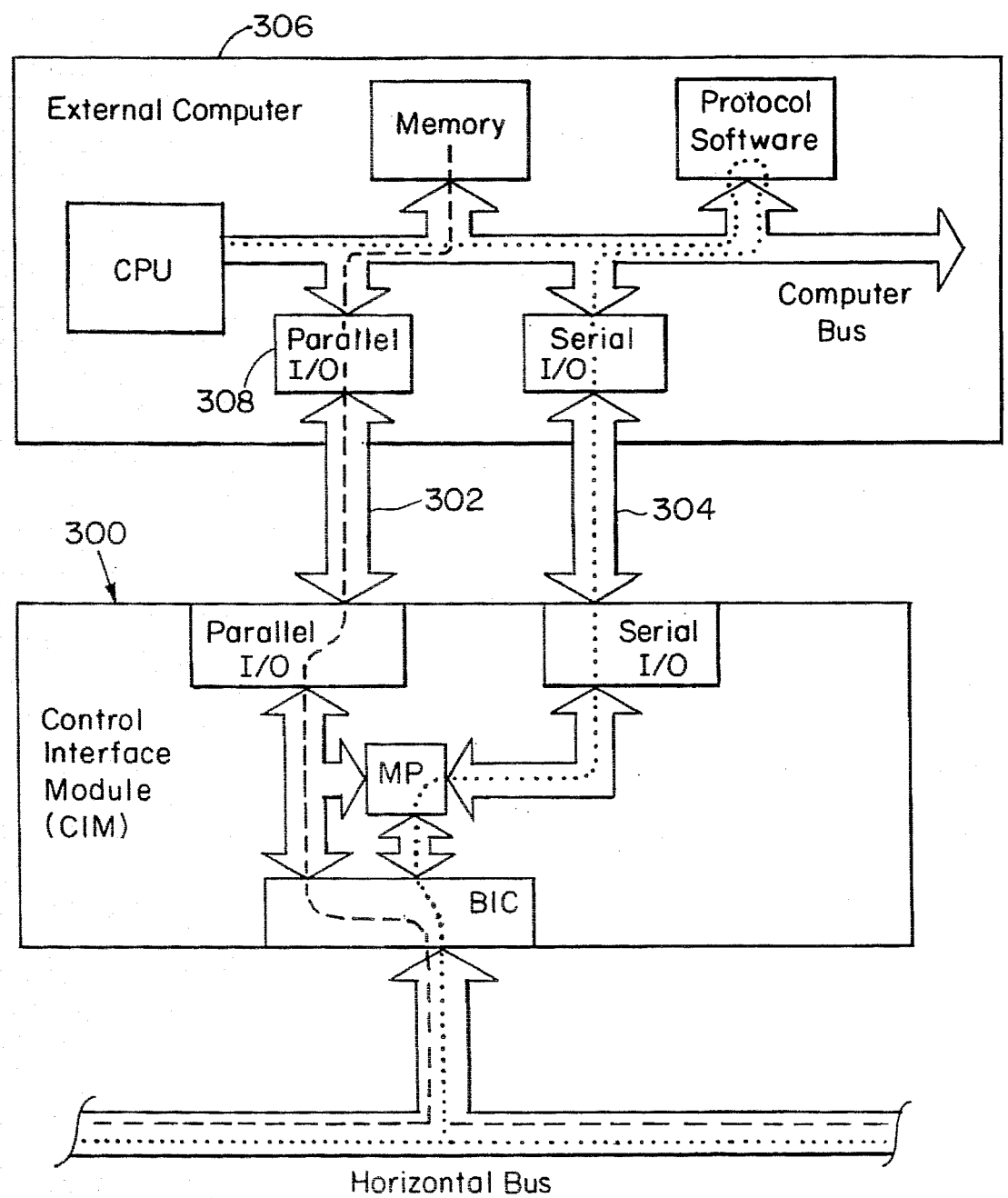
FIG. 14 is a block diagram of a control interface module.

The CIM 300 (also referred to as a Gateway Channel Unit) is the basic unit used to interface external computers to the SMN. FIG. 14 shows the fundamental architecture of this module. The CIM provides two basic kinds of links to SMN: a parallel link 302 and a serial link 304.

Using the parallel, or Bit Oriented Link (BOL), a computer 306, through a parallel port 308 can dump multi-megabits of data onto the SMN. By using a high priority, the computer can always find enough bandwidth on the bus if it so desires. Since it sees the bus 302 through a throttler, it cannot cause catastrophic congestion. Using this link, direct memory transfer can be achieved between a channel unit and a computer, or between a computer and another computer. The serial link 304, called the Message Oriented Link (MOL), allows the external computer 306 to converse with the processors in the channel units or with other computers using a higher level language. This kind of link may have protocols attached to it, e.g., HDLC can be attached to get error and flow control as well as link level multiplexing, as will be explained later.

Figure 15:
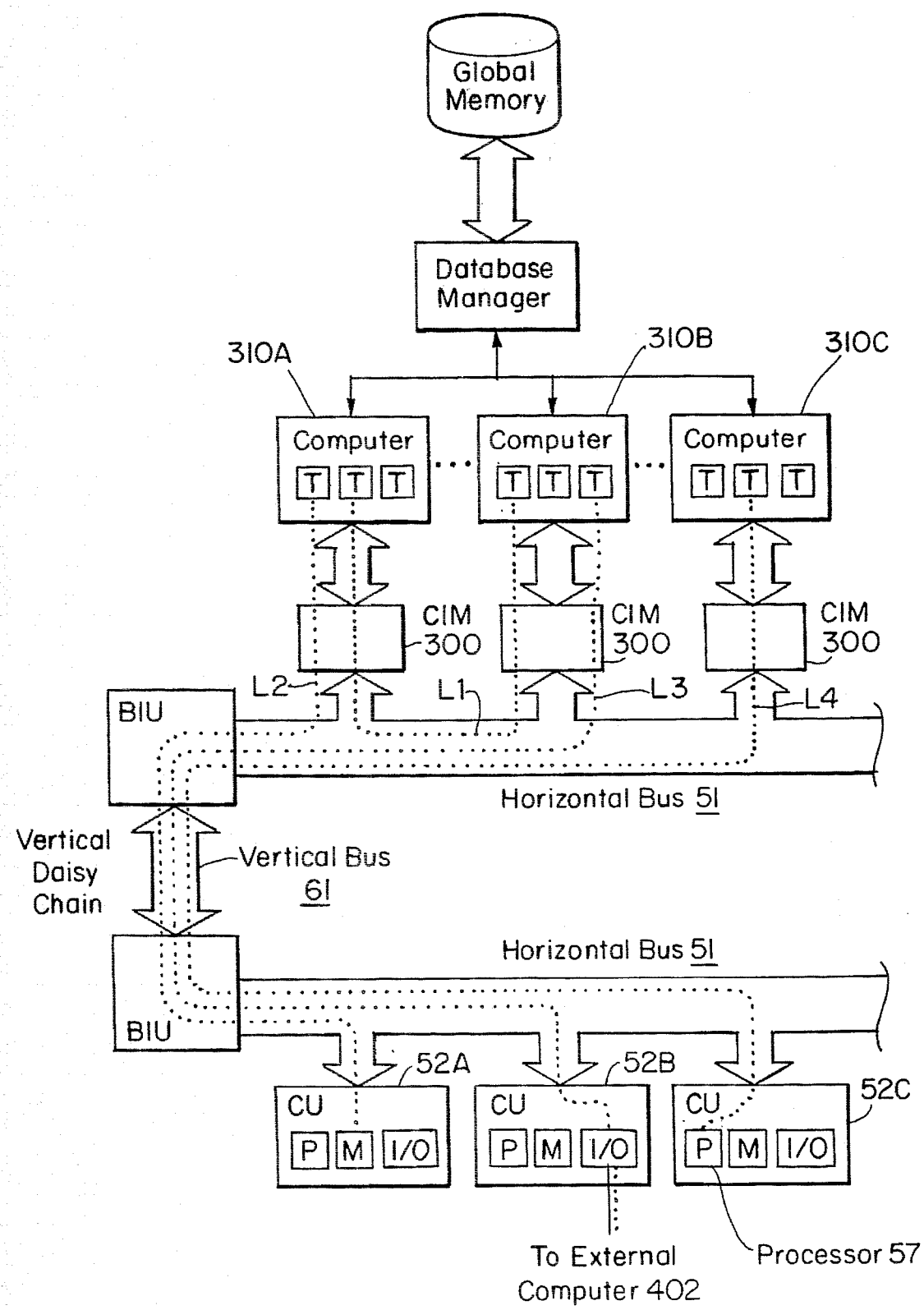
FIG. 15 is a block diagram illustrating coupling of multiprocessors and use of parallel processing in connection with the SMN.

The CIM 300 provides a means by which the SMN can support a multiprocessor environment as shown in FIG. 15. Such multiprocessors have several powerful capabilities to support various forms of parallel processing. The multiprocessors can be tightly coupled using global memory as shown. The distributed memory in the system, located in disjoint channel units (or in the processors themselves), allows loosely coupled multiprocessor operation. Using the BOL any processor can achieve to-and-from direct memory transfer to any memory present anywhere in this system (if the memory's local manager allows). In this way, even the distributed memory appears virtually centralized. Such a shared memory architecture allows the multiprocessor environment to be tightly coupled to provide optimum performance, yet become loosely-coupled to provide fault tolerance when malfunctions occur.

Figure 16:
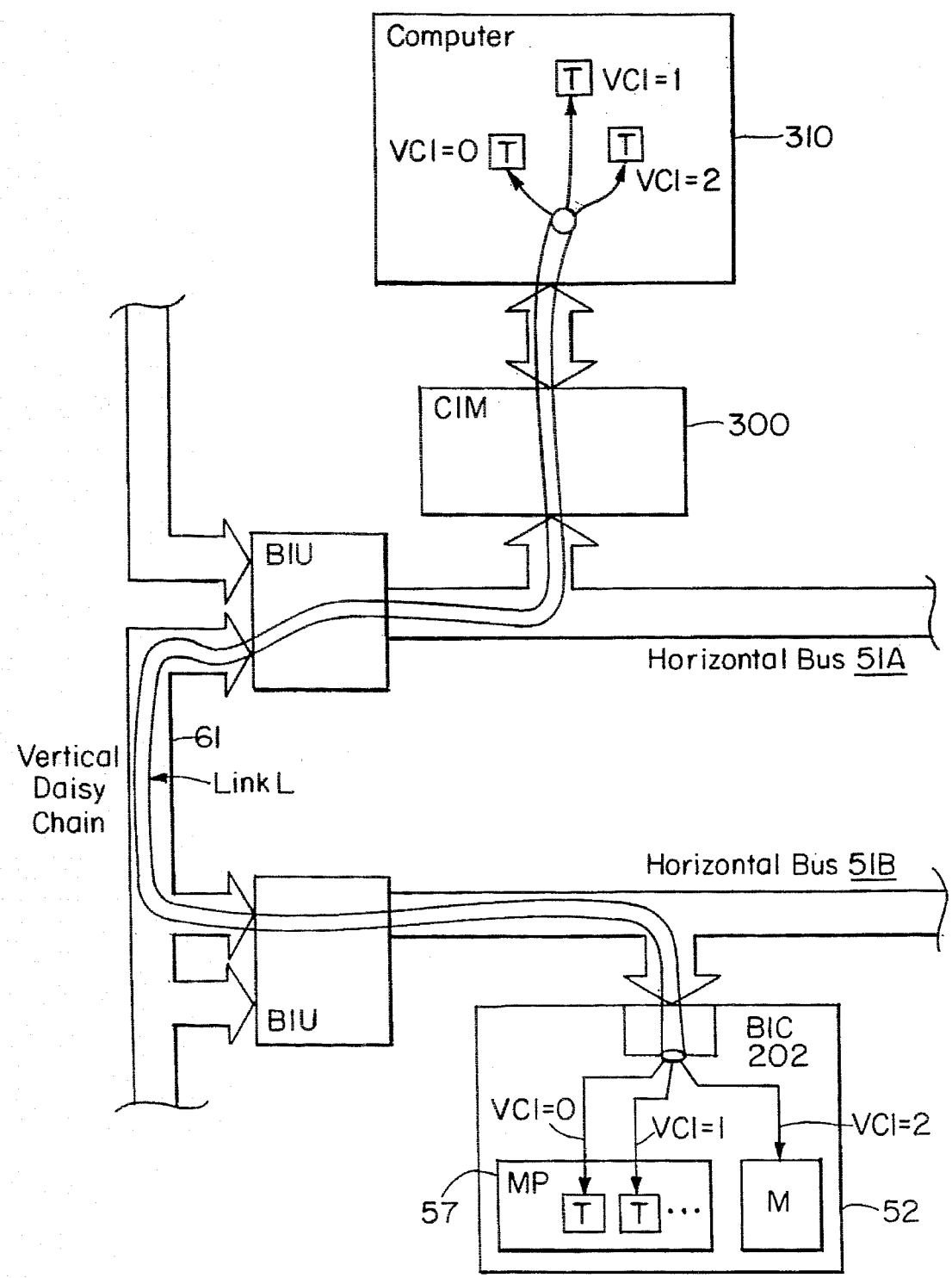
FIG. 16 is a block diagram illustrating a link level multiplexing embodiment of the invention.

Various kinds of control links can simultaneous coexist in SMN. In FIG. 15, L1 is an example of a BOL between two computers 310A and 310B. L2 is a BOL allowing a task in a computer 310A to directly talk to a memory in a channel unit 52A. L3 is a MOL allowing a task in a computer 310B to converse with a task on a computer 402 external to the system using an I/O port on a channel unit 52B. L4 is a MOL in which a task in a computer 310C converses with a processor 57 in a channel unit 52C using a high level language. Other connections are possible as well. Since a BOL or a MOL is addressable by a Port number, the 20 VCI bits in the packets can be used to divide the BOL or the MOL into up to 2**20 different logical links. Thus, using different VCIs, multiple tasks (or subtasks) in a computer can simultaneously converse with multiple tasks (or subtasks) in a channel unit or in another computer. FIG. 16 demonstrates an example.

The flexibility of communication allows for instrumenting various forms of parallel processing. As an example, pipelining is readily instrumentable by linking multiple processors using BOLs. Each one performs a specialized subtask for which it is optimized, and passes the results directly to the memory of the next computer, using a BOL. Finally, the multiprocessor capability intrinsically allows for fault tolerance. Both static redundancy (many computers doing the same task and an arbitrator) and dynamic redundancy (computers monitoring the other computers with each performing different tasks but capable of taking on the tasks of a faulty computer if required) are possible on SMN.

8.0 The Call Processing Module (CPM)

Figure 17:
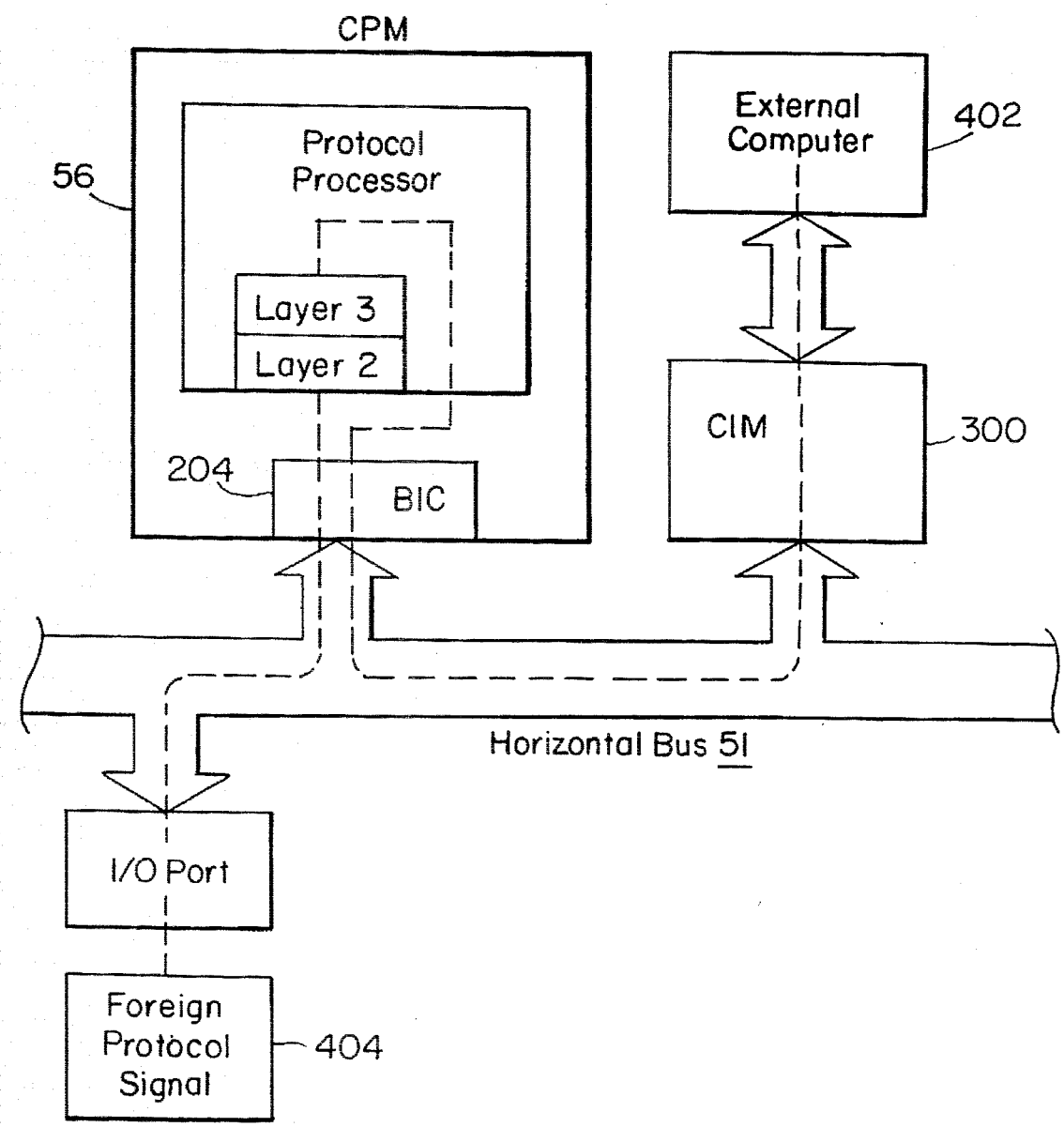
FIG. 17 is a block diagram of a protocol processor module (PPM).

The Call Processing Module (CPM) 56 is a generic gateway by which an external computer 402 attached to the SMN via CIM 300 converses with an external network using a foreign protocol. Since the computers and the channel units converse in a high level language using the MOL and these links may or may not involve significant ISO Layer 2 and Layer 3 function, foreign protocols have to be opened up to Layer 3 before cross-connection to a SMN computer or channel unit is possible. FIG. 17 illustrates how a foreign protocol signal 404 can be passed through the CPM 56 on its way to an external computer 402. This relieves the external computer from having to perform protocol conversion. Application programs can now operate over different foreign protocols simply by changing the Layer 2 and Layer 3 software in the CPM to correspond with the foreign protocol. Such links allow distributed processing between multiple nodes using SMN platforms.

Figure 18:
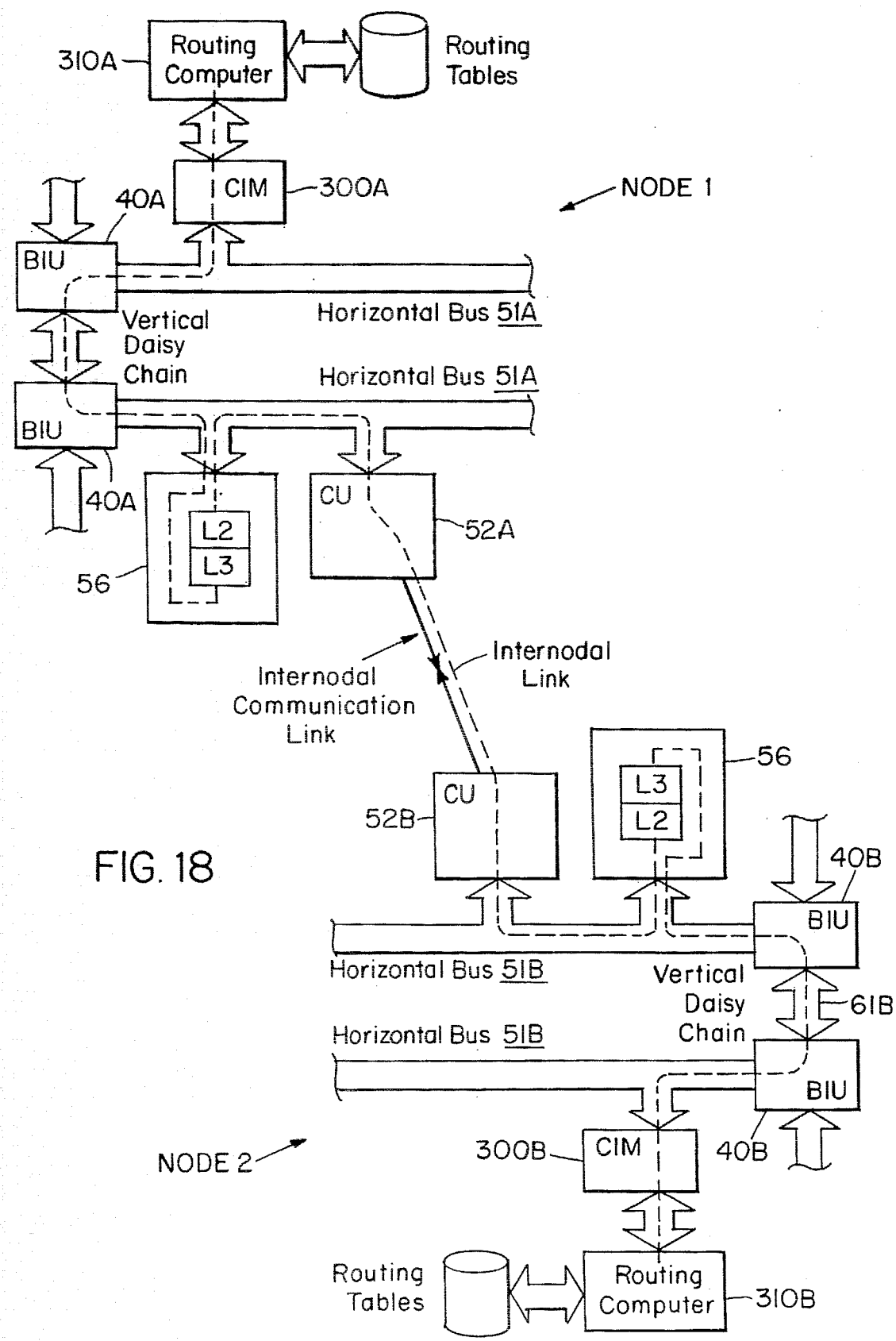
FIG. 18 is a block diagram of an inter-nodal communication link.

FIG. 18 shows how the CPM can aid two routing computers 310A, 310B on different nodes (i) & (j) to converse with each other. A suitable protocol, e.g. CCS7, can be chosen and the CPMs will open this protocol to Layer 3. This allows the Routing Computers to have high level Routing Applications converse in a high level language. This also allows distributed routing algorithms to be implemented.

The CPM also allows SMN nodes to be connected to the Public Network; for example, a Call Control computer can interact with an ISDN public switch using Primary Rate Interface (PRI) for access. In this case the CPM has to be loaded with Q.921 Layer 2 software and Q.931 Layer 3 software to aid the Call Control Computer. Other protocols can be loaded onto the CPM to implement other public network protocols, e.g., Frame Relay.

9.0 Network Management

Networking communication systems built on the SMN are expected to be "Open Systems" that is they will be based on ISO models and will be controllable by Network Managers using management tools based on OSI Network Management standards. These standards include ANSI standardized CMIP for end-user networks and Bellcore OTGR based TL1 for CO based systems.

The principles of OSI management are described in detail in ANSI draft proposed ISO/IEC/DP 10040 reference number ISO/IEC JTC 1/SC 21N 3294 incorporated herein by reference in its entirety. The basic framework to convey an idea of what platform products must be capable of doing to meet network management requirements is discussed below.

Figure 19:
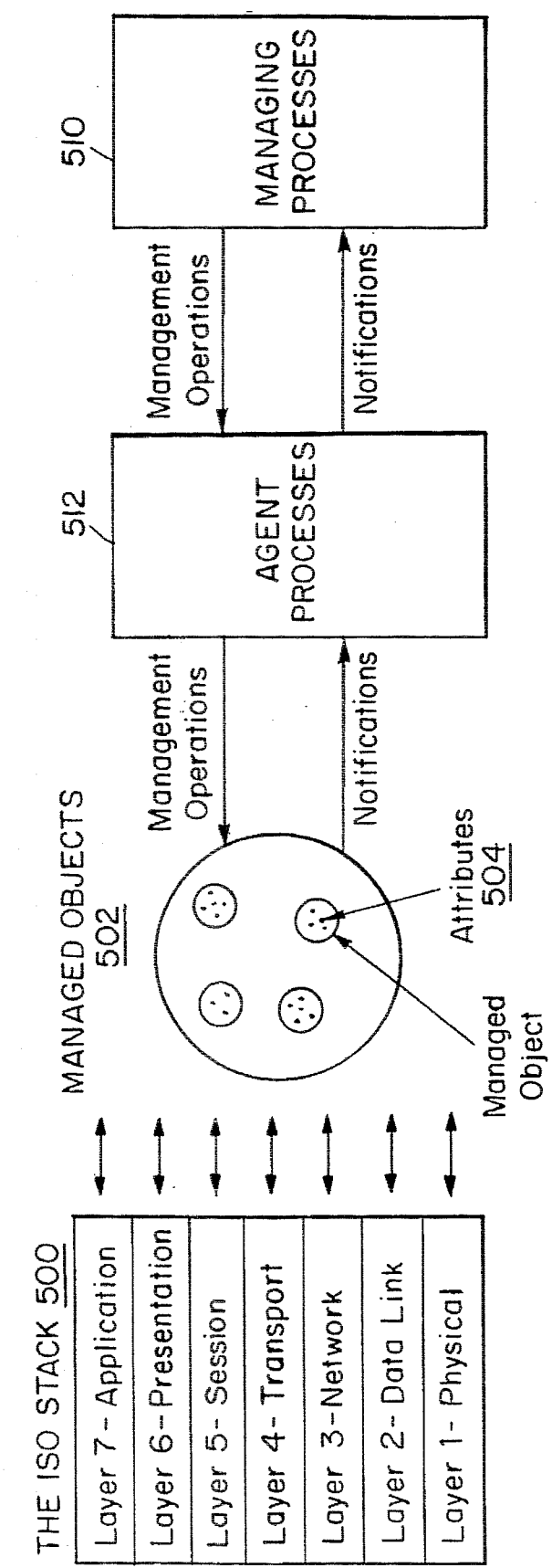
FIG. 19 is an illustration of a network management system for open distributed communication systems built on SMN.

FIG. 19 shows the conceptual architecture of an ISO based management system. Every ISO based communication system can be modelled using the ISO stack 500. A physical object or card in the system may implement one or more layers in total or in parts. Each layer and physical card results in the definition of one or more "managed objects" 502 with corresponding "attributes" 504. A managed object is the OSI Management view of a system resource that is subject to management, for example, a layer entity, a connection, or an item of physical communications equipment. Attributes are properties of managed objects. An attribute has an associated value, which may have a simple or complex structure. Managed objects can be specific to an individual layer, say (N), in which case they are known as (N)-layer managed objects. Those managed objects that are relevant to more than one layer or to the system as a whole, are known as system managed objects. The set of managed objects in a system together with their attributes, constitutes that system's Management Information Base (MIB). Designers on the SMN platform should identify their system's MIB while generating requirements for their network management functions.

For the purposes of system management, management processes are categorized either as "managing processes" 510 or "agent processes" 512. A managing process is that part of a distributed application process which has responsibilities for one or more management activities. An agent process is that part of a distributed application process which, at the request of a managing process, manages the associated managed objects. Agent processes may also forward directives to managing processes to convey information (or notifications) generated by managed objects. In order to perform a management function, a shared conceptual schema exists between managing processes and agent processes. System designers have to define this schema for their specific system's needs. Based on these foundations, structured software modules dan be defined that implement "Open System" management. For further details see the ANSI document referenced earlier in this section.

To illustrate the above concepts, consider a T1 line card on a system based on the SMN platform. The card itself represents a system managed object. An attribute of this managed object is Bi-Polar Violations (BPV) count over a period of time. An agent process, which is an error rate estimating and record keeping program, can reach down into this managed object and collect this attribute's value periodically, to perform its function. An operations system such as NMA can invoke a managing process to reach into this agent process, and pull out the history or error rate performance achieved by the T1 line card. If too many BPVs are recorded over a short period of time by the managed object, it can send a notification of counter overflow to the agent process 512. If the rate at which such notifications are received is frequent enough, the agent process can notify the managing process 510 that an alarm is present on the managed object.

Figure 20:
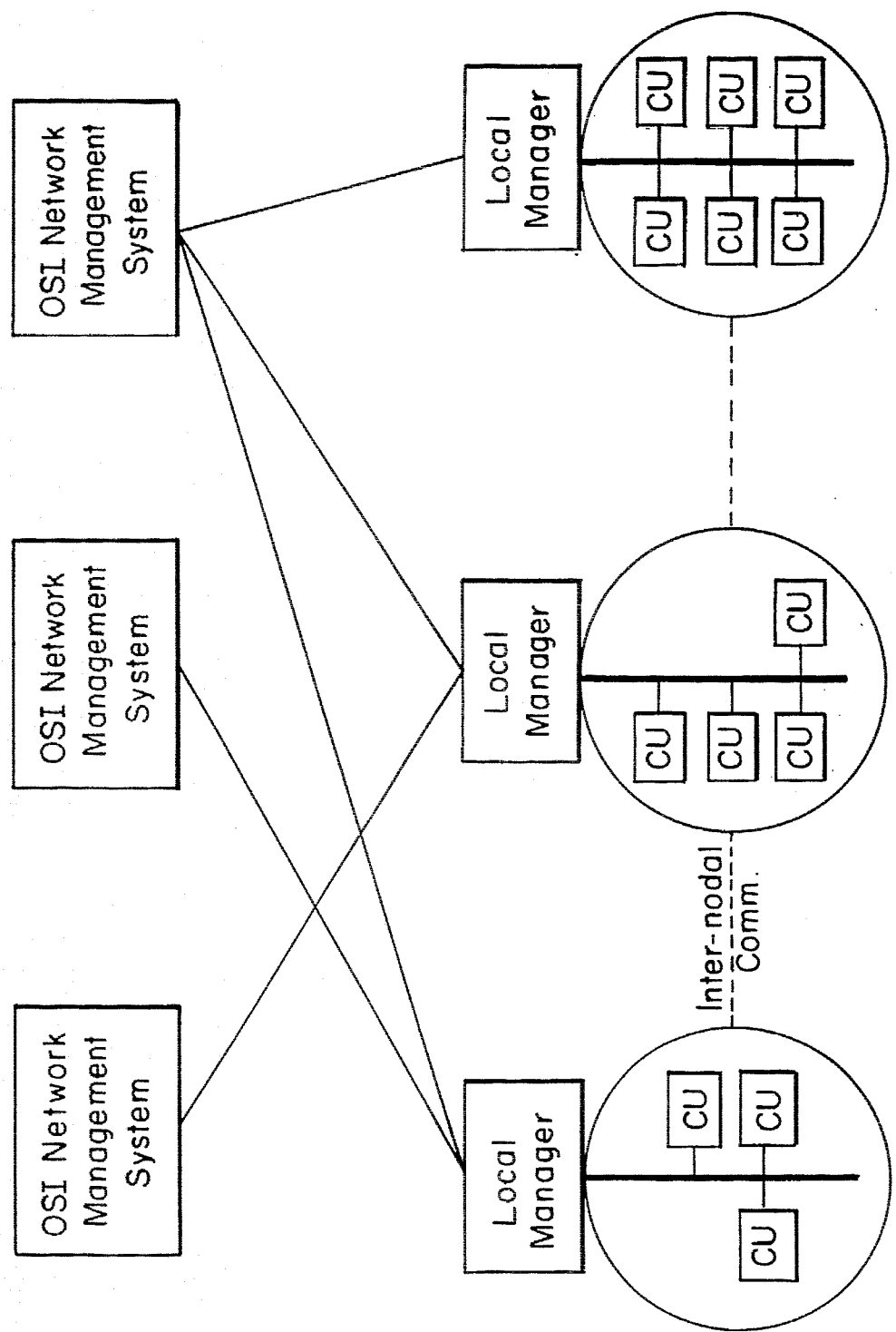
FIG. 20 is an illustration depicting Management of a large distributed SMN.
Figure 21:
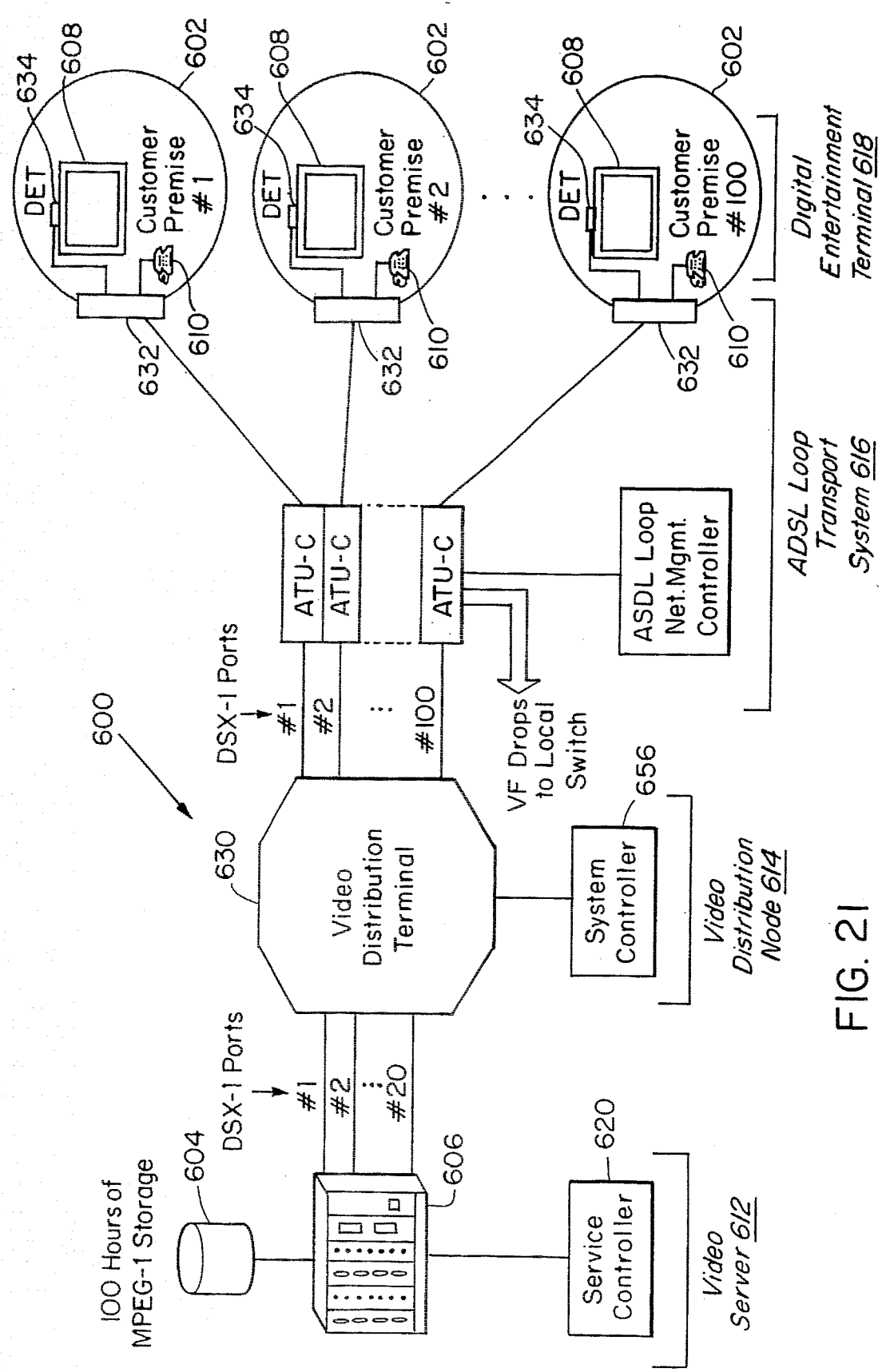
FIG. 21 is a schematic block diagram of a Televideo System.

Notice how the control communication flexibility of the SMN allows for easy realization of links which allow managed objects, agent processes and managing processes to communicate efficiently. The MOL capability allows for fast dump of large databases while the BOL capability allows for high level interactions. The system is readily segmentable into subsystems which may or may not be alike. This allows easy partitioning of the management function into sub-responsibilities. In fact, such flexibility exists that disjoint systems can exist on the same platform and be separately managed. FIG. 20 is a view of how a large "Open System" based on a SMN platform, is network managed.

10.0 Televideo System: System Description

In the previous sections a generic SMN has been described. In this section a specific system, i.e., a televideo system based upon the SMN will now be described in connection with FIGS. 21–24 to illustrate the flexibility of the SMN.

The objective of the Televideo System 600 is to allow Video On Demand (VOD) service to be offered to subscribers. Subscribers 602 to this service will be able to connect to a centralized video database 604 located at the video server 612 to retrieve and playback desired MPEG-1 compressed stored video programs on their television sets.

Implementation of this system 600 requires integration of a Video Server 612, a Video Distribution Node 614, Asynchronous Digital Subscriber Loop (ADSL) transport system 616 and Digital Entertainment Terminals (DETs) 618. The system runs under software control by System Controller (SC) 656.

Figure 24:
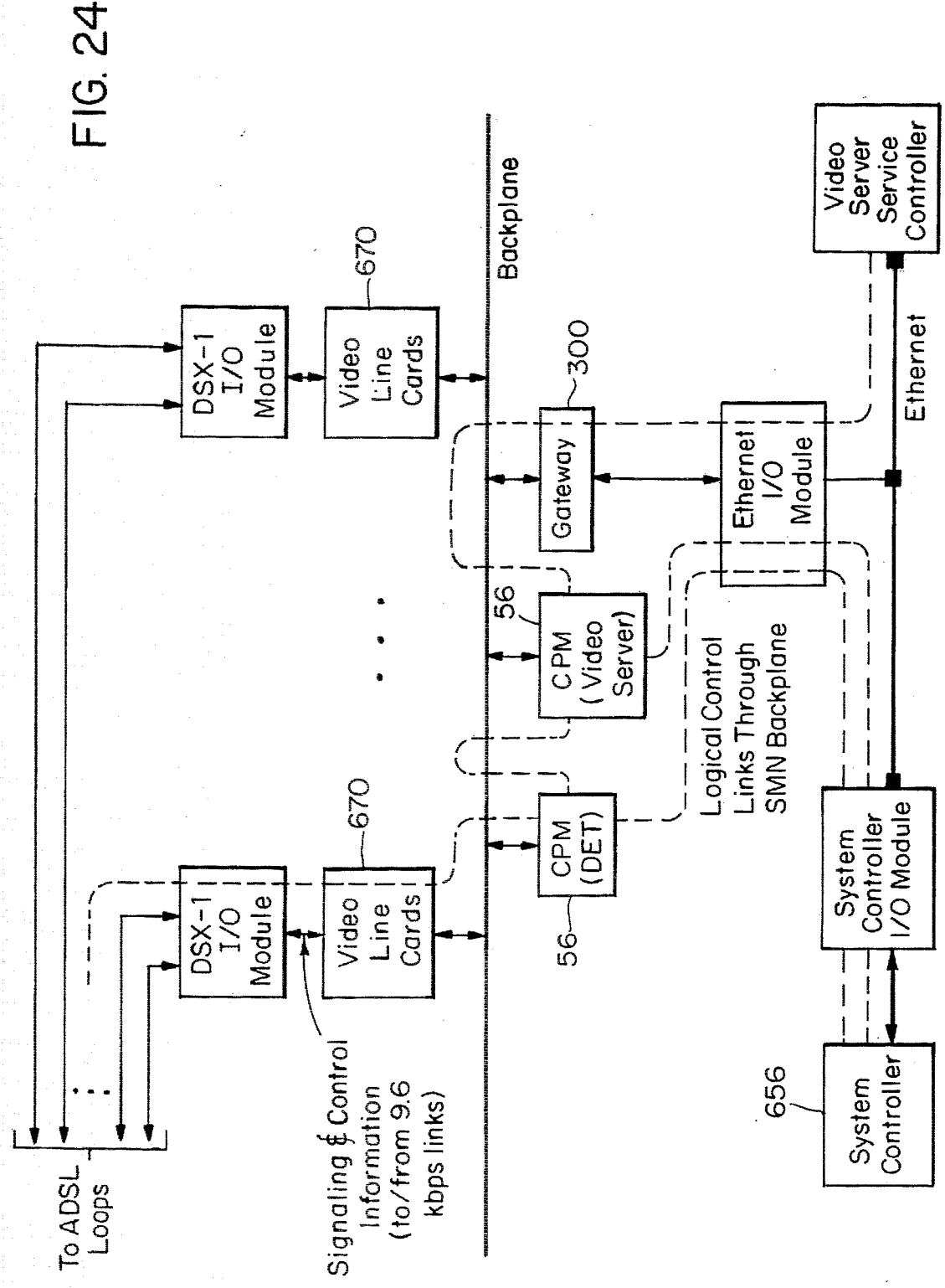
FIG. 24 is a schematic representation of the System C-Plane architecture.

The Video Server 612 is the repository of the video database 604. The video programs are stored in various types of memory inside the server. On demand, the server 612 makes available the requested video program at one of the output ports (DSX-1 ports #1–#20) of video server terminal 606. The server has multiple outputs, so that multiple simultaneous accesses into its database are possible. The server is controlled by a signaling link which is available at an Ethernet port (FIG. 24).

A Video Distribution Terminal (VDT) 630 connects to, on one side, the multiple outputs of the Video Server. On the other side, it connects to the ADSL loops leading to the subscribers' premises. One major function of the VDT 630 is to provide concentration. This allows efficient utilization of the server, thus providing economic advantage. In accordance with the system architecture, the number of subscribers 602 homing into the VDT 630 will exceed the number of server DSX-1 output ports by the desired concentration ratio. This allows service to be traffic engineered to the desired grade of availability. The VDT also terminates the per-loop signaling to and from the DETs 618 as well as the Ethernet based Video Server signaling and control link.

The ADSL loop transport system 616 provides, on a per-subscriber basis, a DSX-1 physical layer connection extending, one way, from the video server terminal 606 to the subscriber's premises, as well as a 9.6 Kbps asynchronous, bi-directional control signal. These capabilities are provided in addition to baseband plane old telephone service (POTS). The ADSL system consists of a nest of shelves in the serving telephone central office which house ADSL-C cards on a one per loop basis. An ADSL-R terminal housing 632 is present as the network termination at the subscriber's premises. The ADSL loop transport system provides, even in the presence of standard loop impairments, a bit error rate such that the associated artifact rate on the subscriber's television screen is consistent with VCR quality performance.

The DET 618 is used on the subscriber's premises to interface to the subscriber's television set. The DET consists of a set top box 634 as well as an infrared remote (not shown). The box connects to the ADSL-R 632 using a DSX-1 interface, and to the RS232 connector on the ADSL-R through which it accesses the 9.6 Kbps data link embedded in the ADSL loop. The MPEG-1 video signal on the DSX-1 channel is decoded inside the set top box 634 into an NTSC signal suitable for viewing on the subscriber's television set. The subscriber interacts with the Video Distribution Terminal 630 and the Video Server 612 to set up and control video sessions using the buttons on the infrared remote (not shown) to send appropriate signaling and control messages on the 9.6 Kbps link.

The System Controller 656 controls the Video Distribution Terminal's fabric and manages associations between server side interfaces and the ADSL loop side interfaces. The System Controller 656 ensures that the DET's requests for video service are accurately conveyed to the server and that the right output port of the server is connected to the right ADSL loop. The call control software in the System Controller provides networking services, such as call set up, call tear down, all trunks busy, etc. The System Controller also provides internetworking services along with management of associated state machines. Using these services, the DETs and the Video Server interact in concert. In addition, local operator and OAM&P interfaces are provided by the System Controller.

In a simple embodiment structure, the ADSL loop transport system 616 and the Video Distribution Terminal 630 may be disjoint. In a more complex system, the ADSL-C is integrated into the Video Distribution Terminal 630 and the payload of the ADSL loop can be increased to 6 Mbps. This allows the Televideo System 600 to support multiple on-demand sessions per subscriber.

The simpler system is based on direct MPEG-1 transport layer presentation on the server's outputs. To switch such a signal, the Video Distribution Terminal's cell switch fabric uses switched DS1 circuit emulation to create real-time cross connects between the server 612 and the DETs 618. In the complex system, when the server can support ATM based video outputs using OC-3c/12c interfaces, the cell switching capability of the Video Distribution Terminal 630 allows ATM switched virtual circuits to be interconnected between the server and the DETs.

Figure 22:
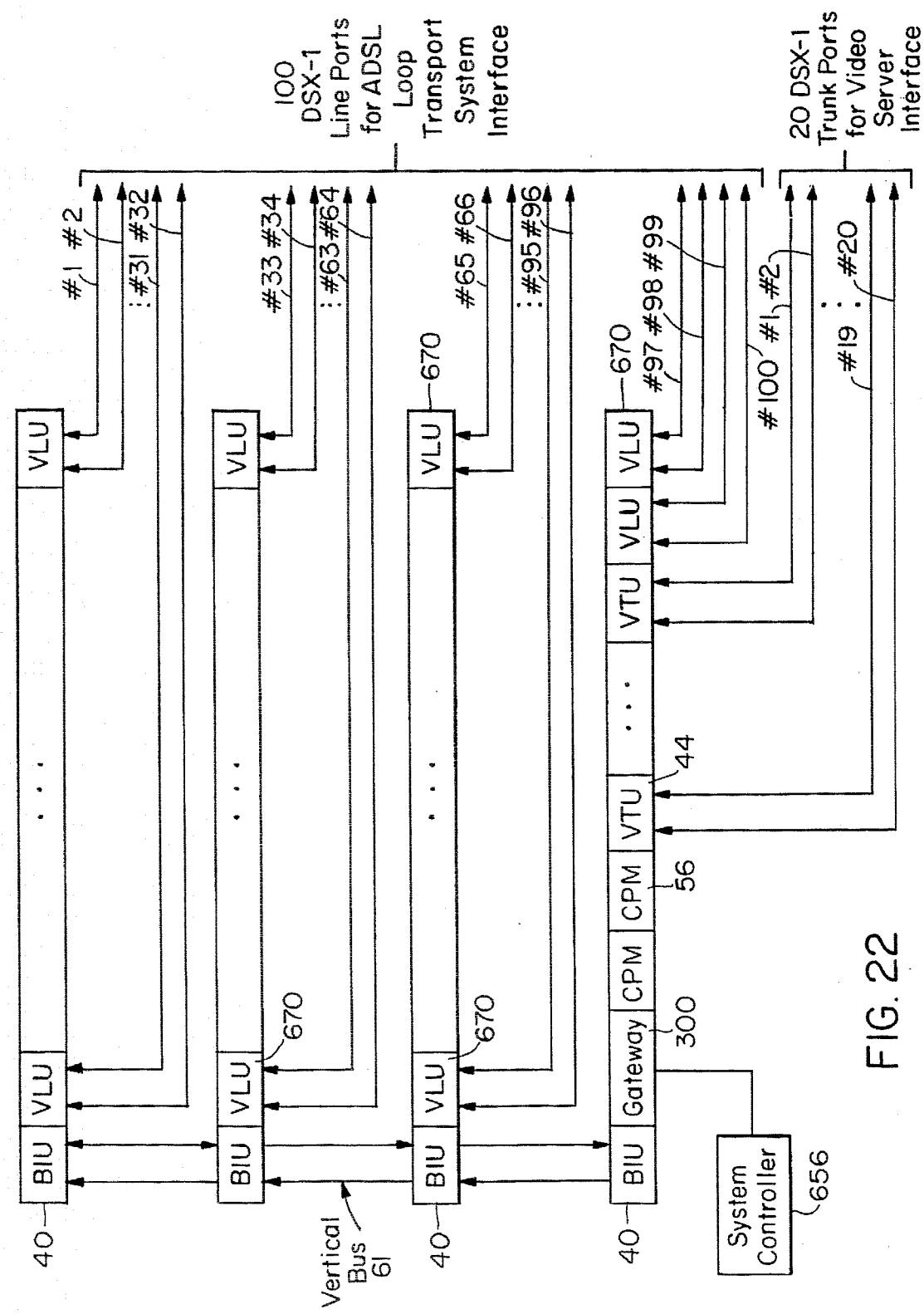
FIG. 22 is a schematic representation of the physical system layout.
Figure 23:
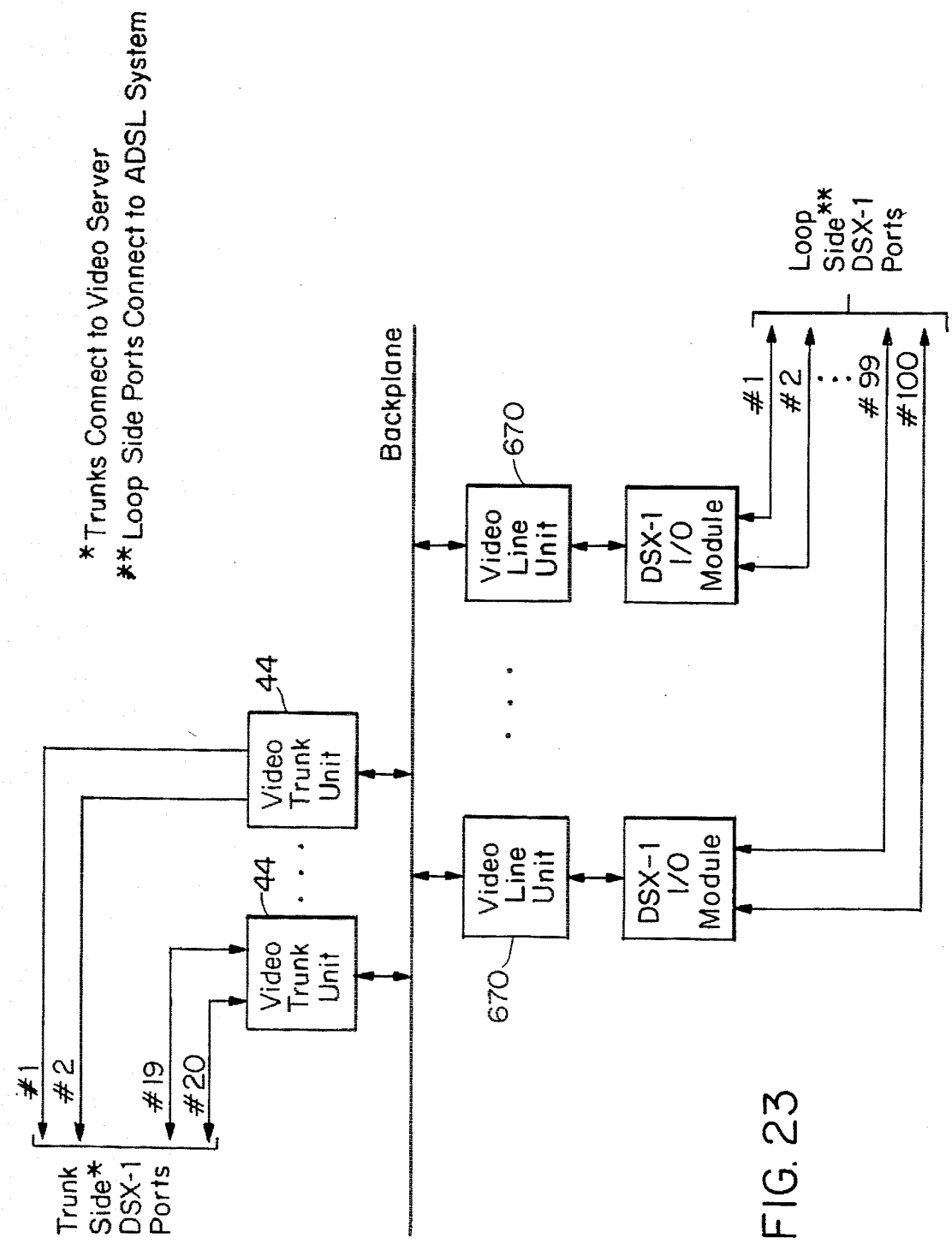
FIG. 23 is a schematic representation of the system U-Plane architecture.

A physical block diagram of an SMN for VOD shown in FIG. 22. As outlined in an earlier section, SMN consists of a number of shelves, interconnected by a vertical bus 61. Line cards are deployed in shelf slots. Plug-in cards used by the Video Distribution Terminals 630 include: the ADSL interface line card called Video Line Units (VLUs) 670, the DSX-1 Video Trunk Units (VTUs) 44, the Gateway (or CIM) 300, the SC 656 and the CPM control units 56. FIG. 23 shows the SMN video switching fabric. MPEG video signals arriving on the VTUs 44 are routed to the appropriate VLUs 670. POTS traffic is retrieved at the ADSL I/O module and connected to appropriate local switches. In one embodiment, the DSX-1 I/O module provides the interface to the ATU-C equipment. In another embodiment, this module is replaced by a ADSL I/O module which will directly terminate the ADSL loop.

FIG. 24 shows the control plane architecture. The logical channel of the Signalling and Control (SCO) control link destined for the Video Distribution Terminal 630 (FIG. 21) is routed to the DET-CPM 56. The DET-CPM performs the translation between the IPE messages and the DET messages. Similarly, call control messages to/from the Video Server are translated to the system IPE by the Server-CPM 56. The DET and the Server can now be internetworked by invoking IPE relay. The SC 656 performs higher level system control functions and provides the switch OAM&P interface. Additional CPMs can be added to interface other signaling and control entities.

11.0. Software Architecture

Figure 27:
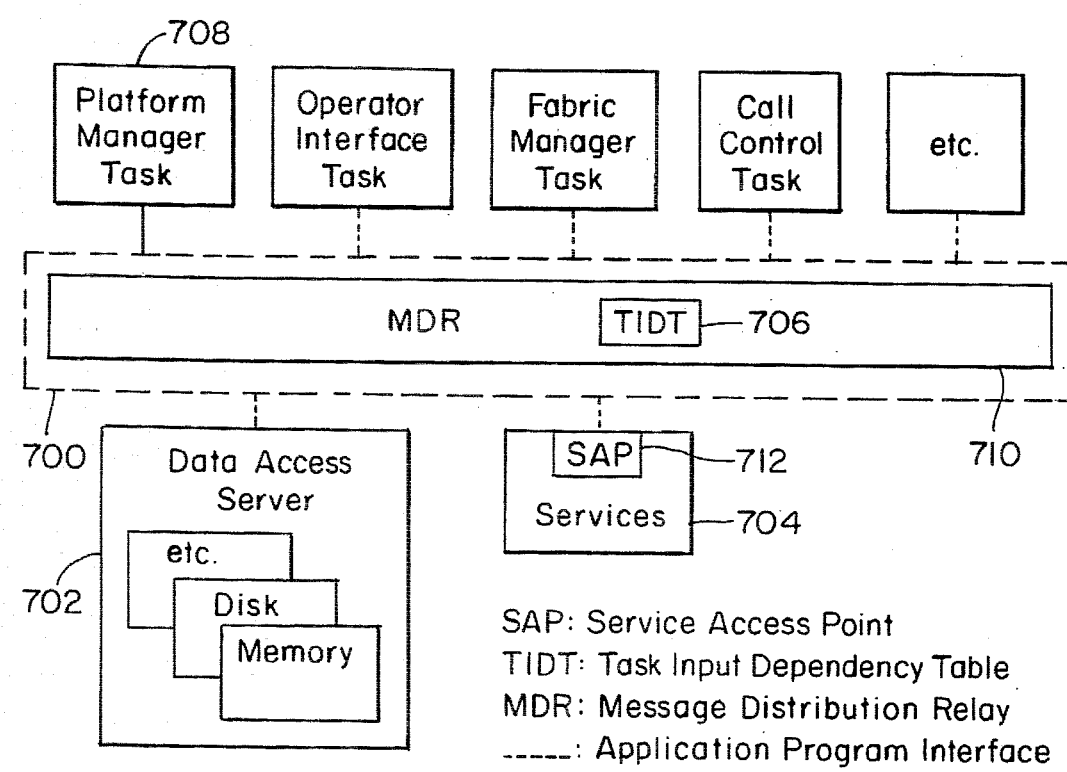
FIG. 27 is a schematic block diagram of the system software architecture.

The software architecture consists of five major components: Applications; Data Access Server; Services; Message Distribution and Relay (MDR); and Application Program Interface (API). The following describes the various elements of the architecture shown in FIG. 27.

Applications allow services to be offered to the end-user. It is through applications that the end-user can use the system as a network, can control the operation of the system, and can monitor the status of the operations. Applications can be modeled at a local module level or at a global system level. Local applications are features offered by an individual module. System level applications are system features that are jointly performed by related module applications.

In SMN, applications are implemented as tasks, each of which is implemented as a stand-alone entity, totally independent of other tasks. Each task communicates with the rest of the system through a pre-defined set of APIs.

Different processes are created for different applications. Each application may consist of more than one process. To simplify software development and maintenance efforts, processes should be partitioned so that their operations are asynchronous and independent of each other. In reality, system operations often require coupling between processes. For example, the platform manager normally monitors system alarm status. The occurrence of an alarm, however, may require actions from the Reroute process. To achieve total process coding independence while maintaining the operational dependency defined by the rule base, a Message Distribution and Relay (MDR) 710 process is designed to serve as a process relay point.

On receiving an event report, a task 708 services the event, updates the system database 702, and informs the MDR through a pre-defined API 700. The MDR contains a Task Input Dependency Table (TIDT) 706 which defines the interrelationship between messages and processes. The TIDT is basically a look-up table which defines all related tasks for each type of message. After receiving a message, the MDR sends out copies of the message to all relevant processes based on the TIDT.

Processes communicate with the MDR, not directly with each other. It is the TIDT within the MDR, not the process, that defines an inter-process relationship. With this architecture, processes can be added, deleted or modified at any stage of the development without affecting other processes. The developer only has to update the TIDT. The TIDT can be constructed at compile time and dynamically maintained at run time. For example, when a new application is added to a system, all new processes generated by the new application announce their existence and modify the message/task relationship in the TIDT.

A Data Access Server 702 combines traditional database, relational database, and database server aspects with added intelligence into one sophisticated data-processing suite. The Data Access Server is the central point of the SMN where diverse hardware, operating systems, communication protocols, and applications all integrate into one unified processing environment.

The database is the collection of information relating to all aspects of the system. The content and the format of certain parts of the database should be defined so that it can be readily accessed by speed-critical applications. Unless the data is directly accessible by each process, administering a database in its raw form is inefficient. For instance, if a process directly searches a remote table for a specific item, it needs to read every entry of the table over a communication link until locating the item. This method is time consuming and bandwidth wasting.

The database server is a step above the basic database. With a database server, most database processing is done by processes co-located with the database. In the previous example, instead of searching the database, the remote process issues a command to the database server requesting the item. The local database server does the search and returns the result to the calling process. This arrangement is a more effective way of using the system resources. Another advantage of a database server is that access to the database is better controlled. Both security violations and glare conditions (two processes simultaneously updating the same item) can be avoided.

A relational database achieves one more layer of abstraction over database and database server. With a relational database, the only form of data structure are tables. When information about a certain aspect of the system is needed, a 'view' is created in real time by subsetting or combining existing tables. A single relational command can retrieve, update, or delete multiple records stored in the database. The SMN implements the relational database to different degrees with different storage media. Simple relational databases in RAM are implemented with entries and link lists.

A Data Access Server is an intelligent relational database server which further absorbs the implementation detail by presenting distributed information as if the information is locally present at the server location. When the Data Access Server receives a command requesting specific information, and if the information is locally present, the server will retrieve the information and report to the requesting process. If the information is not locally available, the server determines where the information resides, and automatically establishes a logical connection to the information source. The server then invokes proper procedure, protocol, and messages to collect the information, and presents the data to the calling process in the same way it presents the local information.

Services 704 are a collection of functions or objects through which generic system operations are performed. Services are passive in nature. They are invoked by a higher level control process and cease to exist after completing the task. Services are carried but by a collection of functions with procedural programming languages, or by a collection of object classes with object oriented programming language. Each function or each object, in turn, may invoke another function or another object. On completion, a function or an object always returns the control back to the calling process, the calling function, or the invoking object.

There can be a large number of functions and objects in the service block, with complex interrelationships. To offer a simple, efficient access to services, and to isolate the clients from the underlying detail of the service module, similar services are grouped together and accessed by a set of pre-defined messages, through a pre-defined Service Access Point (SAP) 712. The SAPs and the message sets are independent of the software design. Functions can be added, deleted, or altered without affecting the SAP access or the software modules using the services.

In a multitasking environment, the same service can be offered to multiple client processes simultaneously. For services engaging system resources, the front-end function of each SAP is responsible for controlling the resource allocation. Services are application independent. They are, however, the building blocks of all applications. The separation between application and service is useful from the development perspective. Channel unit software designers, for example, can share the same software which offers generic channel unit services, such as communication drivers. Another benefit of this architecture is that services are usually hardware dependent, while applications are feature dependent. Separating the two makes it possible to separately update the technology or the product feature without affecting each other.

An API 700 is a set of rules and procedures defining the interaction between the applications, the services, and the knowledge base. The API can be a set of functions that a user process can call, it can be the passing of messages between processes, etc. An API can even be global memory shared by processes and services. An efficient API definition takes advantage of the features of the hardware environment and the operating system. Different modules may have different APIs.

The SMN is a truly distributed system which consists of distributed processing modules connected together through a control network. Each module is a self-contained processing entity with processor, memory, I/Os, operating system, and software. Examples of modules include a stand-alone computer, an embedded processing controller, and a channel unit. Inside a module, the software can be partitioned into four entities: the applications; the services; the MDR; and the Data Access Server.

Modules need to communicate with each other. An application in a channel unit may need to report an event to an application in a controller. An application in a computer may need to request a service from another computer. The actual protocol used for the communication may differ, depending on the nature of the communication and the reliability of the link. For example, some communication requires acknowledgment at the protocol level, some requires acknowledgment at the application level, and some does not require any acknowledgment. Over a reliable link, User Datagram Protocol (UDP) may be sufficiently reliable, while Transmission Control Protocol (TCP) may be needed over a less reliable link.

At the application level, processes communicate with each other through a predefined message set. There may be another operation between the application and the protocol level which deciphers the message. An example is the use of the Remote Procedural Calls (RPCs) through sockets for inter-processor communication. Here, vendor specific RPC tools determine the format of the message.

To provide for mixed protocols and mixed message formats, the system supports multiple message interfaces. Different protocols and different message encoding schemes are channeled into different logical links, each identified by a unique Virtual Circuit Identifier (VCI). Incoming packets from each logical channel are routed directly to the proper protocol stack and the proper message decoder. It is the responsibility of the Data Access Server to unify the API and various message interfaces. At the receiving port, the Data Access Server routes incoming packets to the proper protocol interface. At the application level, the MDR further directs the decoded message to the destination process.

Figure 28:
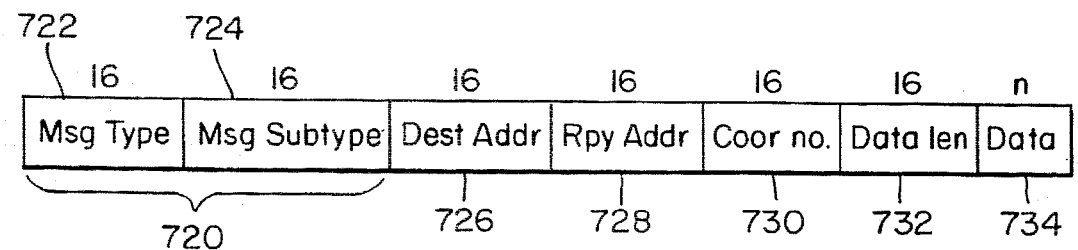
FIG. 28 is a representation of the control message structure.

All control messages, whether they are sent between modules or inside the same module, share a common message format, as shown in FIG. 28. The first 32 bits form the message type field 720. The message type field is further divided into a 16-bit primary message type field 722, followed by a 16-bit message subtype field 724. The primary message type field 722 defines the type of message. There are currently five primary message types: A_INFO, U_INFO, GET, SET, and ACK.

A_INFO is used by one processor to inform another of an event, or to request an action. It requires an acknowledgment from the receiver. The value of A_INFO is OX10. U_INFO is identical to A_INFO except the sender does not expect to receive an acknowledgment from the receiver. The value of U_INFO is 0×20.

GET is used to retrieve the value of variable(s). The expected response to this command is an ACK message. If the command is successful, the error_status field of the return code is SUCCEEDED, the error_index field is NULL and the additional_data field of the ACK message contains entries of the requested data value. If one of the variables requested does not exist, the error_status field of the return code would be NONEXISTENT, and no data is returned. In this case, the error_index field will contain the variable name of the variable which did not exist. If more than one variable did not exist, the first nonexistent variable encountered is returned in error_index. This is so that the rest of the variable list does not have to be parsed. The value of GET is 0×30.

SET is used to set the value of variable(s). The expected response to this message is an ACK message. If the operation succeeds, the error_status field of the return code is SUCCEEDED, otherwise it is NONEXISTENT if one of the variables does not exist. As with the GET command, error_index contains the name of the first nonexistent variable. If any variable does not exist, none of the variables actually get SET. The value of SET is 0×40.

ACK is used to acknowledge a previous A_INFO, GET or SET message. The data field of ACK is comprised of an error_status code (NULL if no error), an error_index code (used for more error information), and an additional_data field (used in response to GET messages). The correlation_number assigned to the GET, SET or A_INFO message to which the ACK is a response should be placed in the correlation_number field in the header of the ACK. The currently defined values of error_status are:

| Code | Comment | Value |
| --- | --- | --- |
| SUCCEEDED | No error | 0×00 |
| RETURN_MSG_TOO_BIG | The date requested exceeds the since capable of being returned. The sender should request data in smaller pieces. | |
| NONEXISTENT | The variable requested or a specified does not exist | |
| BAD_VALUE | A SET message attempts to assign a variable an illegal value. | |
| READ_ONLY | A SET tries to write a variable which is read only. | |
| FAILED | The requested operation has failed, further information can be included in the error_index and additional_data fields if available. | 0×05 |
| IN_PROGRESS | IN_PROGRESS is reserved for special commands to which a response cannot be immediate. In this case, the ACK message is returned with an error_status. | 0×06 |

The value of ACK is 0×50.

Message types are global throughout the system. This fact allows the MDR process to route an incoming message based on its message type when the destination process is not specified.

Figure 29:
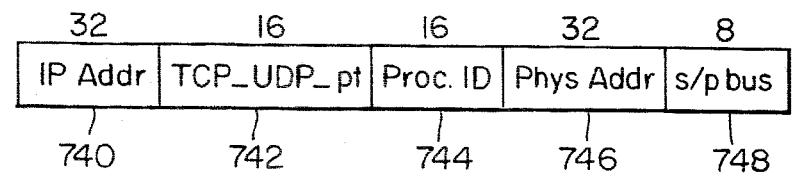
FIG. 29 is a representation of the address field format.

There are two address fields, the destination address and the reply address 728. The destination address 726 specifies the message destination. Certain messages require either acknowledgment or reply. With these messages, the reply address 728 supplies the return address information for the return message. Each address field consists of five subfields, as shown in FIG. 29, not all of which are used for every message.

The IP_address 740 is a 32-bit field specifying the Internetwork IP address. The TCP_UDP_port_number 742 is a 16-bit field specifying the Internetwork IP address. These two fields may be used when the destination module implements the TCP/IP protocol stack. Process ID 744 is used to identify a process when more than one process is present in a module. Process IDs are globally defined in the SMN system process directory file. Note that the process ID is different from the Unix process ID, which is assigned by the operating system. The physical address 746 is used to indicate the physical location of the module which includes a 3-bit bus, a 5-bit shelf, and a 8-bit slot field. The s_or_p_bus field 748 can be used to indicate if the message is to be sent from the service bus or the protection bus. If the field is NULL, the message will be sent through whichever bus the sender is currently using as the active bus. This field is used mainly for fault isolation purposes.

There are several important points with the message address. First, the reply address field 728 normally contains the message sender's address information. However, there are times when a process may want to send a message and have the response of the message go to a different process. That is why the field is called a reply address and not a source or sender address. In the reverse direction, when a module sends a reply message, it put its own address in the reply address field.

A second point is that address fields and address sub-fields are optional. Information in the address sub-fields provides explicit information about the message destination. Not all sub-fields are required or supported by all modules. For example, the IP address field 740 and the TCP_UDP_port_number fields 742 have meaning only for modules implementing the TCP/IP protocol stack. In fact, the main function of the MDR 700 and the knowledge server is to provide the ability to forward messages with incomplete or no address information.

A third point is that the address information can be added, deleted, or altered by different processes. For example, a MDR sends a message to a different module. The TCP or UDP port number of the destination may be unknown to the sending MDR. The fields, however, will be filled by the receiving module's MDR.

When a process sends several messages and expects several responses, the 8-bit correlation number field 730 provides a way for the sender to correlate responses to sent messages. The sender assigns the correlation number to a message which requires a response. When the receiver formulates the return message, it copies the correlation number. By using different correlation numbers for different messages, the sender can uniquely correlate responds with inquiries. The data length field 732 is a 16-bit field defining the number of bytes for the data field. The data field 734 contains the actual information of the message.

One of the functions of the Data Access Server is to maintain all external connections. As previously mentioned, when control communications pass over an external interface, the TCP protocol is used to ensure error-free delivery. The TCP protocol is connection oriented. Rather than have individual processes establish TCP connections, which would result in a large number of redundant connections without much traffic, instead one process, the Data Access Server establishes the necessary connections and maintains the port numbers. When a process needs to send a message to another module, for instance, it sends a message to the MDR with the IP address of the far end process. The MDR forwards the message to the Data Access Server, which determines the correct TCP port to use. This frees the individual processes from needing to worry about TCP port numbers.

The MDR also determines where to send messages without destination information. These messages are typically inter-process messages. If the destination information is NULL, the MDR will route the messages based on message type. The MDR can also do multicasting—that is, if a particular message is received, and multiple processes need to know about it, then the MDR sends the message to all of them.

Equivalents

This completes the description of the preferred embodiments of the invention. Those skilled in the art will know, or be able to ascertain using no more than routine experimentation, many equivalents to the specific embodiments of the invention described herein.

What is claimed is:

1. A multimedia network system comprising:

a plurality of gateway devices for transmitting and receiving a plurality of digital signals, each digital signal comprising user data, each gateway device having a plurality of service definition modules for transmitting and receiving the user data to and from users; and a switch comprising a tiered system of buses and a plurality of channel units coupled to the gateway devices for converting the user data into cells having an intra-switch cell format and coupling the cells to the tiered system of buses, and receiving cells addressed to users and converting data in the cells into appropriate physical and frame format and coupling the converted data to the appropriate gateway device wherein the tiered system of buses comprises a plurality of first buses carrying digital bits at a first rate and a plurality of second buses carrying digital bits at a second rate, the first buses being interconnected to the second buses and wherein the first buses consist of N independent X bit parallel buses and the second buses consist of N independent serial buses.

2. The system of claim 1 wherein N=4 and X=16.

3. A scalable multimedia network comprising:

a first data connector for converting user data into cells having an intra-network cell format comprising first and second packet cell formats and coupling the cells to a high speed system bus wherein the bus comprises tiers of buses, each tier bus operating at a different data rate;

a receiver for receiving cells addressed to users;

a second data connector for converting data in the cells into an appropriate physical and frame format; and a coupler for coupling the converted data to an appropriate destination;

wherein the cells comprise a plurality of first cells having the first packet cell format and a plurality of second cells having the second packet cell format, any first cell having priority over any second cell in accessing the high speed bus and wherein the first packet cell format comprises a cell of 8 bytes wherein the bytes are arranged as follows: four bytes provide a destination address for the packet; two bytes contain data information and two bytes contain priority information, sequence information, signaling information and CRC information.

4. The network of claim 3 wherein the destination address is provided by fields within the four bytes as follows:

a. a three bit bus destination field;

b. an eight bit shelf destination field;

c. a five bit slot destination field; and d. a sixteen bit port destination field and the priority information, sequence information, signaling information, and CRC information are provided by fields within the two bytes as follows:

a. a two bit priority field;
b. a two bit sequence number field;
c. a two bit signaling field;
d. a one bit spare field;
e. a one bit signaling enable field;
f. a one bit large packet identification field;
g. a one bit end of packet identification field;
h. a one bit CRC error reported field; and
i. a five bit CRC field.

5. A scalable multimedia network comprising:

a first data connector for converting user data into cells having an intra-network cell format comprising first and second packet cell formats and coupling the cells to a high speed system bus wherein the bus comprises tiers of buses, each tier bus operating at a different data rate;

a receiver for receiving cells addressed to users;

a second data connector for converting data in the cells into an appropriate physical and frame format; and a coupler for coupling the converted data to an appropriate destination;

wherein the cells comprise a plurality of first cells having the first packet cell format and a plurality of second cells having the second packet cell format, any first cell having priority over any second cell in accessing the high speed bus and wherein the second packet cell format comprises cells of 8 bytes comprising:

a. a first cell wherein the bytes are arranged as follows: four bytes provide a destination address for the packet; two bytes provide a reserved word; and two bytes provide priority, congestion control, and CRC information;
b. a last cell wherein the bytes are arranged as follows: zero to six bytes provide data information, one byte provides a byte count for the packet, and one byte provides CRC information;
c. zero or more cells wherein there are 7 data bytes followed by one byte containing CRC information.

6. The network of claim 5 wherein the first cell contains fields comprising:

a. a three bit bus destination field;
b. an eight bit shelf destination field;
c. a five bit slot destination field;
d. a sixteen bit port and VCI index;
e. a sixteen bit reserved word field;
f. a two bit priority field;
g. a one bit forward congestion field;
h. a two bit backward congestion field;
i. a one bit discard eligibility field;
j. a one bit spare data field;
k. a one bit control/data field;
l. a one bit large packet identification field;
m. a one bit end of packet identification field;
n. a one bit CRC error reported field; and
o. a five bit CRC field.

7. In a communication network, a method of data communication comprising the steps of:

converting user data into cells having an intra-network cell format comprising first and second packet cell formats;

coupling the cells to a high speed system bus wherein the bus comprises tiers of buses, each tier bus operating at a different data rate;

receiving cells and converting data in the cells into an appropriate physical and frame format; and coupling the converted data to an appropriate destination;

wherein the cells comprise a plurality of first cells having the first packet cell format and a plurality of second cells having the second packet cell format, any first cell having priority over any second cell in accessing the high speed bus and wherein the first packet cell format comprises a cell of 8 bytes and wherein the bytes are arranged as follows: four bytes provide a destination address for the packet; two bytes contain data information and two bytes contain priority information, sequence information, signaling information and CRC information.

8. The method of claim 7 wherein the destination address is provided by fields within the four bytes as follows:

a. a three bit bus destination field;
b. an eight bit shelf destination field;
c. a five bit slot destination field; and
d. a sixteen bit port destination field and the priority information, sequence information, signaling information, and CRC information are provided by fields within the two bytes as follows:

a. a two bit priority field;
b. a two bit sequence number field;
c. a two bit signaling field;
d. a one bit spare field;
e. a one bit signaling enable field;
f. a one bit large packet identification field;
g. a one bit end of packet identification field;
h. a one bit CRC error reported field; and
i. a five bit CRC field.

9. In a communication network, a method of data communication comprising the steps of:

converting user data into cells having intra-network cell format comprising first and second packet cell formats;

coupling the cells to a high speed system bus wherein the bus comprises tiers of buses, each tier bus operating at a different rate;

receiving cells and converting data in the cells into an appropriate physical and frame format; and coupling the converted data to an appropriate destination and wherein the cells comprise a plurality of first cells having the first packet cell format and a plurality of second cells having the second packet cell format, any first cell having priority over any second cell in accessing the high speed bus and wherein the second packet cell format comprises cells of 8 bytes comprising:

a. a first cell wherein the bytes are arranged as follows: four bytes provide a destination address for the packet; two bytes provide a reserved word; and two bytes provide priority, congestion control, and CRC information;
b. a last cell wherein the bytes are arranged as follows: zero to six bytes provide data information, one byte provides a byte count for the packet, and one byte provides CRC information;
c. zero or more cells wherein there are 7 data bytes followed by one byte containing CRC information.

10. The method of claim 9 wherein the first cell contains fields comprising:
   a. a three bit bus destination field;
   b. an eight bit shelf destination field;
   c. a five bit slot destination field;
   d. a sixteen bit port and VCI index;
   e. a sixteen bit reserved word field;
   f. a two bit priority field;
   g. a one bit forward congestion field;
   h. a two bit backward congestion field;
   i. a one bit discard eligibility field;
   j. a one bit spare data field;
   k. a one bit control/data field;
   l. a one bit large packet identification field;
   m. a one bit end of packet identification field;
   n. a one bit CRC error reported field; and
   o. a five bit CRC field.

* * * * *